(12) United States Patent
Schwartz et al.

(10) Patent No.: US 10,782,984 B2
(45) Date of Patent: Sep. 22, 2020

(54) INTERACTIVE EVENT CREATION CONTROL CONSOLE

(71) Applicant: MICROSOFT TECHNOLOGY LICENSING, LLC, Redmond, WA (US)

(72) Inventors: Eli Schwartz, Kfar Saba (IL); Michael Andrew Foynes, Woodinville, WA (US); Alexander Vakaluk, Haifa (IL); Nir Levy, Tel Aviv (IL); Irit Shalom Kantor, Kadima (IL); Eli Arbel, Tel Aviv (IL); Eyal Livne, Kfar Saba (IL); Avner Shahar-Kashtan, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/365,180

(22) Filed: Mar. 26, 2019

(65) Prior Publication Data
US 2019/0324825 A1    Oct. 24, 2019

Related U.S. Application Data

(60) Provisional application No. 62/659,492, filed on Apr. 18, 2018.

(51) Int. Cl.
*G06F 9/451* (2018.01)
*G06F 3/0483* (2013.01)
(Continued)

(52) U.S. Cl.
CPC ............ *G06F 9/451* (2018.02); *G06F 3/0482* (2013.01); *G06F 3/0483* (2013.01);
(Continued)

(58) Field of Classification Search
CPC ........ G06F 9/542; G06F 3/0482; G06F 9/451; G06F 16/90; G06F 3/04842
See application file for complete search history.

(56) References Cited

U.S. PATENT DOCUMENTS

| 5,835,090 A | 11/1998 | Clark et al. |
| 7,013,290 B2 | 3/2006 | Ananian |

(Continued)

FOREIGN PATENT DOCUMENTS

| JP | 2008122783 A | 5/2008 |
| WO | 2017163238 A1 | 9/2017 |

OTHER PUBLICATIONS

"Adding Dynamic Lists to Fields", Retrieved From: https://docs.bmc.com/docs/cloudlifecyclemanagement/46/adding-dynamic-lists-to-fields-669202735.html, Retrieved Date: Dec. 14, 2018, 10 Pages.

(Continued)

*Primary Examiner* — Tuan C Dao
(74) *Attorney, Agent, or Firm* — Workman Nydegger

(57) ABSTRACT

Interactive event creation control consoles are provided to facilitate the creation of events from a plurality of different content sources. In some instances, the event creation control consoles include two different frames, a content source frame for selecting content for corresponding content tiles and an event creation frame for identifying the content tiles to be published in an event canvas associated with a particular event and which is published differently on different end user systems based on the contextual event role of the end user and/or the different end user system configurations.

20 Claims, 38 Drawing Sheets

(51) Int. Cl.
  *G06F 9/54*      (2006.01)
  *G06F 3/0484*    (2013.01)
  *G06F 3/0482*    (2013.01)
  *G06F 16/2455*   (2019.01)
  *G06F 16/907*    (2019.01)
  *G06F 16/904*    (2019.01)
  *G06F 40/106*    (2020.01)
  *G06F 40/186*    (2020.01)

(52) U.S. Cl.
  CPC ...... *G06F 3/04842* (2013.01); *G06F 3/04845* (2013.01); *G06F 9/542* (2013.01); *G06F 16/24568* (2019.01); *G06F 16/904* (2019.01); *G06F 16/907* (2019.01); *G06F 40/106* (2020.01); *G06F 40/186* (2020.01)

(56) References Cited

U.S. PATENT DOCUMENTS

| | | | |
|---|---|---|---|
| 7,155,676 | B2 | 12/2006 | Land et al. |
| 7,925,973 | B2 | 4/2011 | Allaire et al. |
| 8,635,553 | B2 | 1/2014 | Dhawan |
| 8,659,503 | B2 | 2/2014 | Kee et al. |
| 8,665,484 | B2 | 3/2014 | Yamada et al. |
| 8,856,656 | B2 | 10/2014 | Chao et al. |
| 9,606,764 | B2 | 3/2017 | Jenks et al. |
| 9,921,711 | B2 | 3/2018 | Oh et al. |
| 10,083,018 | B1 | 9/2018 | Rizea et al. |
| 2003/0202101 | A1 | 10/2003 | Monroe et al. |
| 2006/0198555 | A1 | 9/2006 | Hosotsubo |
| 2006/0220836 | A1 | 10/2006 | Wei et al. |
| 2008/0005679 | A1 | 1/2008 | Rimas-ribikauskas et al. |
| 2008/0062167 | A1 | 3/2008 | Boggs et al. |
| 2008/0102903 | A1 | 5/2008 | Schultz et al. |
| 2008/0168159 | A1 | 7/2008 | Branson et al. |
| 2008/0263056 | A1 | 10/2008 | Murray et al. |
| 2008/0282147 | A1 | 11/2008 | Schorr |
| 2008/0298463 | A1* | 12/2008 | Stivers ............... G09G 5/003 375/240.21 |
| 2009/0031247 | A1 | 1/2009 | Walter et al. |
| 2009/0094632 | A1 | 4/2009 | Newnam et al. |
| 2009/0132942 | A1 | 5/2009 | Santoro et al. |
| 2010/0191799 | A1 | 7/2010 | Fiedorowicz et al. |
| 2011/0072366 | A1 | 3/2011 | Spencer et al. |
| 2011/0164105 | A1 | 7/2011 | Lee et al. |
| 2012/0032969 | A1 | 2/2012 | Sugiyama |
| 2012/0202449 | A1* | 8/2012 | Meyer ............... H04L 12/1403 455/405 |
| 2012/0221952 | A1* | 8/2012 | Chavez ............... G06Q 10/00 715/733 |
| 2013/0111377 | A1 | 5/2013 | Newman et al. |
| 2013/0145299 | A1 | 6/2013 | Steimle et al. |
| 2014/0096167 | A1 | 4/2014 | Lang et al. |
| 2014/0266717 | A1 | 9/2014 | Warren et al. |
| 2014/0281894 | A1* | 9/2014 | Maity ............... G06F 9/452 715/234 |
| 2014/0344024 | A1 | 11/2014 | Kempf et al. |
| 2015/0120353 | A1 | 4/2015 | Williger et al. |
| 2015/0169205 | A1 | 6/2015 | Yajima et al. |
| 2015/0277849 | A1* | 10/2015 | Beaumier ............... G06F 3/162 715/716 |
| 2015/0286343 | A1 | 10/2015 | Welicki et al. |
| 2015/0331717 | A1 | 11/2015 | Boenisch et al. |
| 2015/0350270 | A1 | 12/2015 | Caras et al. |
| 2016/0044061 | A1 | 2/2016 | Forte |
| 2016/0198322 | A1 | 7/2016 | Pitis |
| 2016/0320938 | A9 | 11/2016 | Massand |
| 2017/0308590 | A1 | 10/2017 | Ramesan et al. |
| 2017/0329500 | A1 | 11/2017 | Grammatikakis et al. |
| 2017/0329580 | A1 | 11/2017 | Jann et al. |
| 2017/0337045 | A1 | 11/2017 | Hills et al. |
| 2018/0025360 | A1 | 1/2018 | Gorny |
| 2018/0046609 | A1 | 2/2018 | Agarwal et al. |
| 2018/0288488 | A1 | 10/2018 | Kikuchi |
| 2019/0268354 | A1 | 8/2019 | Zettel et al. |
| 2019/0324630 | A1 | 10/2019 | Schwartz et al. |
| 2019/0324775 | A1 | 10/2019 | Schwartz et al. |
| 2019/0324776 | A1 | 10/2019 | Schwartz et al. |
| 2019/0324986 | A1 | 10/2019 | Schwartz et al. |

OTHER PUBLICATIONS

"Display a View that is Based on a User Role", Retrieved From: https://web.archive.org/web/20160815171550/https:/support.office.com/en-us/article/display-a-view-that-is-based-on-a-user-role-7a85c374-151f-4a2e-8ea2-63c9fad2c557, Aug. 15, 2016, 2 Pages.

"Non Final Office Action Issued in U.S. Appl. No. 16/224,495", dated Nov. 29, 2019, 14 Pages.

"Multiple Monitor Software", Retrieved from: https://web.archive.org/web/20160310202454/http:/www.displaylink.com/downloads/multi-monitor-tools, Mar. 10, 2016, 5 Pages.

"Using the Convenient "Multi-Display" Function on Windows 10", Retrieved from: https://www.eizoglobal.com/library/basics/windows-10-multi-display-function/index.html, Apr. 29, 2017, 15 Pages.

Dutta, Moupiya, "Samsung Patents a Smartphone with Flexible Display that Goes All Way Around the Device", Retrieved from: https://www.techgenyz.com/2018/10/26/samsung-flexible-display/, Oct. 26, 2018, 3 Pages.

"International Search Report and Written Opinion Issued in PCT Application No. PCT/US19/027110", dated Jun. 28, 2019, 12 Pages.

"International Search Report and Written Opinion Issued in PCT Application No. PCT/US19/027111", dated Jun. 28, 2019, 11 Pages.

"International Search Report and Written Opinion Issued in PCT Application No. PCT/US19/027112", dated Jun. 28, 2019, 11 Pages.

"International Search Report and Written Opinion Issued in PCT Application No. PCT/US19/028056", dated Jun. 28, 2019, 9 Pages.

"Non Final Office Action Issued in U.S. Appl. No. 16/224,467", dated Apr. 3, 2020, 24 Pages.

"Non Final Office Action Issued in U.S. Appl. No. 16/224,486", dated Mar. 19, 2020, 14 Pages.

"Non Final Office Action Issued in U.S. Appl. No. 16/291,266", dated Mar. 6, 2020, 9 Pages.

"Final Office Action Issued in U.S. Appl. No. 16/224,495", dated May 14, 2020, 19 Pages.

"International Search Report and Written Opinion Issued in PCT Application No. PCT/US2020/016674", dated Jun. 9, 2020, 12 Pages.

* cited by examiner

```
┌─────────────────────────────────────────────────────────────┐
│ Identifying / Obtaining A Dynamically Adjustable Canvas     │
│ Associated With A Plurality Of Tiles, The Canvas Being      │
│ Configured To Be Automatically And Dynamically Adjusted In  │─── 3410
│ Size To Accommodate One Or More Different Display Areas     │
│ Identified For Rendering The Canvas, Each Tile              │
│ Corresponding To One Or More Content Type                   │
└─────────────────────────────────────────────────────────────┘
```

Generating The Layout Presentation(s) Of The Canvas For Rendering The Canvas Within The Display Area(s)

- Determine The Display Parameters Of The Display Area, Including Identifying At Least One Boundary Of The Display Area(s) And Determining Whether The At Least One Boundary Includes A Particular Prohibited Type Of Boundary — 3422

- Identifying Tile Display Characteristics (Including Tile Size And/or Position) For Rendering The Plurality Of Tiles, Including First And Second Sets Of Tiles, Based On Display Parameters Of The Plurality Of Tiles And Based On The Display Attributes Of The Display Area(s) — 3424

- Modifying The Layout Presentation In Response To Detecting A Change In The Display Area(s) For Rendering The Canvas — 3426

— 3420

Rendering The Canvas Within The Display Area(s) Without Any Of The First Set Of Tiles Overlapping A Boundary Of The Particular Type Of Boundary

- Ensuring That The First Set Of Tiles Having The First Display Parameter Do Not Overlap The Particular Type Of Boundary And Without Ensuring That The Second Set Of Tiles Do Not Overlap The Particular Type Of Boundary — 3432

- Rendering At Least A Portion Of One Of The Second Set Of Tiles Overlapping The Particular Type Of Boundary — 3434

- Modifying The Layout Presentation In Response To Detecting One Or More Tile(s) To Be Added To Or Removed From The Canvas And/or In Response To A Detected Change In A Content Being Rendered In One Or More Of The Plurality Of Tiles And/or In Response To A Detected Change In The Display Area(s) — 3436

- Rendering The Canvas Differently On Different Display Areas With Different Layout Presentations — 3438

INTERACTIVE EVENT CREATION CONTROL CONSOLE

CROSS-REFERENCE TO RELATED APPLICATIONS

This application claims the benefit of and priority to U.S. Provisional Patent Application Ser. No. 62/659,492 filed on Apr. 18, 2018 and entitled "IN-CONTEXT EVENT ORCHESTRATION OF PHYSICAL AND CYBER RESOURCES," which application is expressly incorporated herein by reference in its entirety.

BACKGROUND

Background and Relevant Art

Computers and computing systems have affected nearly every aspect of modern living. For instance, computers are generally involved in work, recreation, healthcare, transportation, entertainment, household management, etc.

The utility and functionality of a computer is often tied to its ability to access and display data to a user. This functionality can sometimes be enhanced by interconnecting the computer with one or more different computing systems to access the services and data at the other computing systems via network connections. These network connections may include, but are not limited to, connections via wired or wireless Ethernet, cellular connections, or even computer to computer connections through serial, parallel, USB, or other connections. Interconnection of computing systems in this manner has facilitated distributed computing systems, such as so-called "cloud" computing systems. Cloud and remote based service applications are now very prevalent.

In this description, "cloud computing" and the "cloud" refer to networked computing that enables ubiquitous, convenient, on-demand access to a shared pool of configurable computing resources (e.g., networks, servers, storage, applications, services, etc.). A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Users interface with the cloud and other computer resources through hardware interfaces and software interfaces. Hardware interfaces include input devices (e.g., keyboard, camera, mouse, touchpad, tablet, etc.) and output devices (e.g., display, speaker, printer, etc.). Examples of software interfaces include graphical user interfaces, text command line-based user interfaces, function key or hot key user interfaces, and the like.

Software user interfaces for accessing cloud resources are particularly important for entities that consume large amounts of data, such as security operation centers (SOC)s. In a SOC, operators will typically need to access and view large amounts of data from many disparate sources in order to effectively oversee and manage dynamic events. Many types of specialized graphical user interfaces have been developed to assist users working in SOCs as well as many other types of industries. Often, a SOC will have multiple different display devices for rendering data from a plurally of corresponding different sources. Example SOC setups are shown in FIGS. 1 and 2. These types of display presentations can sometimes be overwhelming and difficult to manage. In fact, it can sometimes be humanly impossible to monitor all information associated with a particular scenario using the current interfaces. Accordingly, current systems often rely on 'tribal knowledge' or awareness of data systems, which is often inadequate and can often results in only partial and slow responses to critical questions raised during operation management.

Another type of graphical user interface that is utilized by some industries is a canvas. A canvas, comprises a visualization of a container that holds a plurality of different display frames and other graphical objects. The canvas is often extensible, such that the canvas can wrap beyond the physical limits of the rendering display screen(s) in or more directions. This enables the canvas to contain more content than can be rendered at any single time on the rendering display screen(s). A user can scroll the canvas to access any additional content that is contained in the periphery and wrapped portions of the canvas.

Despite the many advantages and functionality provided by existing interfaces, including the ability to access a variety of content on the cloud, there is still an ongoing need and desire to provide new and improved computer interfaces for accessing and displaying content from disparate and remotely connected computer systems in an intuitive and useful manner. There is also an ongoing need for interfaces that can be used to define events and to identify and present information associated with the events, particularly in a contextually relevant manner. The foregoing is especially true for industries that require significant collaboration and oversight, such as SOC industries.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods and interfaces that include and that can be used for providing interactive content creation consoles. In some instances, the disclosed embodiments can be used for defining events and for identifying and presenting information associated with the events based on contextual relevance and with dynamically flexible formats.

Some embodiments include systems and methods that incorporate and/or utilize interactive event creation control consoles to create sharable events that are presented on event canvases according to contextual roles of the end users.

In some instances, the interactive event creation control consoles are configured with a content source frame and an event creation frame. The content source frame is displayed with a plurality of tiles, including at least one tile that is associated with selected content, which may be from a remote content source. The selected content is obtained in response to user input that specifies the content and/or that is used to interact with interfaces of the interactive event creation control console to query for and identify the selected content.

After the particular tile is associated with selected content, user input is also received/provided for placing the particular content tile in the event creation frame. This causes an update to the event creation frame with the particular tile and any other selected content tiles from the content source frame, wherein the update includes modifying the event creation frame to include the content tile(s) that contain content that defines and/or that is associated with the event that is being created.

Then, in response to user input received at the event creation console for publishing the event along with its corresponding content, the content in the event creation frame (comprising the one or more tiles) is published to multiple different users. In some instances, the publication of the content occurs through the generation of a plurality of different versions of common/shared event canvas that contains the content from the corresponding tiles.

In some instances, for example, the event or content from the event creation frame is published as different versions of a shared and corresponding event canvas defined by the content tiles in the event creation frame. In such instances, the event and/or event canvas is published by presenting the event canvas differently to different users based on different roles and/or system configurations associated with the different users, including presenting at least the particular content tile in a first manner on a first version of the event canvas on a first system for a first user and in a different manner on a second version of the event canvas on a second system for a second user. This may include, for example, utilizing a different quantity of content tiles for the first version than the second version of the event canvas or, alternatively, a utilizing a same quantity of tiles for the two versions of the event canvas, but using a different organizational layout of the tiles for the different versions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 5-17 illustrate various embodiments of an event canvas;

FIGS. 33 and 34 illustrate flowcharts having a plurality of method acts and steps associated with providing dynamic multi monitor displays and for providing dynamically flexible tile displays, as described;

DETAILED DESCRIPTION

Figure 1:
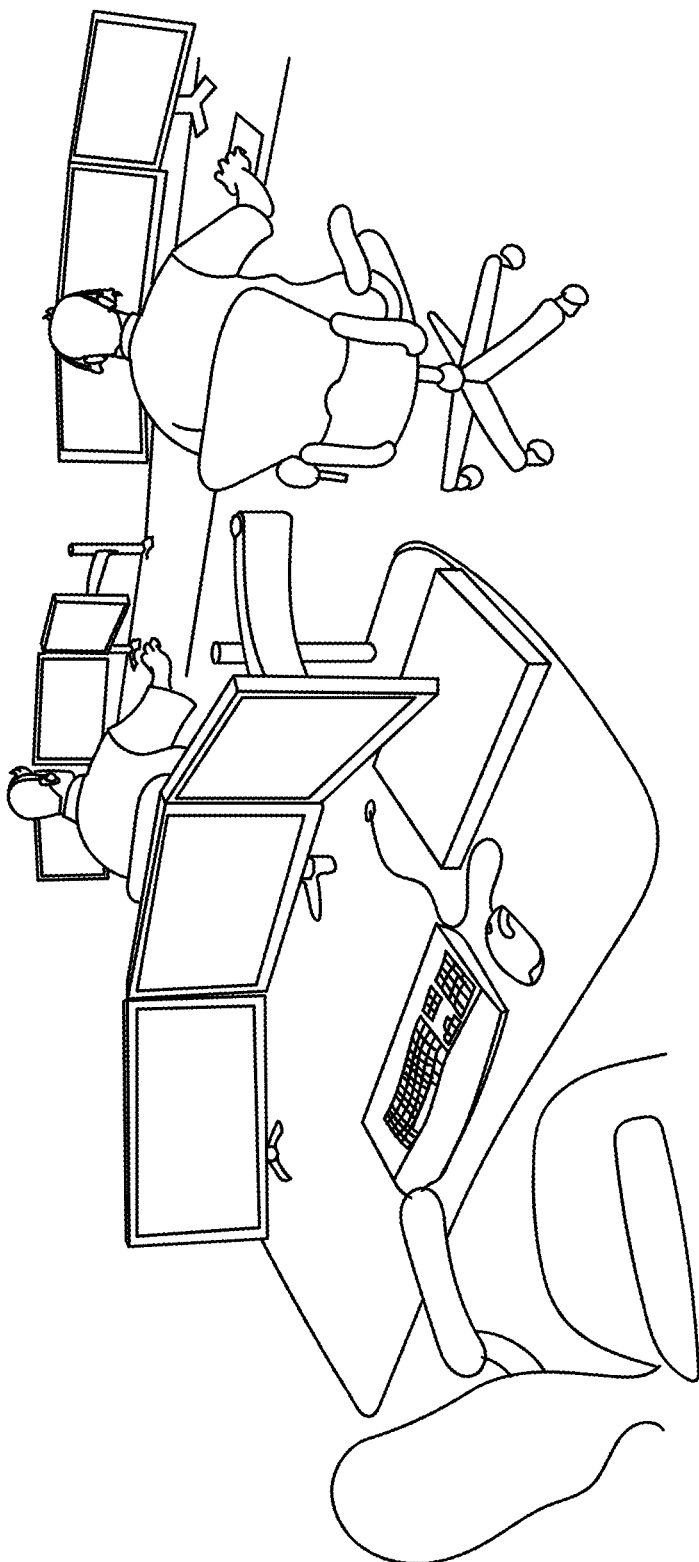
FIG. 1 illustrates an example of an existing SOC (Security Operations Center) with corresponding operators and operator computing systems.

Disclosed embodiments include new and improved computer interfaces for defining events and for identifying and presenting information associated with the events based on contextual relevance and with dynamically flexible formats.

In some instances, the disclosed embodiments provide systems and methods that include or utilize interactive event creation control consoles to create sharable events that are presented on event canvases according to contextual roles of the end users.

In some embodiments, the interactive event creation control consoles are configured with a content source frame and an event creation frame to identify content for different tiles and for determining tile configuration and layout in a canvas presentation for end users.

In some instances, the content source frame is displayed with a plurality of tiles, including at least a particular tile that is associated with selected content based on user input. User input is also received/provided for configuring placement of the particular content tile within the event creation frame and for controlling presentation of the content tile to end users.

Additionally, in some instances, whenever the content is associated with the tile (in the first instance) or is updated (subsequently), the event creation frame and the content source frame can also be updated to reflect the association of the content/updated content with the correspondingly associated tile.

The content associated with the tiles put into the event creation frame is then published, in response to user input provided for triggering the publication of a corresponding event. This input can be, for example, the selection of a displayed icon at the interactive event creation console.

After the event is published, based on this input, the content/tiles in the event creation frame is disseminated to different end users according to an event canvas that is presented in different versions/formats corresponding to the different contexts of the end users and/or different templates having predefined layouts/rules for publishing the content from the event creation frame for different end users. Thereafter, when new content is added to the event creation frame, such as when a user adds a new tile to the event creation frame and/or when a tile is updated with updated content, it is automatically incorporated into modified versions of the canvas that is being disseminated/published. The various templates can receive updated changes in response to any combination of push/pull schemes for obtaining information from the event creation frame. In this manner, changes to the event can be automatically and dynamically reflected in the event canvases that are being rendered to a plurality of different end users.

As will be appreciated from the disclosure presented herein, the disclosed embodiments provide significant improvements in computer technologies related to the manner in how a computing system is enabled to dynamically create and update user interfaces and canvases with contextually relevant information, based on user specific roles and dynamically detected content, as well as improvements in computer technologies for facilitating interactive engagement and navigation of content on a user interface, while improving the dynamic accessibility and flexible manner in which the layout presentation is automatically modified during distribution and use with a plurality of different monitor configurations for different display systems.

More specifically, the presented concepts and embodiments improve the ability of user interfaces to be dynamically modified based on changes in event data that is being received at the canvas and in response to detecting the overlap of certain content with monitor boundaries that separate monitors in multi monitor display systems. This can vastly improve the experience for users consuming the information presented in the tiles by helping prevent certain types of content from being broken apart or disrupted due to monitor boundaries.

Embodiments are also described that allow users to further customize pre-defined contextually relevant templates in order to more fully improve the user's experience. Further, this customizations by users may feed back into the system and result in future pre-defined templates being more contextually relevant without additional user modification. In some instances, the template customizations can be used to define and distinguish different types of tiles that are to be rendered with the canvas displays.

It is also appreciated that the embodiments herein improve a user's experience by decreasing the amount of navigation that is necessary with a computer interface in order to surface relevant information, particularly in a viewer friendly manner, such that the user is enabled to more quickly react to current data and be more efficiently apprised to changes in context that require new, different, or modified procedures than they may otherwise be without the disclosed functionality.

Figure 2:
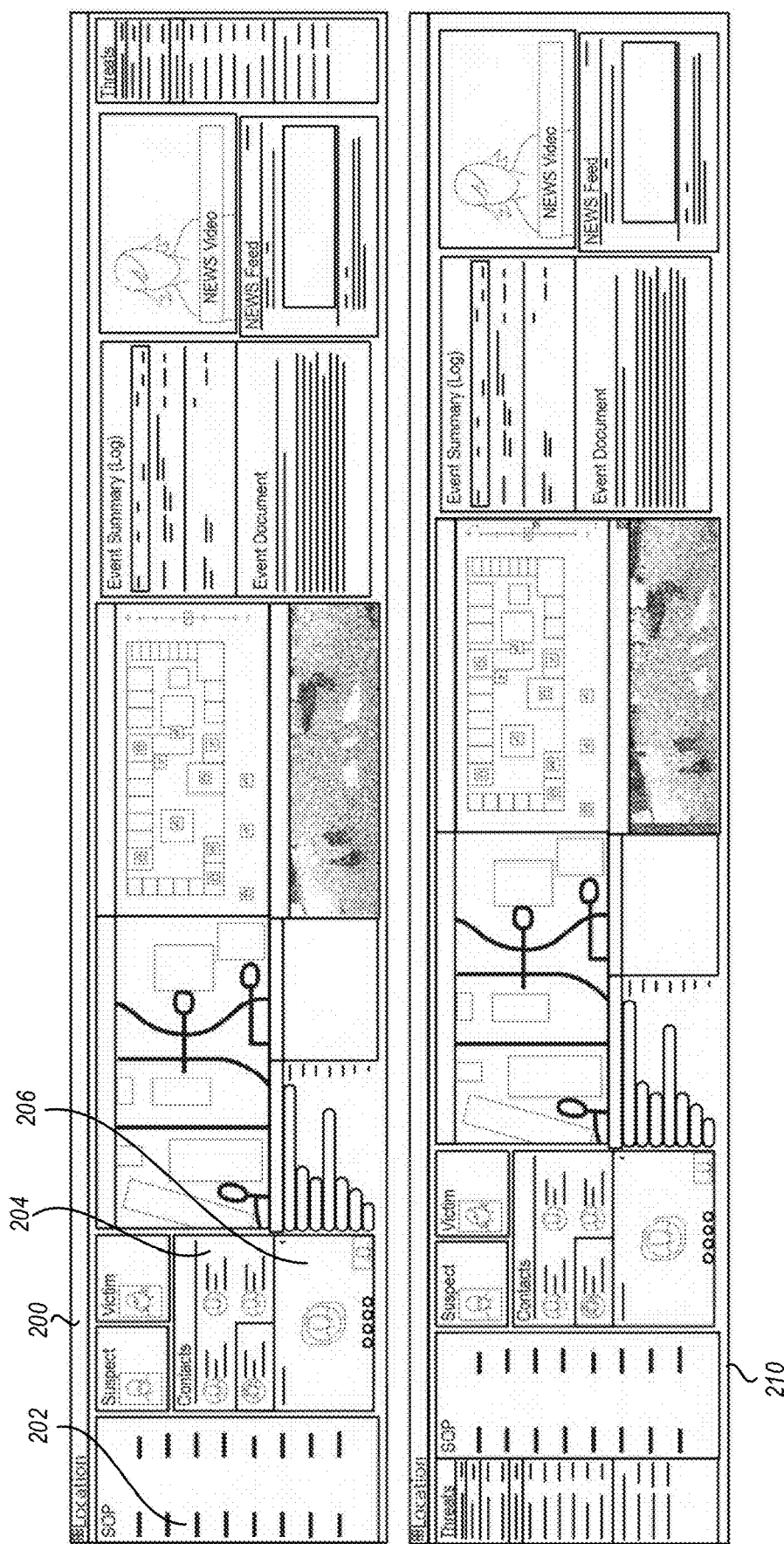
FIG. 2 illustrates two examples of a canvas interface.

In some embodiments, a dynamic canvas is utilized to access and display content from a plurality of different systems. The display and format of the canvas, including the selection of content displayed by the canvas, is dynamically based on the context of an event and which may be additionally based on the user role associated with the event. Various non-limiting examples of scenarios corresponding to different types of events are illustrated in FIG. 2. It will be appreciated, that while these scenarios are fairly descriptive, they do not exhaustively limit the scope of this disclosure to only the limited types of event scenarios that are shown in FIG. 2. In fact, the scope of this disclosure applies to all types of scenarios, including education, ecclesiastical, academic, athletic, business and other types of events/scenarios that can benefit from the use of a management canvas interface that is contextually relevant and role specific.

As described herein, various templates associated with different event types and user roles are utilized to identify and generate, display and update customized and contextually relevant canvas displays. The canvas is built in accordance with a contextually relevant template that defines which content frames or tiles will be rendered on the canvas and how they will be rendered. In particular, the canvas and/or the canvas management and display systems will query for and populate the various frames and tiles of a canvas with relevant data, as defined by a contextually related template, and which is dynamically updated with information from the event creation consoles described herein. In some instances, the canvas is further customizable according to end user system capabilities and preferences.

In some embodiments, the canvas is dynamically modified in response to updated data that is detected by the canvas management system. The updated data can be pulled for the canvas from one or more remote systems in response to one or more specific requests (e.g., a client request to the canvas management system and/or a client or system query for data from remote systems for canvas/event relevant data). The updated data can also, in some instances, be pushed to the canvas by one or more remote systems without a specific request being issued for the updated data by the client system that accesses the canvas or the canvas management system that generates and deploys the canvas to the client.

Updated data received for the canvas will, in some instances, cause the canvas to render a new frame or tile and/or resize or update an existing tile. In some instances, the updated data will trigger a modification to the current display of one or more existing tile (e.g., change a size, position, coloring, highlighting or other display attribute of the tile). Changes to an entity role assigned for an event corresponding to the canvas or a change to an event classification can also trigger the dynamic modification of the canvas, as well as the generation of one or more new canvas, and the display of correspondingly relevant data. The modification or generation of a canvas may also include, in some instances, the selection and use of a new canvas template by the canvas management system. Interface elements are provided within some event canvas interfaces for assigning and/or changing entity roles and event classifications.

In some embodiments, the granularity of information presented in the frames or tiles of the canvas will be controlled by the templates and correspondingly identified end user roles. For instance, incident or event manager entities will have access to a greater amount of incident/event data in their canvas views than will be provided to particular event responders and/or resource entities within their canvas views for the same events.

In some instances, the event manager canvas will include visibility to incident protocols, logs, status identifiers, assigned/affected personnel and/or other information that is relevant to evaluating and managing an incident. The canvas may also include communication interfaces for linking with one or more responders or other role entities. In some instances, the manager canvas view will provide access to multiple different event canvas views for different events.

The event responders and other role entities will only have restricted or filtered access to a subset of the event data that is accessible to the manager entities and, in some instances, access to only one or a limited set of event canvas views or event data. In some instances, different entities having different entity roles will be presented correspondingly different filtered/contextually relevant views associated with their specific roles.

The information displayed in the different views will enable the operators in multiple locations to share access to the same/relevant information (if applicable) and different but related information (when applicable) to facilitate collaboration and cooperative management of virtually any operational scenario.

FIG. 2 illustrates two examples 200 and 210 of a canvas interface. This canvas interface includes a manager view 200 that has access to a plurality of different incidents/events that are identified in a list of incidents 202. When a manager selects one of the incidents 202, then the various frames/tiles in the canvas 200 are updated to reflect relevant data. For instance, a fire event will trigger the selection and display of tiles/frames having different sets of data corresponding to the fire and which may be obtained from disparate sources, including for example, contact information for the local fire department, controls for alarm systems, controls for sprinkler systems, controls for ventilation systems. Alternatively, when an event is a flood, different data might be accessed and displayed, including water pressure settings for plumbing in a building, electrical controls for shutting down water sources, contact information for flood disaster responders, etc. By way of further example, an event/incident comprising a hurricane might trigger the display of a hurricane relevant canvas which includes tiles showing news reports and weather reports as well as contact information for disaster recovery personnel in the geographic location of the hurricane, maps, live camera feeds, etc.

FIG. 2 also illustrates how a different canvas view 210 may contain the same data and/or tiles, only being scrolled to a different alignment position. The scrolling may be performed manually or automatically in response to detected conditions for modifying the canvas display, as described below. Notably, in this regard, the canvas includes all content that has been identified as being relevant to a particular scenario. So, rather than hiding some of the content off of the display screen (as some canvas displays do), many of the current embodiments include all relevant information on the display screen. When information is determined to be relevant and there is not room for it to be displayed, then the system may replace less important information, by swapping out tiles, and or the system may resize, reposition or consolidate different tiles to create room for the new relevant information. In some alternative embodiments, less important/relevant information tiles are moved off the screen display area, to an undisplayed portion of the canvas.

In other embodiments, the two illustrated canvas views 200 and 210 contain different data that is accessible by further scrolling the extensible canvas. The different data will be contextually relevant to the specific role of the associated entity. For instance, if the entity accessing the canvas is a fire responder, they may have access to schematics obtained for the building on fire. Alternatively, a property manager for the building will be provided different information, such as inventory data base information associated with inventory contained in the building.

The canvas views shown in FIG. 2 illustrate some additional types of tiles that may be presented in the canvas views, including contact tiles 204 for contacting or learning about entities associated with an event and/or for assigning entities to roles associated with the event. In some instances, the interface will also include controls 206 for initiating communication with the entities identified in the canvas by launching communication devices/applications on the client system (e.g., telephony or email applications). It is appreciated that canvas 210 may include all, some, or none of the same tiles described above.

Additional features of contextually driven event canvases will be provided in more detail below, with an example canvas interface scenario presented and described in reference to FIGS. 5-17.

It will be appreciated that by providing a single system that is able to generate contextually relevant canvas displays, a SOC and other system will be able to manage and respond more quickly to dynamic events. This will also enable operation managers and responders to collaborate and make more accurate decisions based on the accessibility to the relevant data provided through the current systems and interfaces. The customized and contextual canvas interfaces of the present disclosure are particularly advantageous when compared to existing SOC systems that present disparate data on completely different/dedicated screens. With the current system, it is possible to access and navigate all relevant data within a single intuitive and contextually relevant canvas interface.

High Level System Architecture

Figure 3:
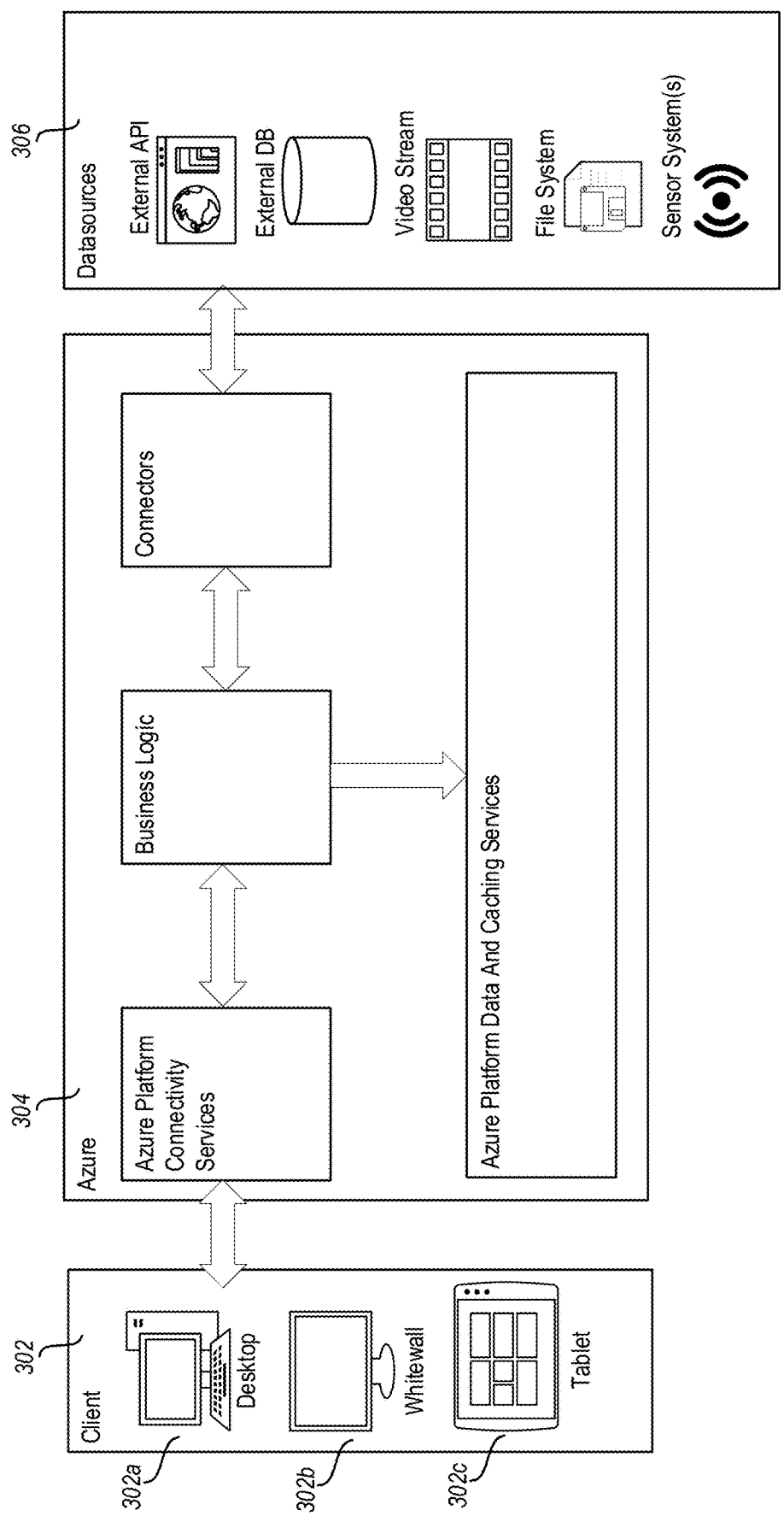
FIG. 3 illustrates a high-level architecture of disclosed systems.

FIG. 3 illustrates a high-level architecture 300 of disclosed systems that are used to create, modify and manage the canvas interfaces. As shown, a client 302 which accesses a canvas interface is configured with one or more display devices (e.g., a tablet 302c, whitewall 302b, desktop 302a, etc.). The client 302 is connected to a server system 304 that comprises a canvas management system configured to create, modify, deploy and modify event canvas interfaces. In this embodiment, the server system 304 is configured in a cloud network, such as Microsoft's Azure network. The server system utilizes the cloud platform services installed on the cloud, as well as business logic and connectors to interface with one or more data sources to create, modify, deploy and modify the event canvas. The system also includes and utilizes cloud data and caching services 306 to store the instances of the canvases that are deployed, as well as the data structures used to determine relevant context and data for the canvases, as generally described in more detail below.

Detailed System Architecture

Figure 4:
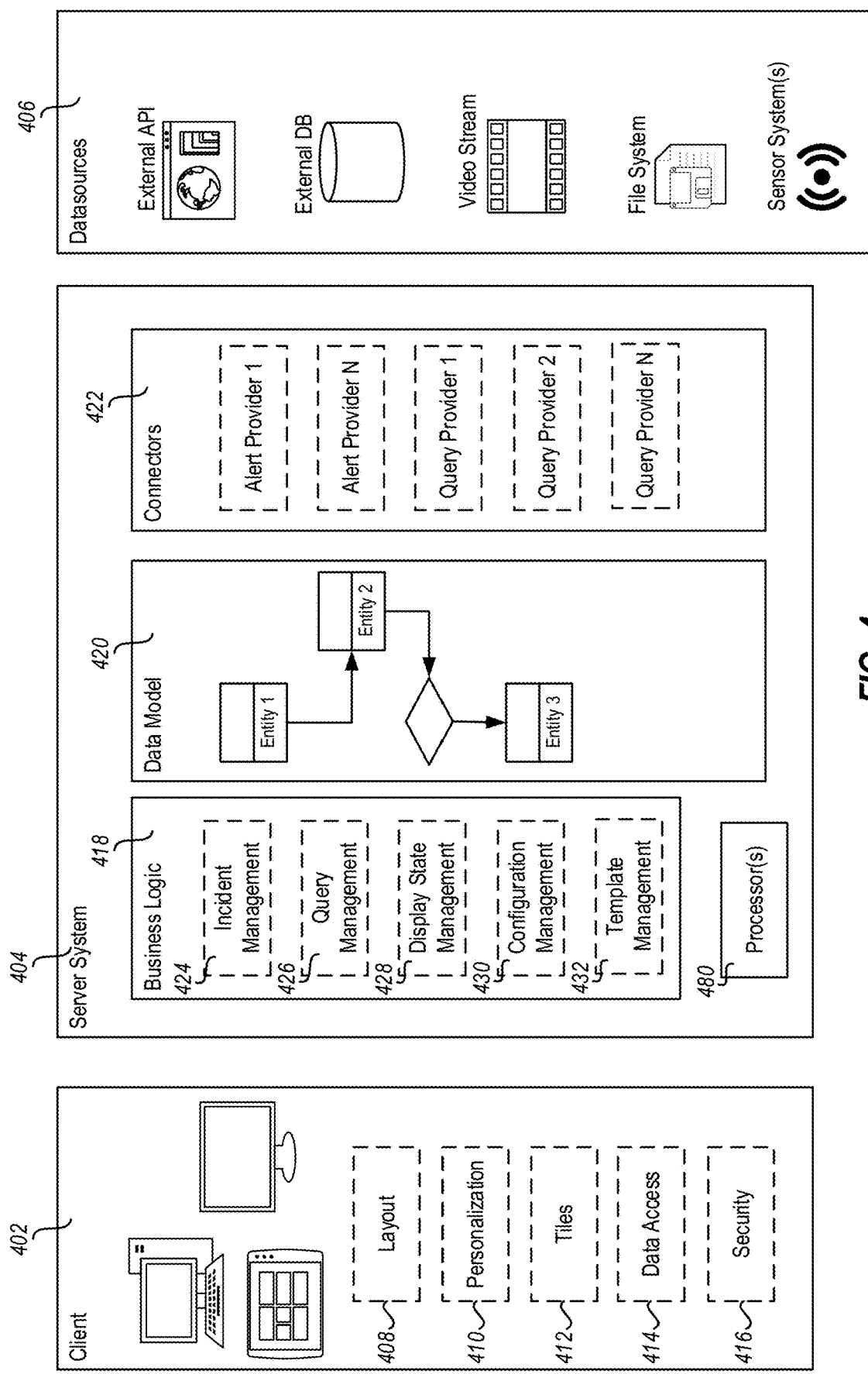
FIG. 4 illustrates a more detailed system architecture of the disclosed systems.

FIG. 4 illustrates a detailed system architecture 400 of the disclosed systems referenced throughout this disclosure, similar to the system described in reference to FIG. 3.

As shown, the detailed system architecture of FIG. 4 includes a client system 402 that is in communication with a server system 404 (which may be, for example an Azure system). The client system 402 and/or the server system 404 are further connected through one or more network connections to a combination of data resources 406, which may include any combination of remote and/or local data sources. Currently, the data sources/resources 406 are shown to include various external APIs, databases, video streams, file systems, sensor(s), or sensor system(s). It will be appreciated, that these data resources can include any combination of live and/or stored data and may be obtained in different formats from different types of sensors, cameras, storage locations and software interfaces. The types of data that are accessible to the server system 404 for display on the canvas are not limited to any particular data type shown. For instance, by way of example, the canvas is not restricted to accessing and displaying video data. Alternatively, the data resources can also include audio data and/or still images.

The client system 402 includes various hardware and software interfaces, including display screens and graphical user interfaces for displaying content provided by the server system. The client system 402 includes various components that are instantiated and utilized by hardware processors of the client system executing stored executable instructions to implement the disclosed functionality of the various components. The various components include layout components 408, personalization components 410, tile components 412, data access components 414, and security components 416. In some instances, one or more of the disclosed client components are part of a canvas user interface operating at the client 402. In other instances, one or more of the disclosed components are executed at the client system 402 to interface with a user interface canvas that is provided as a service and that is hosted by one or more remote system(s), such as the illustrated server system 404.

The layout components 408 enable the client system 402 to customize the layout of the canvas display by interfacing with the server system 404 to dictate the type of client system, the type(s) of display(s) and quantities of displays used by the client system (which may include 1, 2, 3 or more than 3 monitors of a same or different type/configuration), as well as the display properties of the various monitors and client system, such as resolution, accessible display drivers, etc., as well as the display area of the monitor(s) to be used to render the canvas. In some instances, the layout components 408 also identify the types and locations of the different boundaries of the display area (e.g., application frame/window boundaries, monitor border boundaries, adjacent edge boundaries, user defined boundaries defined by explicit user input to include or exclude portions of the display area for the canvas display, etc.).

In response to identifying and communicating this information to the server system 404, the server provides the appropriate layout of the canvas that is suitable for and ultimately deployed for display on the client system(s) and which enforces/complies template restrictions, such as a restriction for tiles of the boundary non-spanning type to be rendered in such a way that they do not span a particular boundary in designated display area that is defined as a prohibited boundary by the boundary non-spanning display property of the boundary non-spanning tile type, and as described in more detail with regard to FIGS. 29-34, below.

The personalization components 410 of the client system 402 include controls for enabling the client system to resize the canvas, change a display resolution of the canvas at the client, and to change other display properties of the canvas, such as color schemas. In some instances, the personalization occurs by sending requests to the server to make the change. In other instances, the changes are made at the client.

The tiles component 412 include display features that enable the client to select and manipulate tiles that are displayed within the canvas being deployed by the server and that is rendered at the client. For instance, a user can select and move a tile within the canvas and/or resize a tile within the canvas by using controls and interface components at the client. Any changes made to the tiles can be recognized and persisted by the server for a current deployment of the canvas to the client system and/or for future deployments of the canvas.

In some instances, the tiles component 412 enables a user to selectively modify a type and/or priority of the tile, such as by selecting a menu object rendered with the tile (e.g., in a top corner of the tile) and/or by right clicking on the tile (not shown), and which, when selected, triggers a display of one or more selectable type and/or priority for the corresponding tile and which, when selected, triggers the change in priority of that tile and/or the status of the boundary non-spanning tile property (active/inactive) for that tile within the template/canvas layout. Such a change will also trigger modification to the display position/size of at least one tile in the canvas, as described in more detail below with reference to FIGS. 29-34.

The data access components 414 include software for accessing and rendering different types of data in different formats. In some instances, for example, the server system will provide a canvas with one or more tiles or frames to be populated with data that is accessed directly by the client system. In such instances, the server may provide links to data that the client system will query for and obtain through a browser or other software. In other instances, the server may provide data to the client in a restricted state (e.g., encrypted or locked) and that can only be rendered after processing by specialized software at the client that formats and renders the data in the correspondingly appropriate tiles. In some instances, the data access components also link the user's communication interfaces (e.g., email, messenger, telephony, etc.) to corresponding canvas frames or tiles to enable seamless communication by the client with one or more entities associated with an event through the canvas interface. The data access components also examine/parse the content in some instances, to find explicit or implicit identifiers that can be used to trigger tile/canvas layout changes.

The security components 416 include credential management tools, such as certificate and authentication password managers that facilitate the client system accessing data that requires the certificates and passwords. The credential management tools interface with the server and/or remote systems, when necessary, to obtain access to restricted data that is available to the user based on the user's credentials. In some instances, certain canvas tiles and data are restricted to personnel having appropriate security clearances and will only be rendered in the canvas displayed at the client system when the client system has provided evidence of the appropriate credentials from the security components to the server. In other instances, the client system directly accesses restricted data by using the appropriate credentials (which may include decryption keys) to decrypt encrypted data received at the client system for display in the canvas.

The client system 402 may also include additional components, not shown, such as communication components for interfacing with and communicating over different network channels and interfaces.

The server system 404, deployed on a network such as an Azure platform, provides various business logic components 418, data model components 420, and connectors 422 and operates by executing stored computer-executable instructions contained within the various components by one or more processor(s) 480 of the system and which may also be integrated into the various server components which enable, among other things, the server system 404 to identify/generate/modify an appropriate template to use for deploying the canvas to one or more client systems and to access the relevant data to be rendered in the canvas at the client system(s).

The connectors 422 enable the system to be agnostic to the type of data sources and the data schemas used to access and display data. The connectors access the data from various data sources 406, regardless of data type, and use the data model to identify how the data should be presented and navigated through with the canvas interface and controls.

In some instances, the templates used to identify the data are also configured with code/instructions for interfacing with different types of data, such that the interface itself can interface with all different types of data. Further, in some instances, the system provides interfaces for receiving/accessing/storing templates from third parties and/or for facilitating the building of templates by a user utilizing template generation interfaces.

As shown, the business logic components 418 include incident management 424, query management 426, display state management 428, configuration management 430, and template management components 432.

The incident management component 424 identifies and/or classifies incidents based on detecting data associated with a particular type of incident. For instance, when data is received corresponding to monitored heat sensors and/or building sprinkler systems, the incident management component may determine a fire is occurring and may generate and/or update the client canvas displays accordingly, with appropriate frames corresponding to managing the fire event. In this regard, the incident management component identifies a context for the canvas displays to be generated and deployed. The incident management component also tracks and/or assigns roles to different entities for responding to or overseeing certain detected events/incidents. This may include triggering alerts to send to the entities, as well as the generation of appropriate contextually relevant canvas displays (new or modified displays).

The incident management component 424 also instantiates and controls the display, interaction and functionality of the interactive event/incident creation control consoles described herein, including the user interfaces/consoles described in reference to FIGS. 35-40. In this regard, it will be appreciated that the term interface is used interchangeably with the term console and the term event and incident are also used interchangeably herein.

The query management component 426 structures queries to the relevant data sources based on incident, its context, and other existing information to fetch data for building and/or updating relevant tiles. In some instances, the query management component structures queries with its own query generation modules. In some instances, the query management component also interfaces with one or more existing third-party browsers and/or other interfaces for generating the queries and/or for accessing the relevant data from the data sources. The query management component may also include interfaces and instructions for querying the client system about system capabilities and preferences. In some instances, the query management component also queries the client system/users for updated status information regarding completion of assigned tasks, availability to assist, inventory, and/or other data associated with an event response. Updated status information is used by the business logic to trigger modifications to and/or generation of canvas displays.

The query management component 426 also controls and manages the scheduled and unscheduled communications with the devices, sensors and other data sources that provide monitored system information to the system to detect events and to determine event context based on one or more detectable event elements in the monitored system information.

The display state management component 428 generates the canvas displays that are deployed at and/or viewed by the client systems. The display state management component controls the selection of an appropriate template from the template management component, which is contextually relevant to (1) an event, (2) role of an entity associated with a client system, and/or (3) client system display capabilities/preferences. The display state management component tracks entity roles and events, as well as system capabilities. In some instances, in response to detected updates to any of the foregoing, the display state management component will modify the current canvas being rendered on a client system and/or generate a new canvas. The display state management component also coordinates the display of multiple different canvas views for different entities (e.g., systems/users), which may correspond to a same event or different event and/or the different client system/user roles and/or system configurations.

The configuration management component 430 includes configuration controls for granting access to data that is rendered in the canvas displays. In some instances, the configuration management component controls which data is accessible to different entities based on credentials and/or assigned roles for the different entities.

The configuration management component 430 also controls menus and control elements provided with the canvas interfaces that enable control over how the data is accessed and used at the canvas interface. For instance, by way of example, such control menus may enable a user to swipe a screen to a different perspective of the same displayed data or may include trick play functionality for pausing, recording and playing streamed data. Controls may also be provided for enabling a user to select a tile or element in a tile to drill down and navigating to related data by initiating and triggering queries for new data in response to user interactions with the displayed data. The configuration management component controls these and other features for accessing and controlling how the data is used.

The template management component 432 maintains and/or controls access to different canvas templates stored at the server and/or remote systems. The template management component defines relationships and links between different types of incidents and the different types of canvas display formats and rules for rendering the canvas tiles (e.g., refrain from spanning certain boundaries for certain types of tiles, while allowing others to). In this manner, the system is capable of identifying an appropriate set of one or more canvas displays to use for rendering event data to different entities based on the context of the event, as well as the entities to render the canvas to. In some instances, a canvas type that is contextually relevant to a particular event will include multiple different canvas templates that are associated with different corresponding entity roles and/or system capabilities or configurations.

The template management component interfaces with the other business logic components to ensure the appropriate canvas display is selected and deployed for the appropriate entities and that is configured to render the canvas tiles according to specified rules (which may include dynamically modifying the template/canvas layout to ensure placement of the tiles in the canvas occur within the display area of the designated display system according to the specified template rules as defined by the aforementioned business logic, layout, and tile components). For instance, the specified rules may modify the template/layout of the tiles, based on the type of the tiles and the display system configuration (e.g., display area boundaries), so that particular tiles do not span certain boundaries associated with the display area, while allowing tiles of another type to span the same types of boundaries.

In some instances, the data rendered in one template is the same data that is rendered in another template, but in a different order or display presentation format, for example as illustrated in FIGS. 2 and 29-32. In other instances, a first template for a first event, which is associated with a first entity role, contains different data than a second template corresponding to the same event, but which corresponds to a different entity role. In some instances, the same data is rendered in different templates with different display properties (e.g., differently sized tiles, differently positioned tiles, different resolutions, etc.) The template management component 432 controls how the data is displayed.

When an appropriate template does not exist for a particular event that is identified by the server system 404, the template management component 432 will select a template that is most closely aligned with the type of detected event and/or assigned entity and use it and/or modify it. In some embodiments, when an appropriate template does not exist for a particular detected event, the template management component will default to an idle state template that provide general information associated with a particular location or entity. In the case where the system selects a template based on a best match or closest alignment, as described above, the system may employ heuristics, historical data, machine learning or the like to identify and rank existing templates against a currently identified event to identify a most contextually relevant template.

The data model component 420 includes one or more data models that define the schematic and dynamic relationships between different entities, entity roles, events and event resources and contexts. The data model is referenced by the system to determine a context for an event based on detecting event identifiers (e.g., tags, metadata, and parsed data) contained in or with detected/monitored event data. When event data is received, the system analyzes/parses the data to identify the event identifiers. Then, the system uses these identifiers to determine a context for the event. The event data may include, in some instances, the entities associated with the event. In such instances, the entity information comprises part of the determined event context. Otherwise, the data model is used to identify the relevant entities associated with an event.

Once an event context is determined and/or the event identifiers are detected, the system can identify/build/modify/select the contextually relevant template to use for deploying the contextually relevant canvas for the entities associated with the event and dynamically customized for a particular type of end user display system configuration and/or configured to be dynamically customized during distribution/rendering by the various end user systems according to their particular display system configurations (e.g., single monitor, multi monitor, partial/full monitor(s), etc.).

In some instances, the template is referred to as a canvas layout, layout presentation, or canvas layout presentation. The templates identify and control the different types of tiles that are used to render content and their relative placement in the layout presentation to be rendered on a designated system, such as a multi monitor system. In some instances, different templates are created for the same canvas to correspond with different monitor configurations. In other instances, a single template includes enough code that is executable during distribution and/or rendering with other business logic components 418 that are used during the distribution/rendering to cause the single template to be modified and rendered differently on the different system configurations according to the rules/definitions of the business logic and/or template when distributed and/or rendered.

The various templates and the business logic 418 can be stored by the system in one or more of the local or distributed storage devices accessible by the system.

The data model 420 also includes, in some instances, hierarchical trees with different granularity perspectives of the different data that will be displayed or linked in the canvas and which can be used when building the canvas to support drill down functionality (e.g., hierarchical structure layouts, maps, schematics, incident types, camera views, support levels, inventory, personnel, business organization, etc.).

Example Scenarios and Canvas Descriptions

FIGS. 5-17 illustrate various embodiments of an event canvas and example scenarios. These figures will be referenced to illustrate some of the functionality that is enabled by the dynamic canvas systems of this disclosure.

Figure 5:
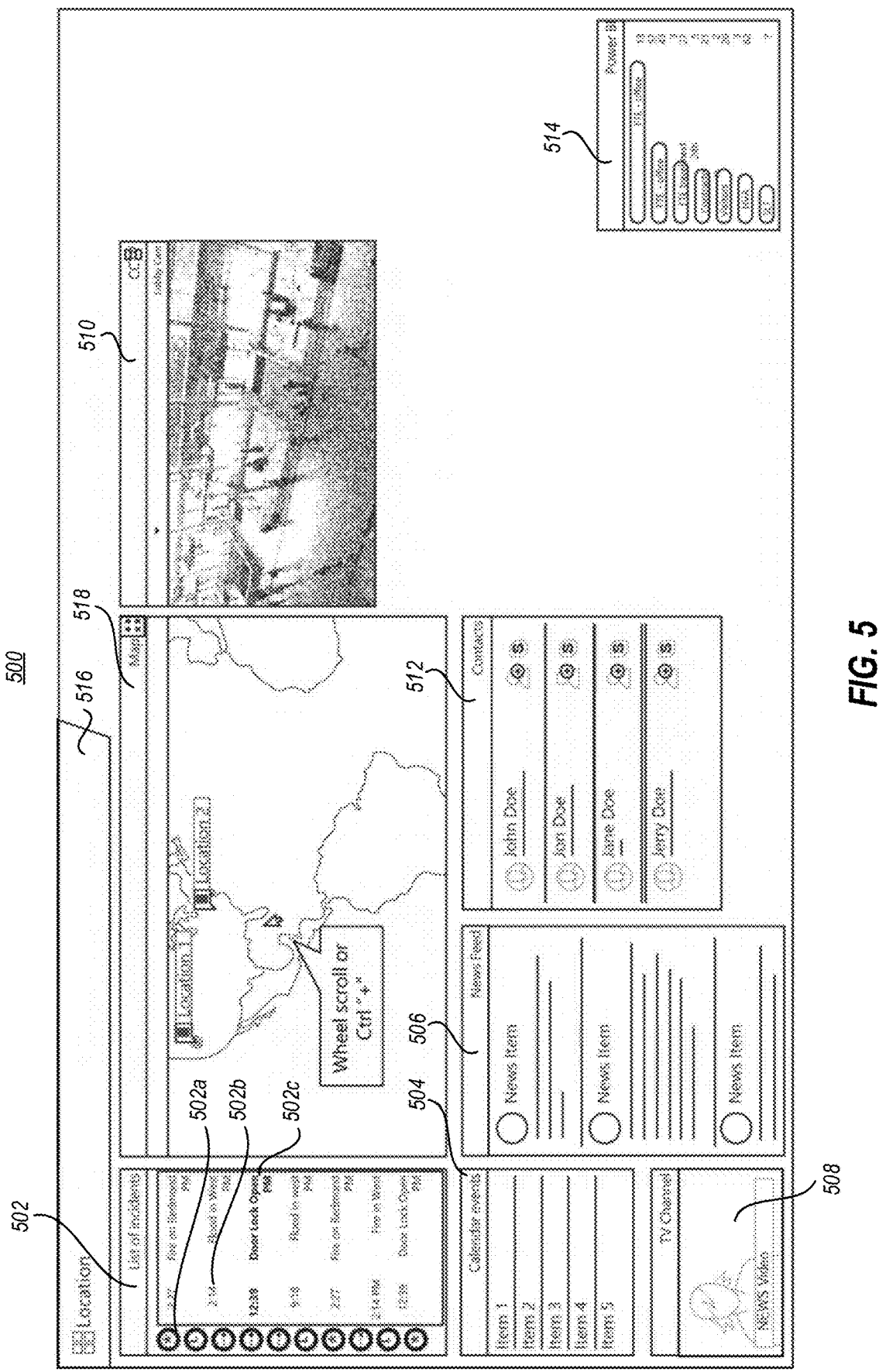

FIG. 5 illustrates one example of a canvas interface 500 that includes a plurality of tiles, also referred to as frames, that contain different types of data. For instance, the tiles include a list of incidents tile 502 that includes different incidents that have been detected and that are being managed. This tile might be available on a manager canvas interface, but not a responder interface, in some instances. In some embodiments, the incidents being managed are identified and rendered with one or more status identifiers, such as the illustrated identifiers 502a, 502b, and 502c shown in conjunction with the first of numerous incidences listed within the list of incidents tile 502. These identifiers can be used to reflect any type of status, such as active status, paused status, processing status, critical or non-critical status, entity assigned status and/or any other relevant status. The indicators may also include timestamps, short descriptions, categories, or other referential data. The indicators may also comprise icons or other identifiers that identify users/groups assigned to the event, such as incident responders.

The tiles also include a calendar events tile 504 that includes scheduled events, a news feed tile 506, a news video feed tile 508, and a security video feed tile 510. A contacts tile 512 is also presented, with links to contacts that are determined to be relevant to the incidents and/or entity role contexts determined by the system.

A power BI tile can 514 include information associated with personnel or assets associated with the incidents and/or that are associated with the entity role contexts determined by the system. Additionally, or alternatively, the power BI tile can include other types of quantitative information.

Other tiles and objects include a ribbon 516 with relevant time, date, weather and connectivity identifiers.

Finally, the current interface includes a map tile 518.

Figure 6:
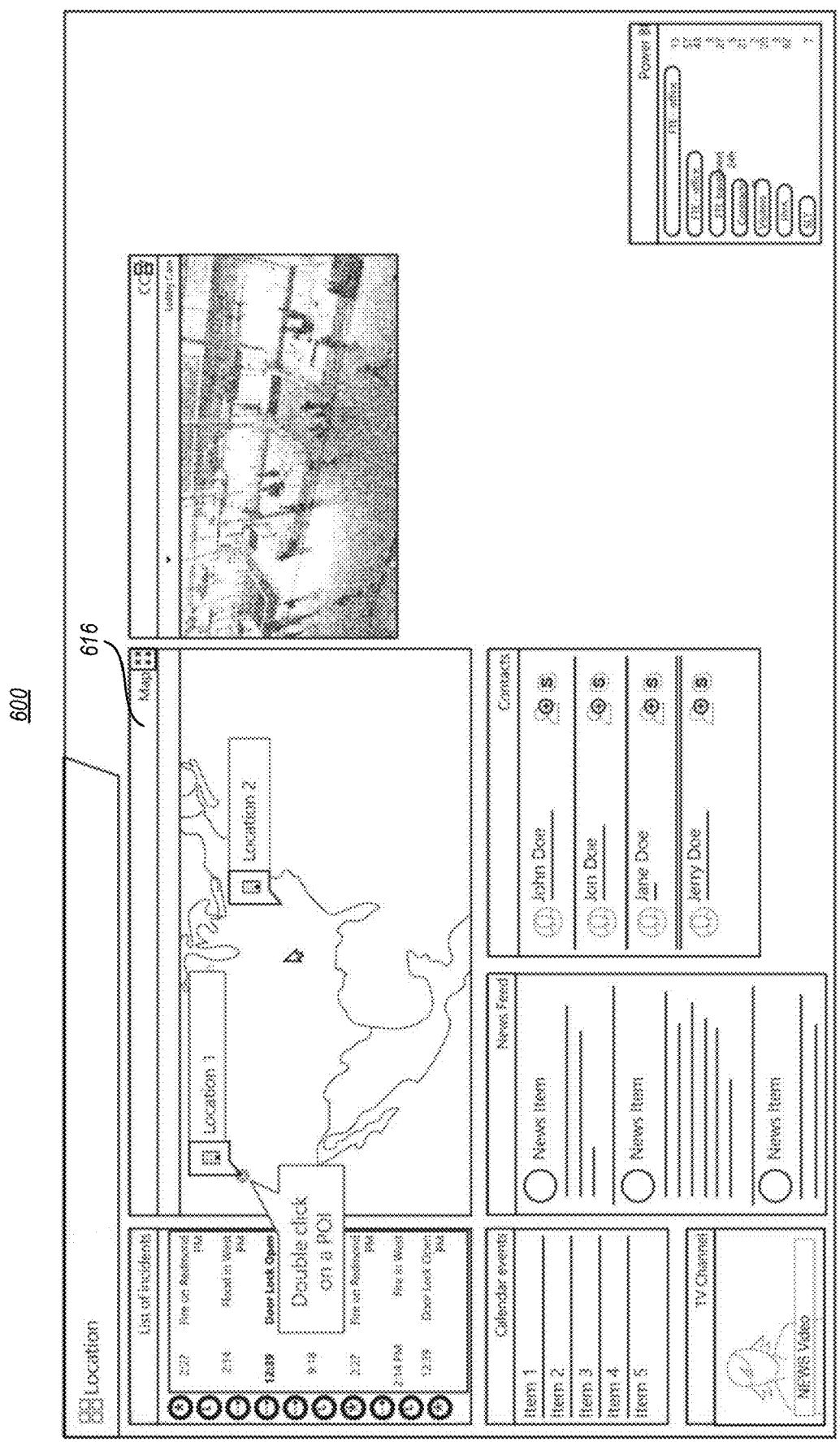

FIG. 6 illustrates a similar interface 600 to FIG. 5 except the user has zoomed in on the displayed map in the map tile 616 by selecting a zoom option (such as through a right-click menu, not shown) or by providing other zoom input through a keyboard, mouse, speaker, gesture detection camera system and/or touch screen.

Figure 7:
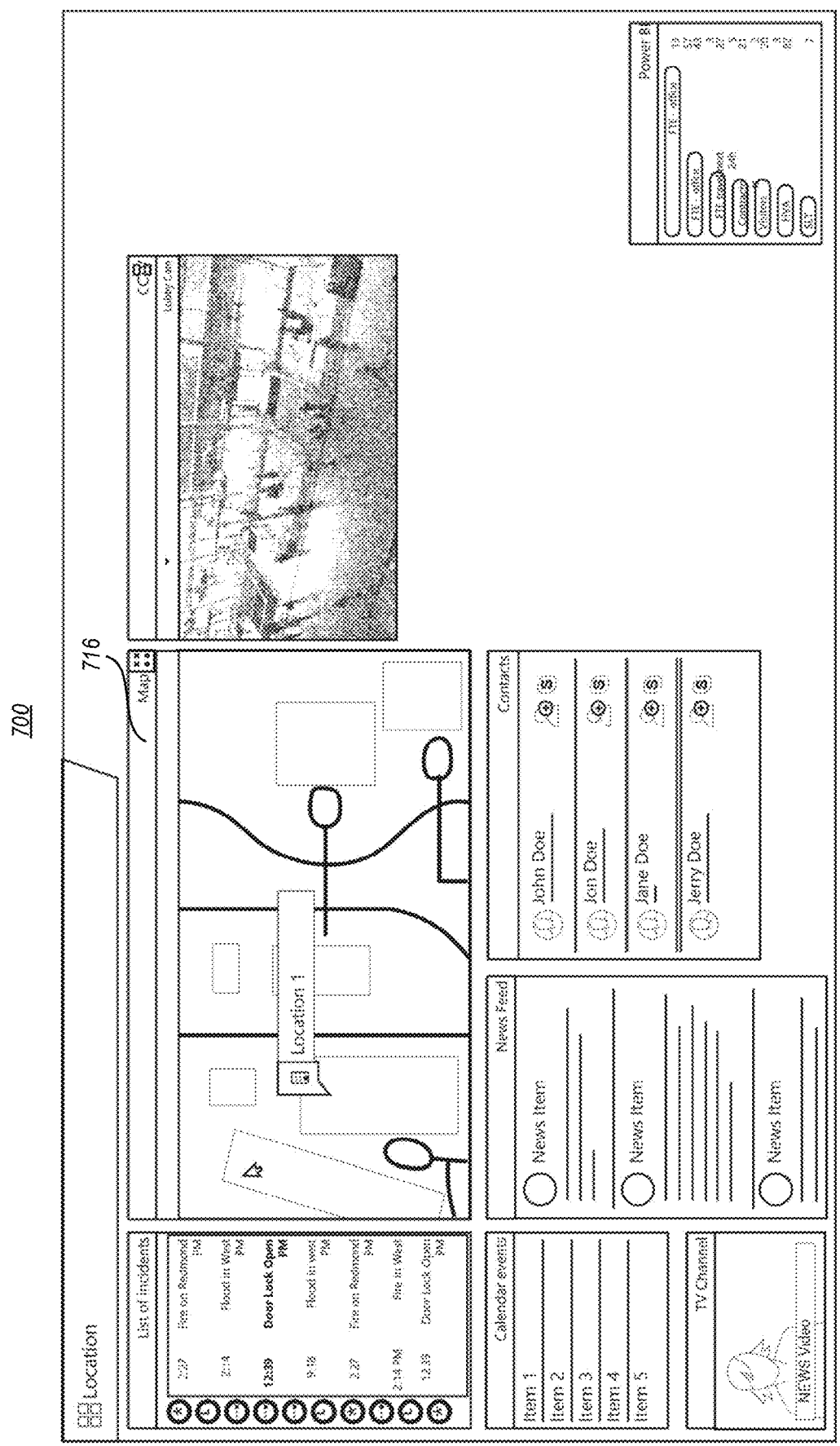

FIG. 7 illustrates a further zoomed configuration 700 of the map tile 716, which is rendered in response to further zoom input and/or a selection of an object or location within the map tile 716.

Figure 8:
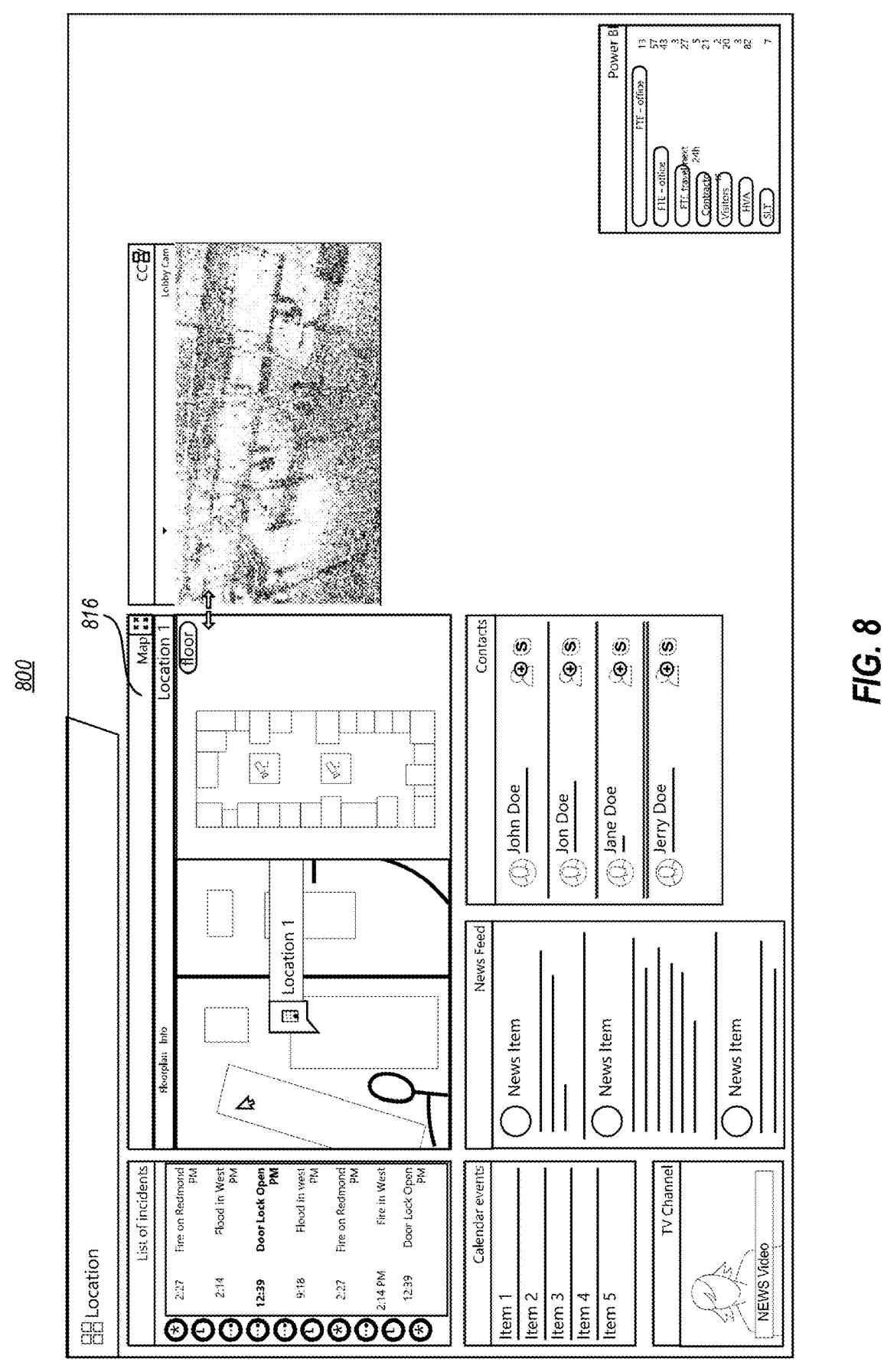

FIG. 8 illustrates an interface 800 in which the map tile 816 has been modified to reflect a floor plan of a building object that was selected from the map tile. The system accesses related and supplemental data like the floor plan by accessing linked data or by querying for related data identified by the data model described above. Other data reflected in the other tiles can also be access and displayed in a similar manner.

Figure 9:
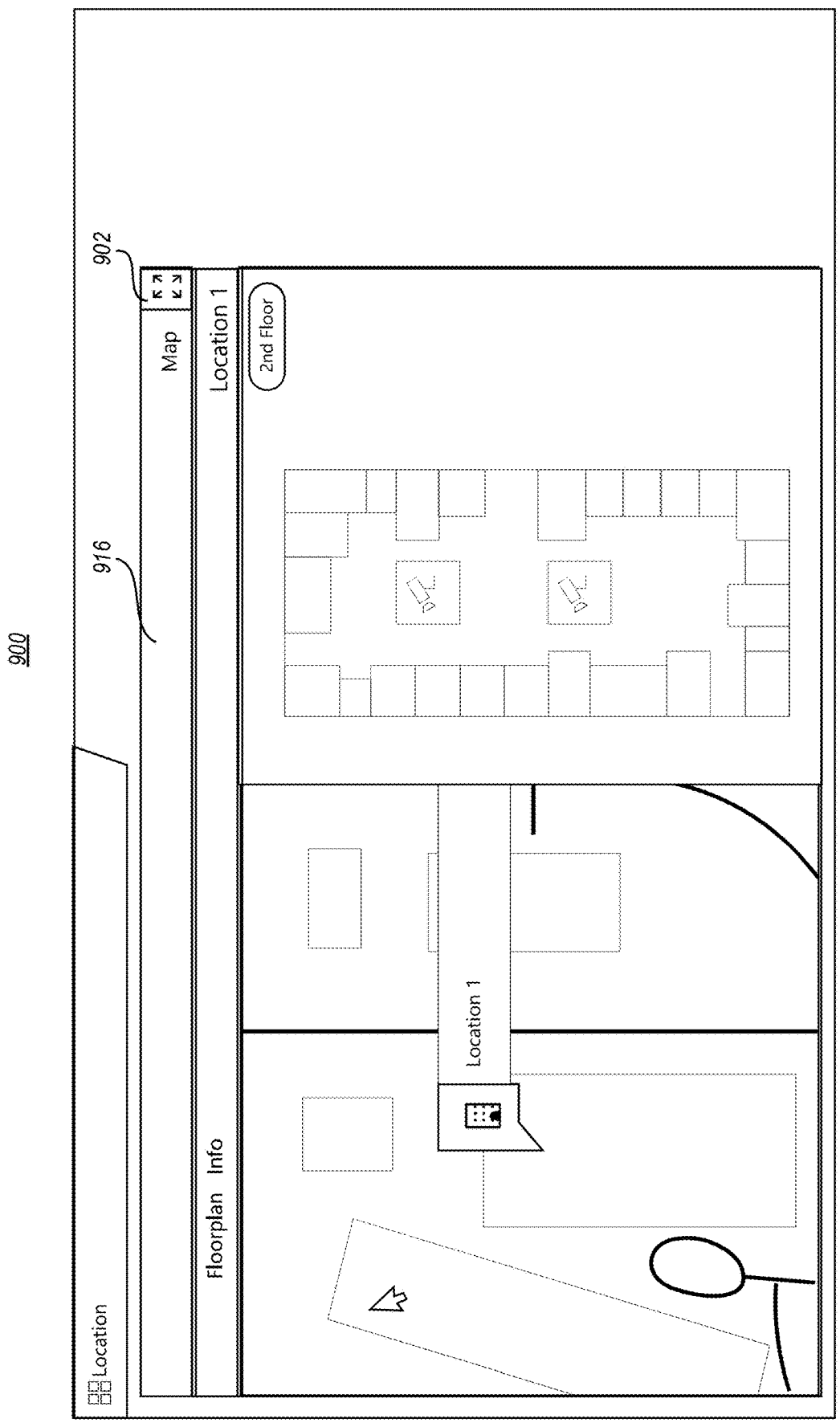

FIG. 9 illustrates an embodiment of a tile display 900 within a canvas in which a user selects a control for expanding the map (now floorplan tile) 916. This may occur by selecting a zoom command from a menu (not shown) and/or by entering a further zoom command (e.g., ctrl/scroll, double click, touch screen gesture, selection of a resize icon, etc.) For example, the user may select an expand control 902 to cause the map tile 916 to enlarge within the tile display/canvas.

Figure 10:
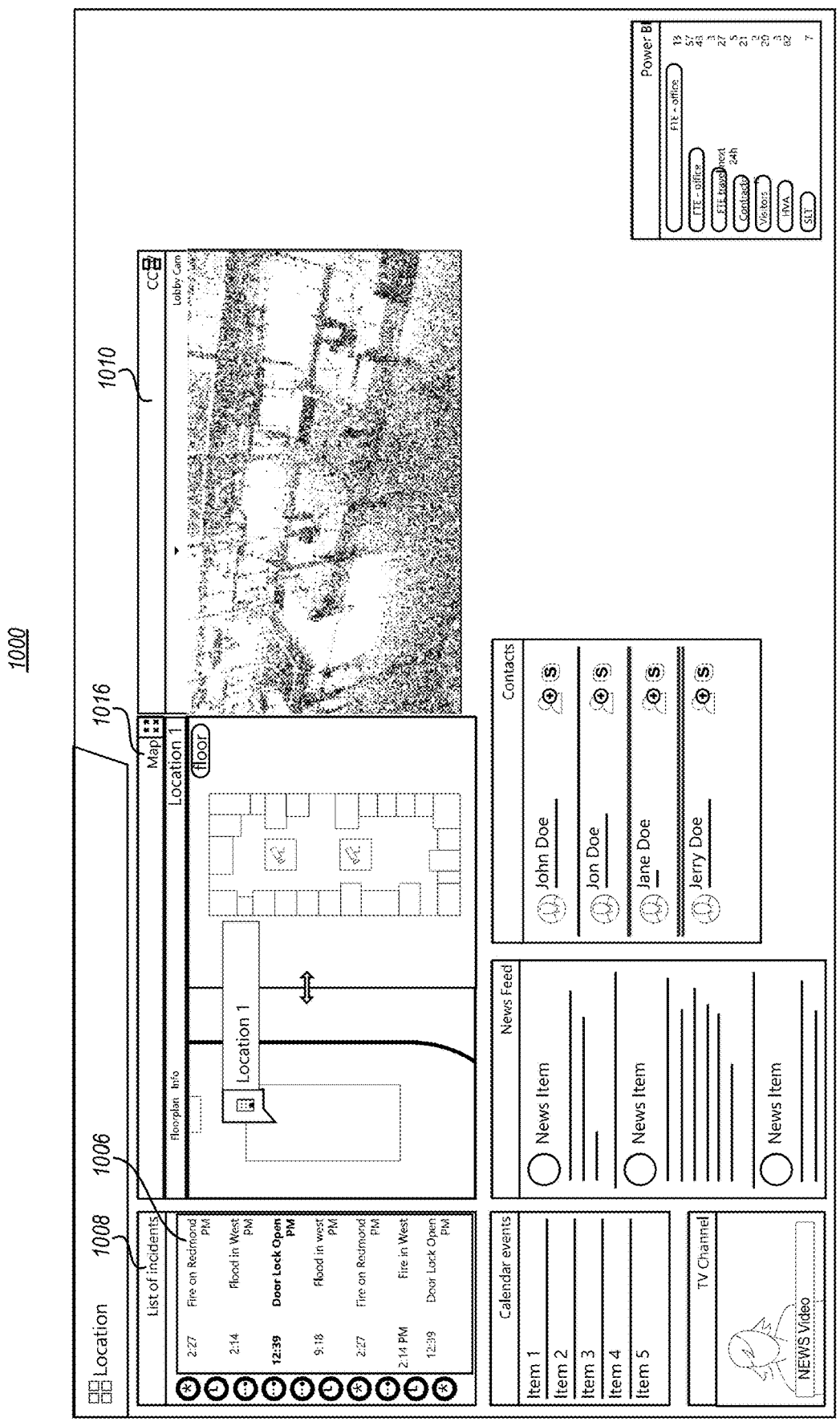

FIG. 10 illustrates an embodiment 1000 in which resources like cameras are identified in a tile (e.g., the floorplan tile). For example, in floorplan tile 1016, the locations of two security cameras 1002 and 1004 within the floorplan are illustrated. In some instances, the resources that are identified and displayed are selected from a plurality of available resources based on a detected context. Here, for example, a security threat or disaster context, such as the incident 1006 shown in the incident list tile 1008, that is based on sensor information received in a location proximate the cameras 1002 and 1004 will trigger a display of the cameras and/or other resources that are relevant and proximate the detected incident, for example in closed circuit camera (CCC) tile 1010.

Figure 11:
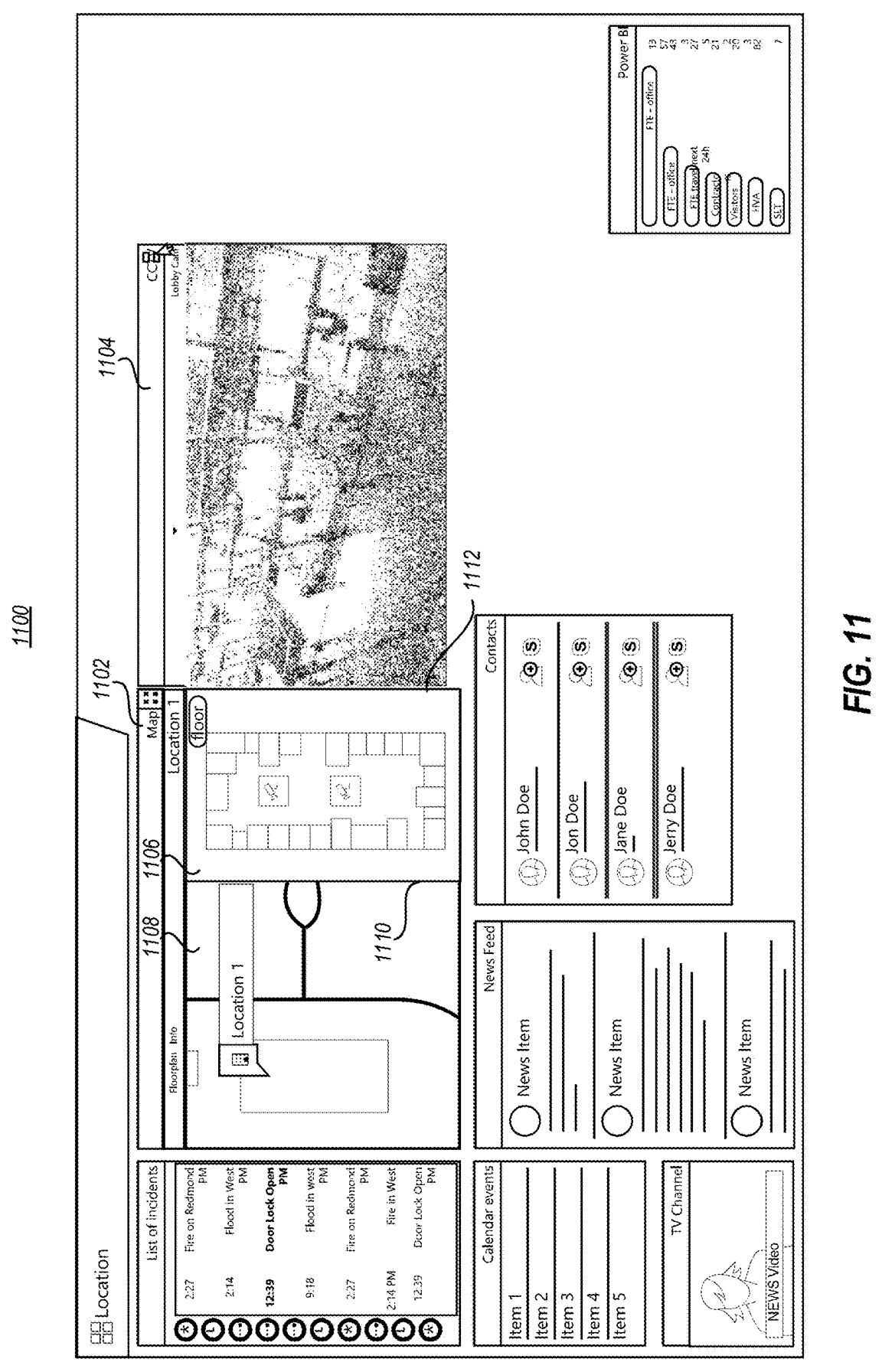

FIG. 11 illustrates an embodiment 1100 in which a floorplan tile 1102 and the CCC tile 1104 are resizable. The resizing can occur for the dimensions of the tile frame (e.g., for the lobby cam) and/or for the scaling size of the content within a tile, without changing the tile dimensions (e.g., as shown for the floorplan tile). For example, the individual tiles (e.g., the floor plan tile) can sometimes be split into several individual and related display elements in response to user input. As illustrated, floorplan tile 1102 has been split and displayed in complete floorplan view 1106 on the right side and partial floorplan view 1108 (e.g., a zoomed in version) on the left side. Notably, both views within floorplan tile 1102 are shown simultaneously in response to user input and/or detected event/context identifiers associated with the partial portion.

FIG. 11 also illustrates that a single tile, such as floorplan tile 1102 may include a resize element 1110 that allows views within the single tile to be resized without affecting the overall size of the tile. As illustrated, resize element 1110 may be selected by a user and, in this example, moved left or right to reduce or enlarge the respective views that boarder the resize element. For example, if resize element 1110 is selected and moved left by a user, view 1108 is reduced in size while view 1106 is enlarged. Notably, this internal tile resizing does not affect the overall dimensions of the floorplan tile 1102.

FIG. 11 also illustrates a resize element 1112 that forms a part of the boundary of floorplan tile 1102. As with resize element 1110, a user may operate resize element 1112 to move the boundary left or right. However, in this case, moving resize element 1112 left or right respectively decreases or increases the overall dimensions of floorplan tile 1102. However, because of the nature of the disclosed canvas, moving resize element 1112 either direction does not obscure CCC tile 1104 (e.g., when resize element 1112 is moved right), nor does it create unused empty space between floor plan tile 1102 and lobby cam tile 1104 (e.g., when resize element 1112 is moved left.) Instead, when resize element 1112 is operated, tiles that boarder the element are automatically modified to ensure that the content appropriate for the context of the canvas is maintained.

In one example, resize element 1112 is moved to the right. In this example, floorplan tile 1102 is caused to increase in horizontal width based on the degree of resizing that occurs. At the same time, CCC tile 1104 is modified in order to maintain the requirements of the context specific template. One way this may be accomplished is by moving the entire CCC tile 1104 to the right as the resize element 1112 is operated. In this example, the overall size of CCC tile 1104 is maintained and only its location is modified. However, based on the size of the canvas and other characteristics of the user system, it may not be possible to expand the size of floorplan tile 1102 and maintain the original size of CCC tile 1104 (e.g., the screen of the system may not be wide enough to allow both to occur.) In such situations, resizing floor plan tile 1102 may additionally cause a corresponding resizing (e.g., a reduction of size, in this example) of CCC tile 1104 in order to accommodate the enlarging of floorplan tile 1102. Notably, in some embodiments this occurs based on the underlying canvas recognizing the user's intent to resize one tile but without the user specifically indicating that another tile should be reduced.

Figure 12:
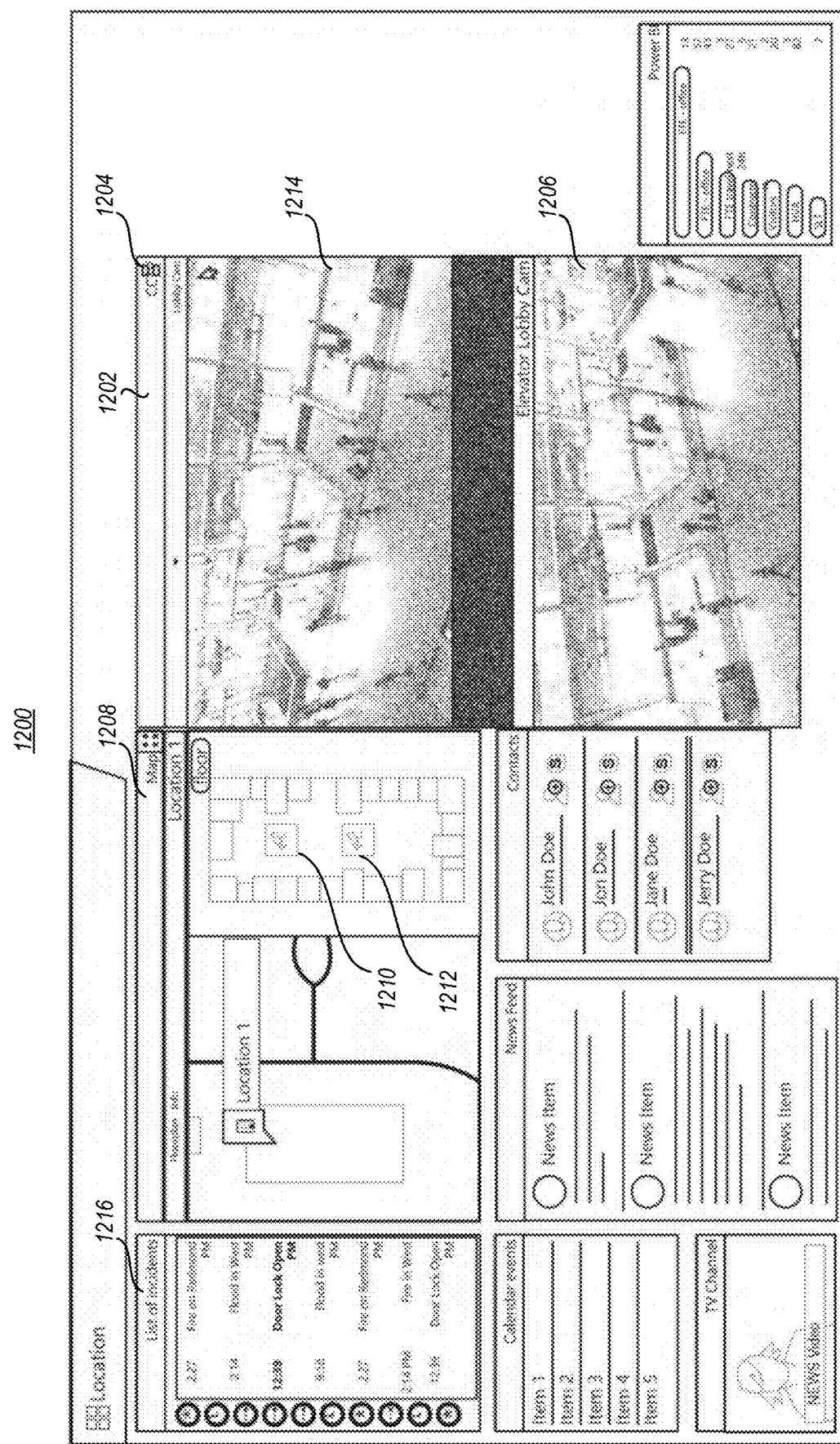

FIG. 12 illustrates a canvas 1200 where tiles may be presented with additional drill down controls and/or controls for modifying other canvas tiles that are displayed. In this illustration, the user has selected a drill down control 1204 within CCC tile 1202 for selecting different camera views to display on the canvas. When selected, the user may then be presented with a view options (not presently shown) such as an option to select a 1, 2 or 4 camera layouts. In response to selecting a 2-camera layout, the canvas generates a new/ additional camera tile 1206 that is contextually relevant to the incidents/events being managed and/or the entity role (e.g., the manager role in this instance).

It should be noted that the option to show multiple cameras may also be tied to the context of other tiles shown on the canvas. For example, a contextual menu (e.g., the contextual menu 1308 illustrated in FIG. 13) may present view options that are tied to the context of the floorplan tile 1208 that shows two cameras 1210 and 1212 and their location within the floorplan. Accordingly, when selecting the 2-camera view option from contextual menu associated with element 1204, the video feeds presented may corresponding to cameras 1210 and 1212, for example by showing the first video feed in tile 1214 and the second video feed in tile 1206, which correspond to cameras 1210 and 1212, respectively.

It is also noted that in at least one embodiment the floorplan tile 1208 is illustrating a particular portion of floorplan based on which incident is selected from within the list of incidents tile 1216. In this manner, the contexts of the tiles are interrelated in such a way as to aid the user in seeing contextually relevant information from a plurality of data sources based on how the user is interacting with one or more of the tiles.

Figure 13:
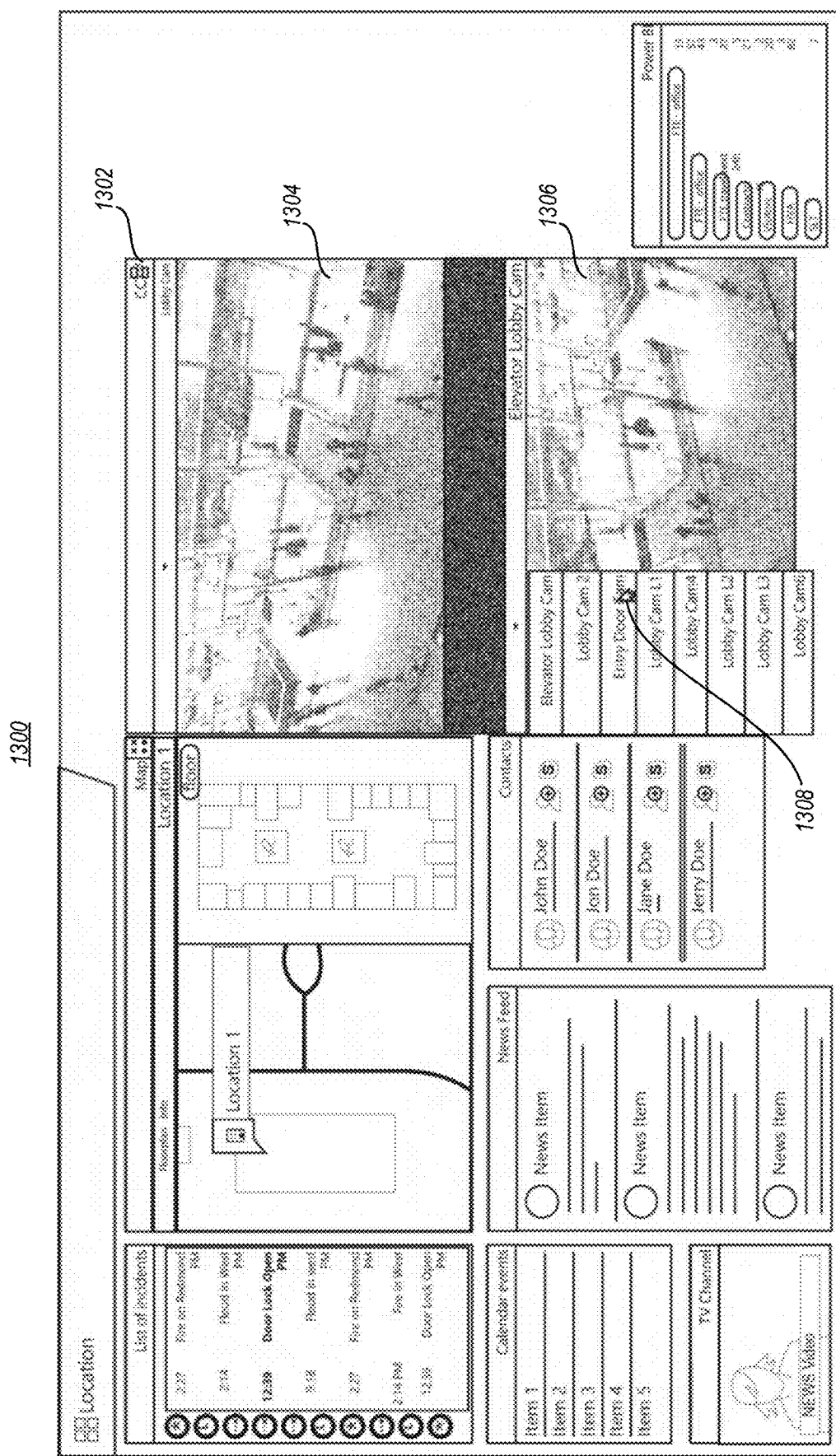

FIG. 13 shows an embodiment 1300 that extends the previous concept by illustrating how an internal view (i.e., the newly created camera view 1306 within the CCC tile 1302). Here, a user can select to change the display in a current or different tile by selecting and interacting with controls 1308 provided in a same or different tile. For instance, a user selects a control to present different camera views in a first view 1306 showing the "Lobby Cam" ( ) and a list of different views to select are presented in a different view. Notably, the selection tree menu options provided to the user for selecting different display options (e.g., different camera views) will be based on the context of the events being managed and/or canvas entity role(s). For instance, if the canvas context is for a fire in a stairwell, the camera views that are presented for selection will be the camera views associated with cameras proximate that stairwell.

It is also appreciated that the illustrated camera views 1304 and 1306 may be separate views within the same tile, such as CCC tile 1202. Alternatively, in some embodiments the CCC tile 1202 may spawn or otherwise cause a wholly new tile to be created. For example, in one embodiment, "Lobby Cam" identified as element 1306 may be a separate tile from "Elevator Lobby Cam" identified as element 1304. It is appreciated that based on whether a new camera is a new view or a wholly new tile allows the tiles to accommodate different features (such as resizing features discussed previously) as is appropriate based on the template used to present the context specific canvas to the user.

Figure 14:
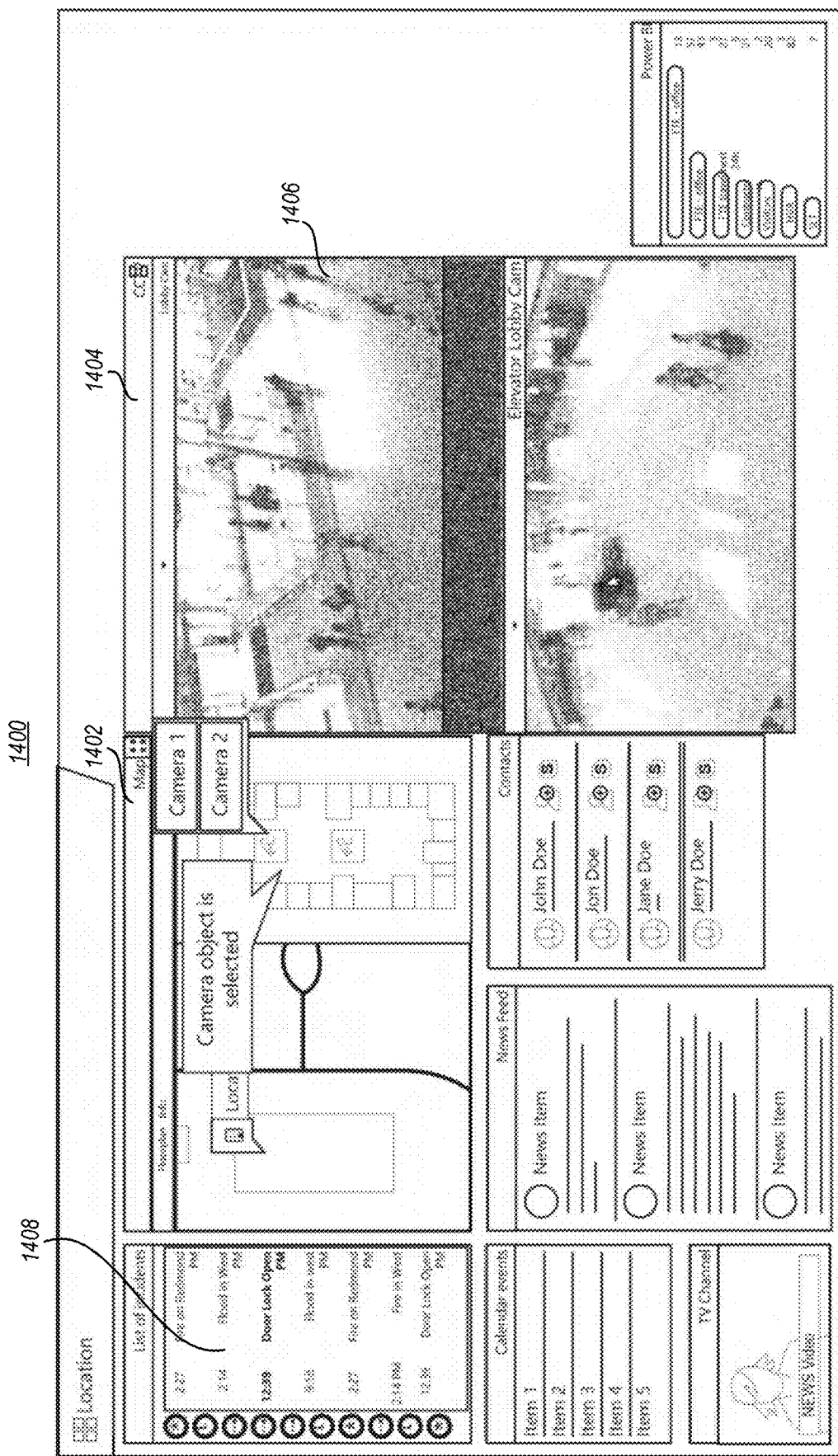

FIG. 14 illustrates an embodiment 1400 in which a user selects an object in the floorplan tile 1402. This triggers a change in one of the related tiles, namely changing the elevator cam view within the CCC tile 1404 to display the entry door cam view 1406. As described previously, this may occur by switching tiles (including the rendering object/frame of the tile), generating a new tile, or by changing only the content rendered by the existing CCC tile 1404.

In another embodiment, a user may transition a canvas from an idle state right (e.g., a state before a user interacts with any tile on the canvas) by, for example, moving a cursor over to the list of incidents tile and selecting or hovering over a particular event/incident for example the 2:14 flood event 1408. The selecting or hovering action reflects another way to get drill down information regarding the element (e.g., the flood event) that has been interacted with. In this embodiment, the selection or hover triggers a display of an assigned responder entity or, in other instances, a reporting entity. Once an entity is linked to an event, the system can automatically route communications and relevant data to the entity, such as through a separate and different canvas view. The separate canvas view might be a responder view that omits some of the data presented in the manager view, including the listing of incidents.

Figure 15A:
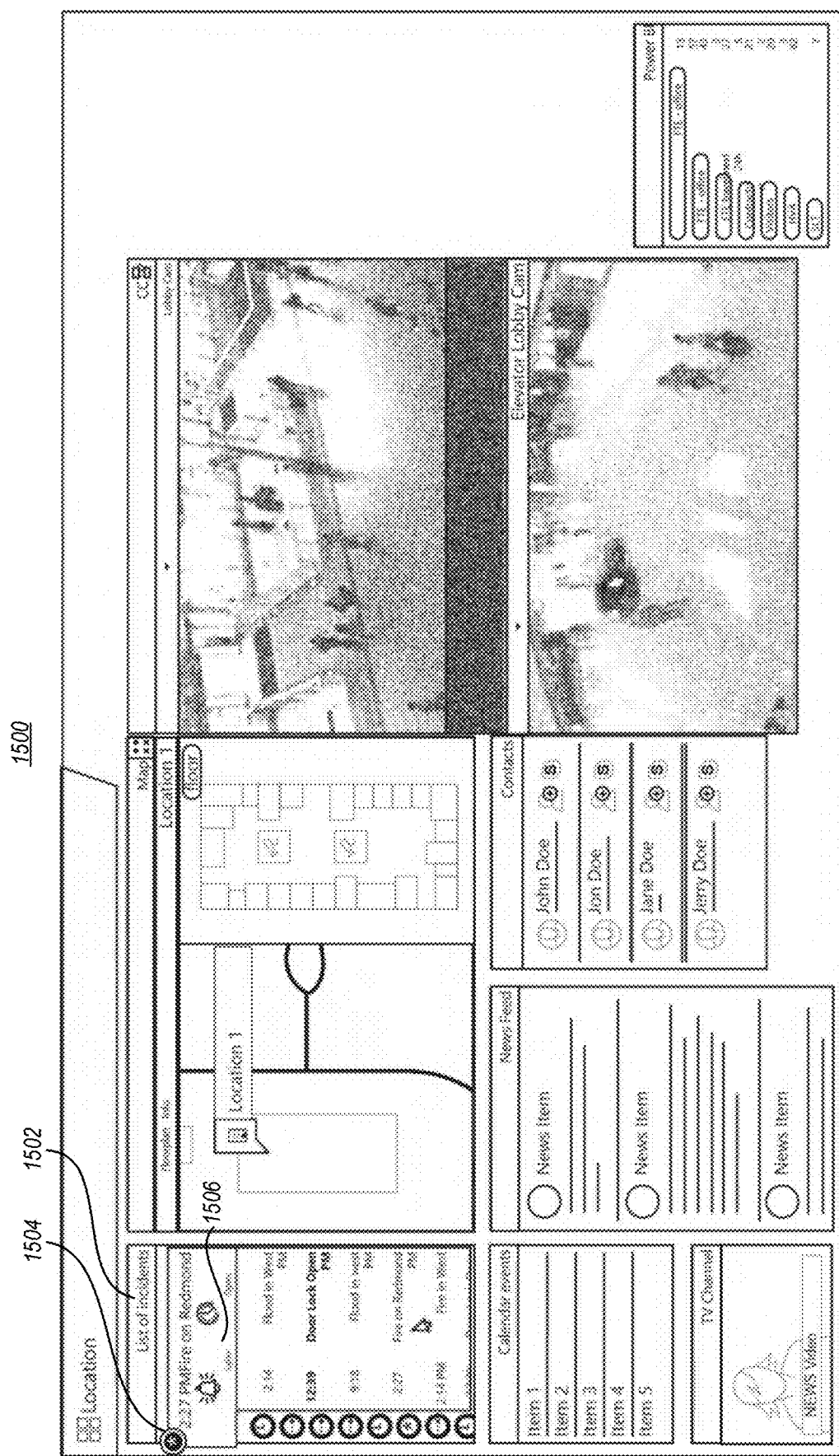

FIGS. 15a through 15d illustrate several additional details regarding the events or incidents tab previously described. FIG. 15a illustrates an embodiment 1500 in which the list of incidents tile 1502 reflects a highlighted incident 1504. In this embodiment, the 2:27 fire incident triggers a notification for a response. Options 1506 for responding and/or opening the event are also presented. When a user selects an option to open or respond to the event notification, the system may automatically and dynamically modify one or more of the displayed canvas tile(s) based on relevant context data.

Figure 15B:
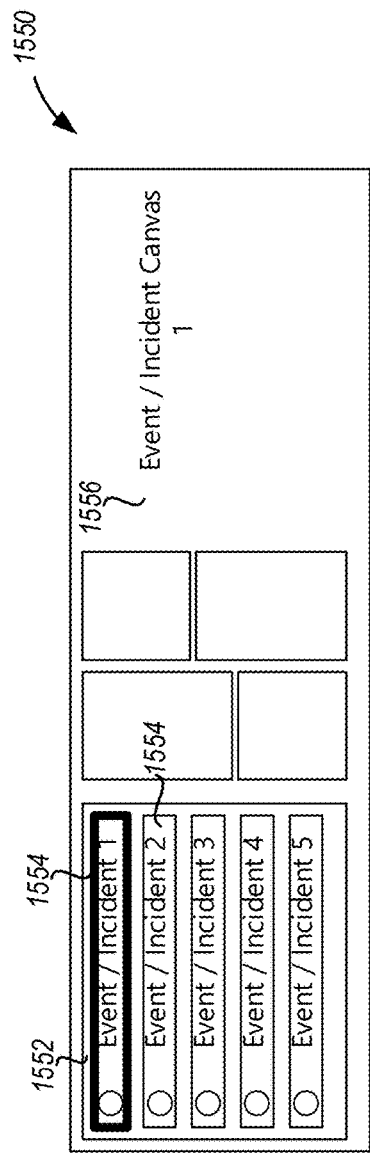

A more detailed list of incidents tile, also referred to as an events tile, is illustrated in FIG. 15b. Within this figure, the master canvas 1550 generally corresponds to the event canvases that have been previously discussed. In order to more fully explore features of the incident tile, other previously illustrated tiles have been simplified and are now presented as simple shapes within the main event canvas portion for the respective illustrations.

A more detailed list of incidents tile, also referred to as an events tile, is illustrated in FIG. 15b. Within this figure, the master canvas 1550 generally corresponds to the event canvases that have been previously discussed. In order to more fully explore features of the incident tile, other previously illustrated tiles have been simplified and are now presented as simple shapes within the main event canvas portion for the respective illustrations.

For example, in FIG. 15b, master canvas 1550 contains incident tile 1552. As illustrated, incidents tile 1552 has a highlighted element 1554 that corresponds to "Event/Incident 1." As has been previously described, the event incident list includes a listing of a number of events that are available to the viewer of the canvas. In this particular embodiment, the master canvas view 1550 includes the ability to see all of the current incidents at the SOC. This master canvas can then be utilized by the operator in order to explore all of the current incidents including seeing particular details of the incident, roles assigned to the incident, current status of the incident, and other information.

As used in this description, each of the incidents listed in incidents tile 1552 is also referred to as a "tab." In this manner, as illustrated, each of the incidents is visualized as a separate tab within the list. It should be appreciated that the term tab is intended to mean a navigable organization of the tabs that may take the form of a list, a tabbed interface presented in a ribbon, or any other suitable visualization schema, so long as the user is able to selectively navigate among the listed events (e.g., by selecting a selectable tab that corresponds to the event) in the manner described herein.

Returning to master canvas 1550, in response to highlighting the tab 1554 (e.g., responsive to user input directed at the tab), the incident canvas 1, illustrated as canvas 1556, is caused to present one or more of the event tiles that are associated with tab 1554. For example, in some embodiments, canvas 1556 on the master canvas 1550 will show all of the tiles that are associated with the tab 1554 and corresponding event, regardless of role. In this way, the event manager can see all of the types of data that are available for the particular incident. It is appreciated, therefore, that the canvas that is associated with that incident may not include all of those same event tiles when it is eventually presented for a particular user assigned to the event, because the specific user may be assigned a role that filters out some of the event tiles that are not relevant to their assigned role.

Figure 15C:
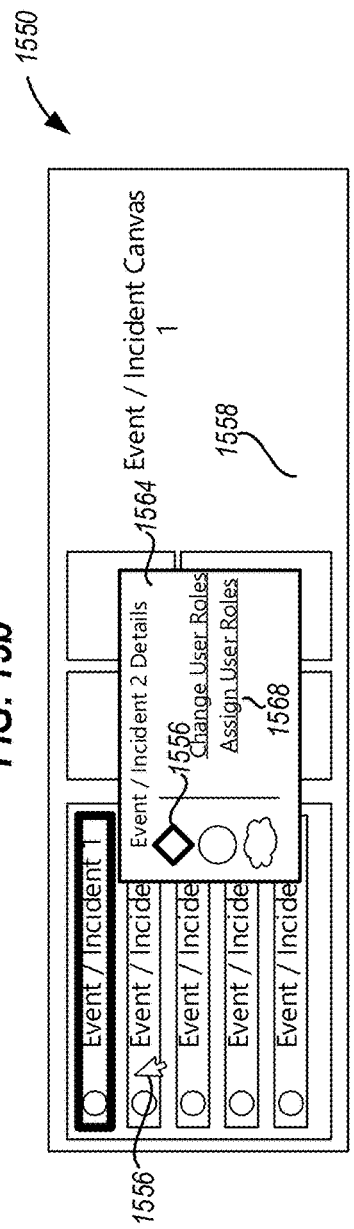

Moving to FIG. 15c, a modified version of master canvas 1550 is illustrated. Here, the same incident list 1552 is shown and tab 1554 remains highlighted. Correspondingly, canvas 1558 is populated with tiles that correspond to the event of tab 1554. However, now a user has interacted with a different tab in the tile, as illustrated by the pointer 1556 being oriented over the second tab in the list (where it hovers over or selects the second tab).

It is appreciated that a user can perform any number of inputs at a computer system. In this case, the user is hovering the mouse over a different tab than the highlighted tab. In response, details 1564 are caused to be generated as a pop-up display. Details 1564 may be configured to include additional detail about the tab that generated the pop-up.

It is appreciated that invoking the details 1564 has not altered the tiles that are shown in the canvas 1558 because the hover is a passive input to the incidents list. Instead, as illustrated, details 1564 may include tools 1548 the user can invoke to perform some sort of action relating to the tab (and, therefore, the corresponding event canvas) but without modifying the canvas.

Figure 15D:
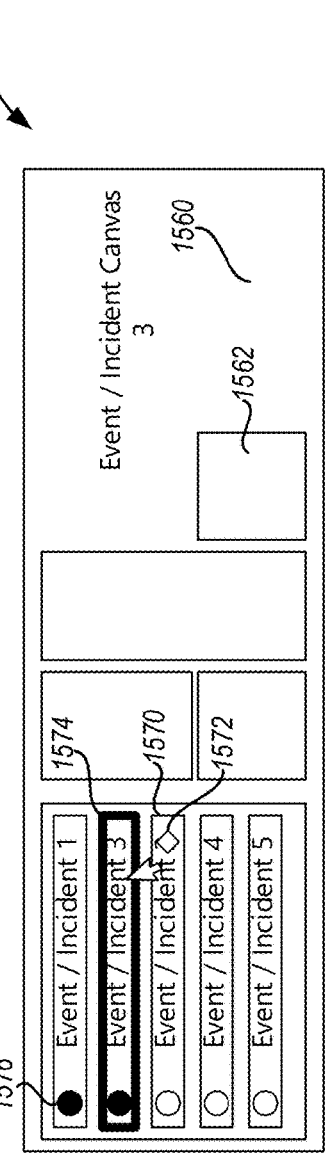

However, as is illustrated in FIG. 15*d*, a user may invoke a change to the master canvas 1550 by preforming an action that selects a tab with an input other than just hovering over the tab. Here, tab 1574 has been selected with a mouse click or touch input or gesture (as opposed to only hovering over the tab.) As a result, focus is shifted from tab 1554 to tab 1574. Additionally, canvas 1560 is modified as compared to canvases 1556 and 1558 to include a new tile 1562 that is contextually relevant to tab 1574 and the corresponding event but, which was not contextually relevant to tab 1554.

In this manner, a user can select tabs from incident tile 1552 to explore the contents of the tabs and corresponding events. such that the event tiles that are contextually relevant to the particular tabs are shown in the respective canvas area of the master canvas 1550.

Returning to the details 1564 pop-up, the illustration includes the options for the user to "Change User Roles" and/or "Assign User Roles." As illustrated, the text is shown underlined to denote that the words are linked or otherwise interactive. In some embodiments, hyperlinks may be provided (when selected with user input) to access control panels or options hosted in another location. In some embodiments, clicking an actionable item with details 1564, for example, may alter details 1564 to allow additional input. In other embodiments, a complete action can be completed within the single view of details 1564.

It is also appreciated that the two examples of actions are non-limiting and can include numerous other types of actions such as adding, sorting, filtering, or otherwise modifying data associated with a tab.

Details 1564 also illustrates icons 1566 that, as illustrated, shows a series of abstract shapes. It is appreciated that these icons are merely indications that certain types of categorical data or actions can be included in details 1564 in graphical form. This is helpful because details 1564 has limited screen space so it may be beneficial to simplify concepts into graphics where possible.

As some non-limiting examples, icons 1566 may represent the category of event the tab is associated with, the number or identity of associated users, the priority of the tab and/or other information. It is also appreciated that elements within details 1564 may be configured so that they persist in the main tab without having to invoke the pop-up display.

In one embodiment, one or more of the icons 1566 may be pinned, in response to user input, to the main tab representation. For example, as shown in FIG. 15*d*, icon 1572 is pinned to the tab corresponding to incident 2. This may be accomplished by a user invoking a pin function (not presently shown) while in the pop-up 1564 from FIG. 15*c*. Notably, the pop-up has been removed in FIG. 15*d* because the user has moved the cursor away from the corresponding tab. However, the pinned icon 1572 persists in the incidents tab even though the pop-up has been removed and the user input is no longer directed at the particular tab. In this manner, the user can customize their incident tile according to personal preference.

Similar to the way that information from a pop-up can be pinned to a corresponding tab, the tabs themselves can also be pinned. As illustrated in FIG. 15*d*, pin tool 1576 has been invoked for incident 1 and incident 3. In some embodiments, this results in the pinned tabs being fixed in their current location. In other embodiments, pinned tabs automatically rise to the top of the incident list in order to allow quicker access for a user to pinned tabs. As can be appreciated, by pinning incident 3 and not incident 2, the sequence of tabs has been customized for the particular user as compared to how the incidents would be listed without any pins being invoked. As can be appreciated, pinning tabs allows for the particular tab to remain in a given location irrespective of non-pinned tabs. In this way, in a scenario where there are more incidents than can fit in an incidents tile without scrolling, a particular tab of note can be pinned to a location and as other tabs are added or removed from the tile, the pinned tab will remain in a consistent location.

While FIG. 15*b*-15*d* illustrate how a tab that has been selected can be highlighted with an emphasized border, it will be appreciated that other types of highlighting and modifications and visualizations can also be used to reflect a tab has been selected and/or pinned. By way of example, the tab can be highlighted with a different color, size, icon, shading and/or other visual indication to reflect that the tab has been selected or tabbed.

It is also appreciated that the tabs may be color coded to denote particular detail about the tab. For example, tabs related to events of a particular type (e.g., fire alarms) may be color coded red while tabs related to events of a different type (e.g., power outage) may be color coded black.

In other embodiments, color coding may be invoked to visually indicate a degree of priority for an event. In such embodiments, priority may be indictive of the scale of an event, an elapsed response time, or some other indication that can be represented by a color scale, in which different colors are used to reflect different scales, elapsed response time, urgency, assigned users and so forth. As one example, tabs may be uncolored when they are low priority, colored blue in medium priority, colored orange in high priority, and colored red for an emergency priority. It is also appreciated that different combinations of these concepts may be applied depending on the embodiments.

As one non-limiting example, one portion of a tab may be a first color representing the priority of the event associated with the tab while a different portion of the tab may be a different color representing the time elapsed since the last action regarding the event has been successfully completed. In such an example, a user would then be able to see both the overall priority as well as the progress being made with the event.

In the prior examples, the various tabs within the incidents list may be representative of numerous different events that are simultaneously occurring. In this way, the tabs do not necessarily need to share any relationship to each other to be presented in an incident tile.

However, in other embodiments, the management canvas, such as canvas 1550, may include an incident tile that lists canvases that are alternative canvases for the same event. For example, returning to incident list 1552 of FIG. 15*b*, tab 1554 may be a first event canvas configuration for a given event. Likewise, tab 1554 may be a second event canvas configuration for the same given event, but for a different user or assigned role. This is because, as previously described, users with different roles may be assigned to a same given event. To facilitate the different roles, different event canvas templates may be configured corresponding to the particular role.

For example, tab 1554 may correspond to an event canvas configuration for a first role while tab 1576 may correspond to an event canvas configuration for a different role. Accordingly, when a user of management canvas 1550 selects tab 1554 or 1576, canvas 1556 will be updated to show the tiles that are associated with that version of the event canvas. In this way, the user can identify and configure event canvases according to role.

Along with this ability, the incident list itself may be configured to list the incident tabs according to role. For example, the tabs may be listed from a highest access role to a lowest access role. As with the previously described embodiments, all of the same capabilities may be configured for pinning, sorting, hovering, selecting, and so forth so that viewing tabs according to different corresponding roles for the same event can be accomplished similarly to viewing tabs according to different corresponding events.

Figure 16:
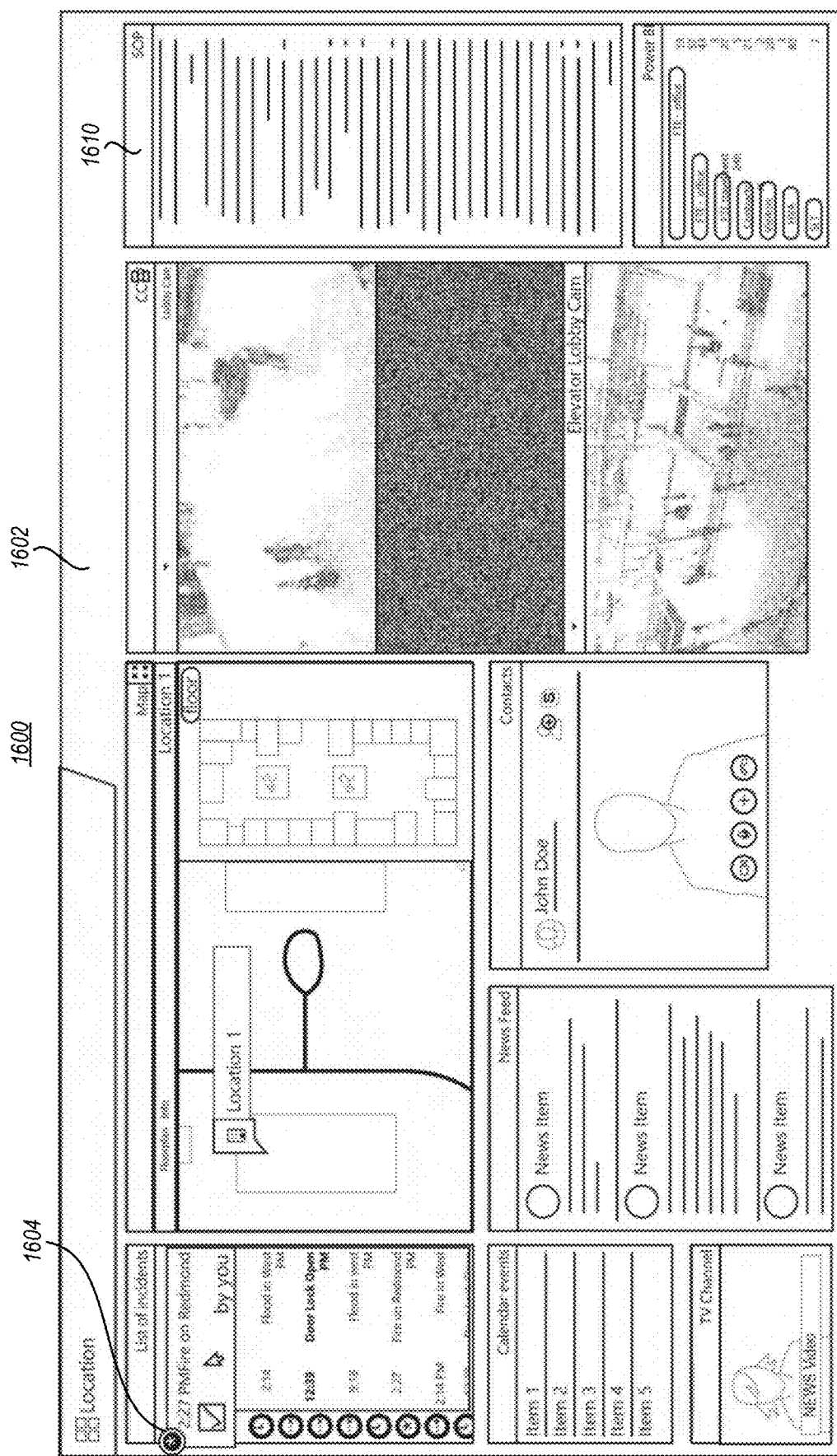
Figure 17:
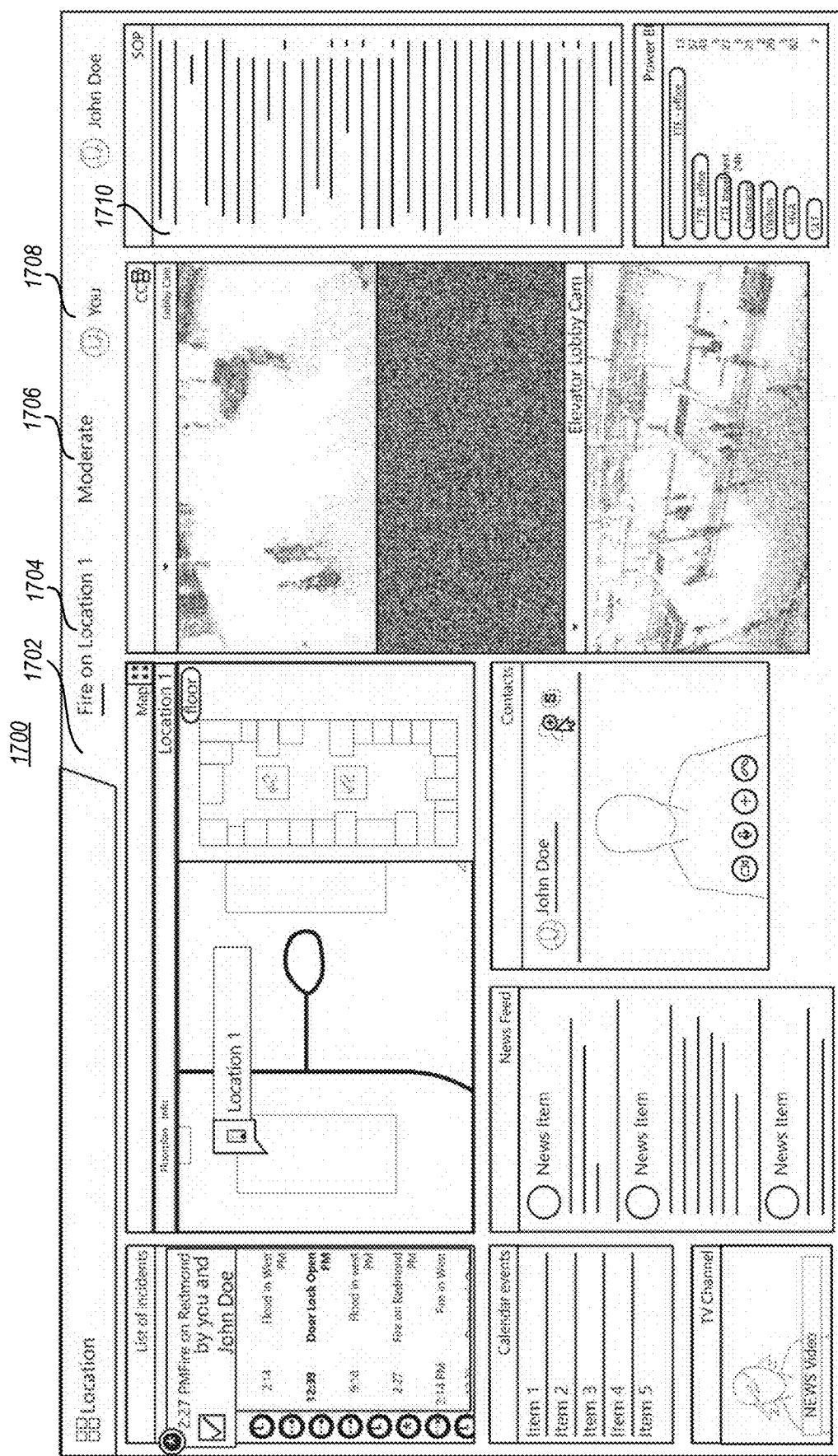

As illustrated in embodiment 1600 of FIG. 16 and embodiment 1700 of FIG. 17, upon selecting an option 1506, the canvas is modified by selecting the open incident/event notification to indicate that the event has been viewed (denoted by the checkbox) and who the viewer was (denoted by the "by you" text.) At the same time, and as illustrated in FIG. 17, the ribbon 1602 may be updated, such as in ribbon 1702, to reflect the event/incident 1704, a status of incident 1706 (e.g., moderate), and an assigned entity for managing/responding to the incident 1708 (e.g., Keith Richards). If the manager wishes to assign additional entities to the incident they can select the additional entities from the contacts tile or other relevant tiles. For instance, in this example, the user has scrolled through the contacts in the contacts tile and selected a specific contact. This selection or another selection can initiate communication interfaces with the selected contact (e.g., using video conference interface tile). The manager or other entity can also select the contact and assign roles to that contact, such as by assigning a selected contact to an event with one or more roles. The role assignments can be made through a right-click menu, by drop down menus, by dragging and dropping contact objects and/or any other control mechanism.

FIG. 16 also illustrates how the system may receive new and updated information that may be determined by the system to be contextually relevant to the event(s) being managed. In this case, a SOP (standard operating procedure) listing was discovered as the result of pushed/pulled data being analyzed by the system and determining that it was relevant to event 1604. In response, the system automatically rendered the new content in a new SOP tile 1610. If there is not room for the new SOP tile 1610 and/or it is determined to be more relevant than other displayed tiles/data, the system will resize/move other tiles/data that are determined to be less relevant. Alternatively, or additionally, the system may highlight any tile or content that is determined, on the fly, to be particularly relevant to a context of the canvas event view.

In some instances, the canvas displays a current incident state according to the SOP and/or completion of tasks associated with an operation management process. Icons or labels, highlighting, and other display objects can be used to explicitly identify what a current incident state is within a SOP and/or within a related tile presentation.

FIG. 17 illustrates a more detailed view of an SOP tile 1710 that includes some status information (e.g., check boxes) corresponding to different procedures that are being competed or that are to be completed.

As previously described, interaction with one tile on the canvas may affect and by and may be affected by other tiles on the canvas, such as the people tile that include information about affected or relevant entities and/or the alerts tile, incident tiles, CCC tiles, and the other tiles (among others) that have been previously described. The modifications that are made will correspond to new/updated information being detected and/or in response to detecting the format should be created/modified differently for different viewer/entity roles.

In some embodiments, the previously described canvases can also be rendered on a display wall in an operation management center (e.g., SOC). This display format, particularly using tiles that are contextually relevant for the events/incidents being managed, can provide the operators greater insights and much more efficiently than was previously possible using the exiting configurations shown and described in reference to prior art systems such as that illustrated in FIG. 1.

It will be appreciated that the foregoing examples are merely illustrative and not exhaustive. Additional examples will now be described in reference to methods and systems that are utilized to provide and/or that incorporate the canvas interfaces and canvas management functionality described above.

Example Methods

Figure 18:
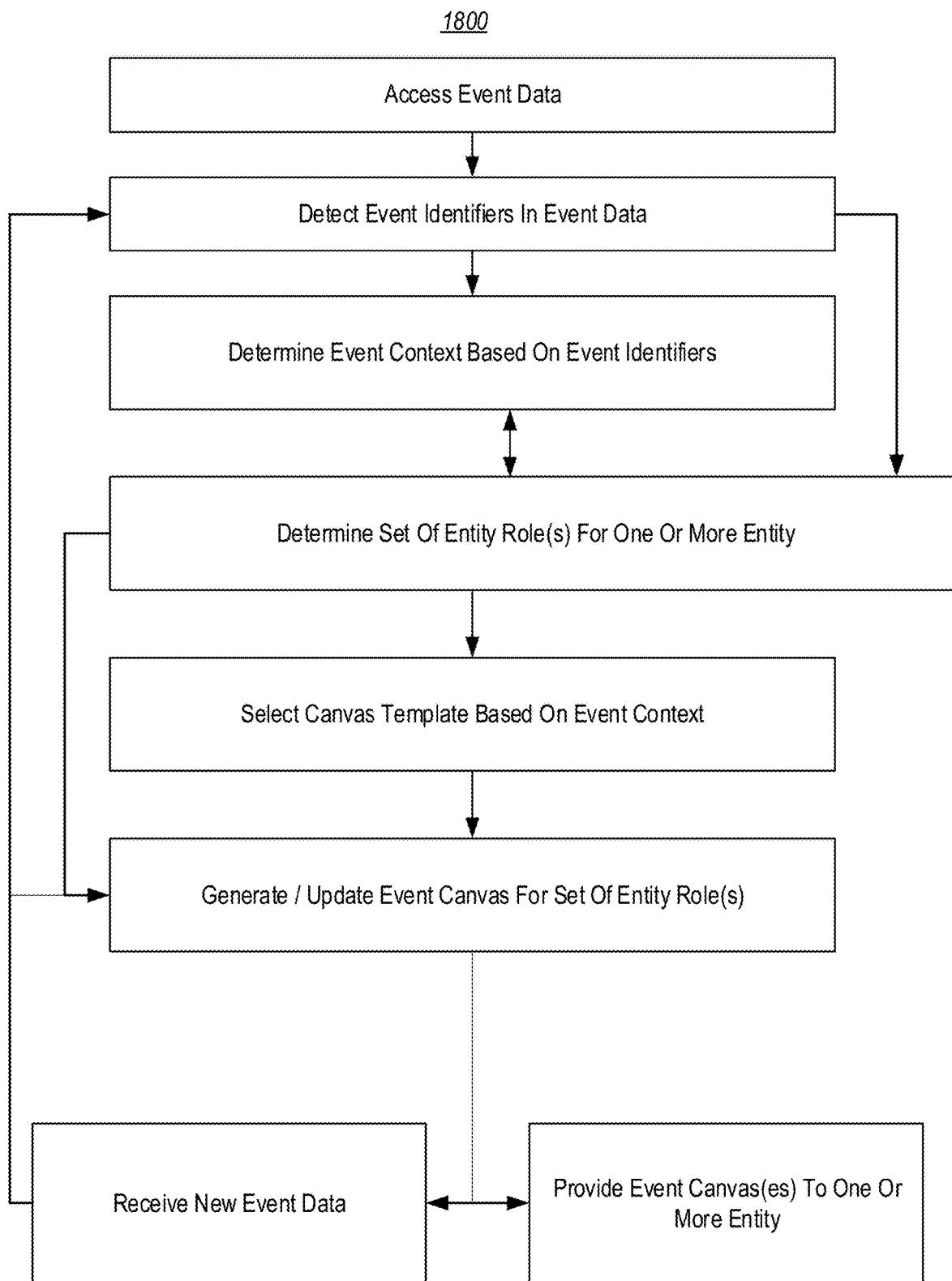
FIGS. 18-20 illustrate various flow diagrams corresponding to exemplary and non-limiting methods.
Figure 19:
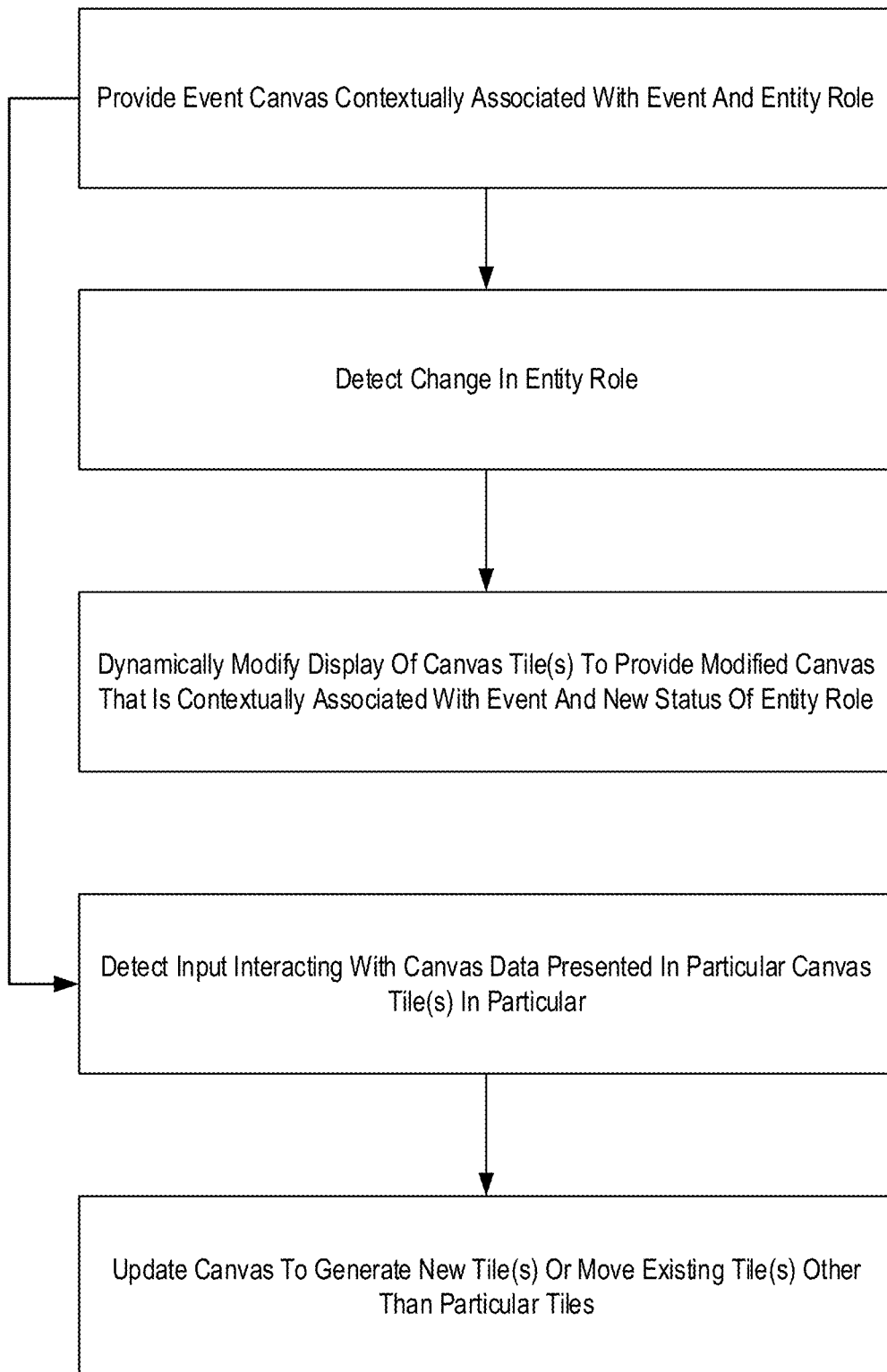
Figure 20:
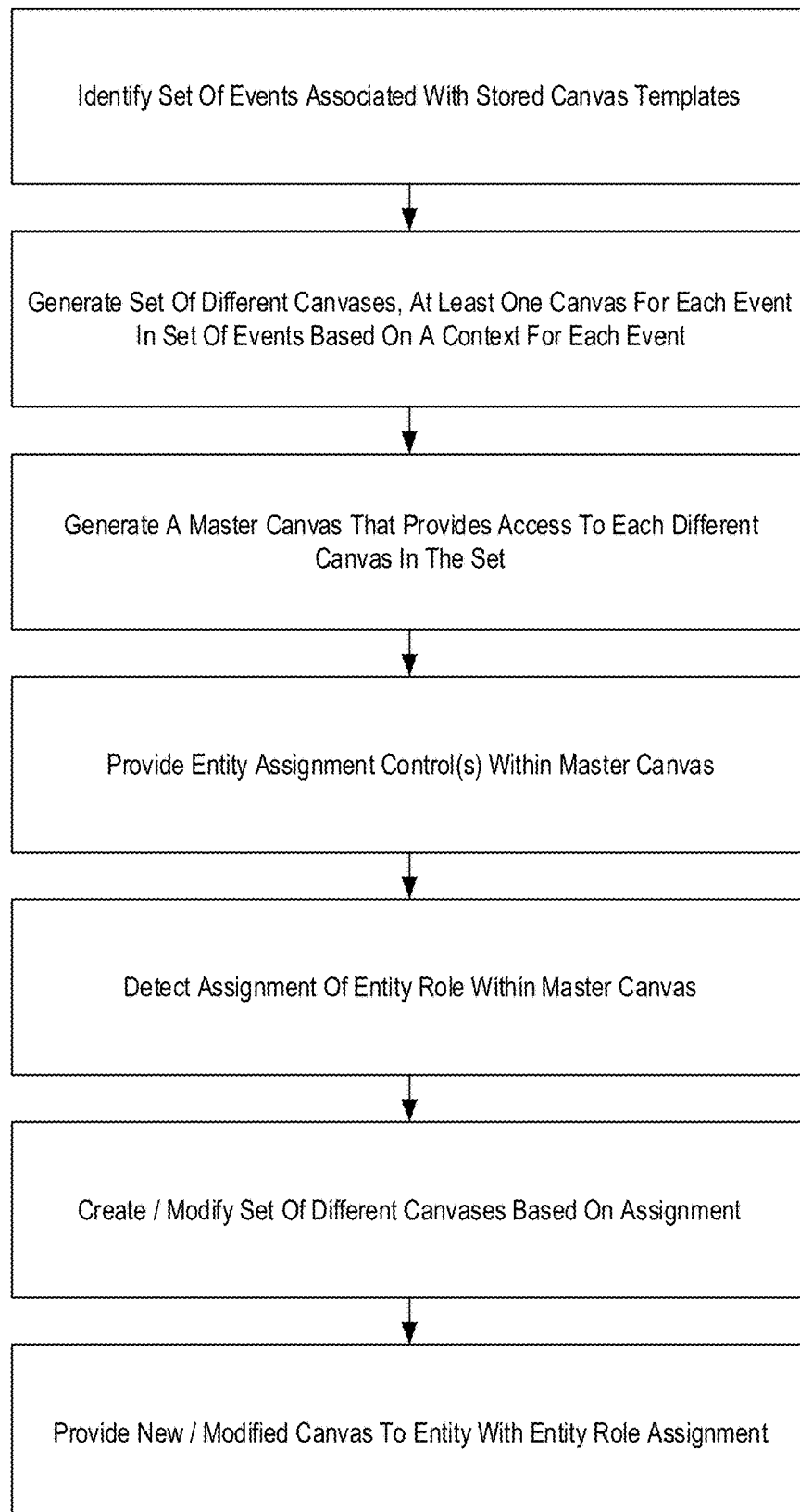

FIGS. 18-20 illustrate various flow diagrams corresponding to example methods for managing deployment of contextually relevant event canvases (FIG. 18), methods for managing presentation of a contextually relevant event canvas (FIG. 19), and methods for managing deployment of contextually relevant event canvases based on entity roles (FIG. 20).

The following discussion will be provided with reference to different methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

As illustrated in FIG. 18, some of the disclosed embodiments include systems, such as described in reference to FIG. 2, for managing deployment of contextually relevant event canvases. In these embodiments, the method of managing deployment of contextually relevant event canvases includes the system accessing event data associated with an event, detecting event identifiers in the event data, determining an event context based on the event identifiers, determining a set of one or more entity roles for one or more entities associated with the event, selecting a canvas template from a plurality of different contextually based canvas templates based on the event context, and generating and/or updating at least one event canvas based of the selected canvas template and corresponding to the one or more entity roles.

These disclosed systems are further capable of receiving new event data and further generating and/or updating the at least one event canvas (automatically and dynamically) based on the new event data.

The server canvas management system also provides the at least one event canvas to the one or more entities (e.g., as a service that is accessed by the client systems, by generating a notice and link to the canvas, and/or by pushing/streaming the canvas to the client systems).

In some embodiments, the event identifiers can comprise tags, metadata, and/or parsed data associated with the event. For example, if one of the event streams is a video stream, the event identifiers may include metadata or tags embedded or accompanying the video stream. In that manner, in some embodiments, the event identifiers are contained within the event stream.

In some embodiments, the event context can also be used to determine the entities that are associated with the event.

In some embodiments, this is accomplished by using a data model that defines one or more schematic and dynamic relationships among the entities, entity roles, events, event resources, contexts, and other data.

It is further appreciated that the event context may also be based at least in part on the data model.

The server management system may also be configured to select a canvas template based on identifying a template that is most closely aligned with the type of detected event.

In other embodiments for managing contextually relevant canvases, a user interaction may be detected at a tile within the canvas that causes the event canvas to be updated such that it generates a new tile or moves an existing tile. In this way, the modified canvas is distinguishable from the original canvas based on the user input.

In some embodiments, if a new tile is generated, another tile already on the canvas may be moved or resized in order to accommodate the inclusion of the new tile without obscuring any data already present.

It is also appreciated that an entity may change roles based on their interaction with an event canvas. For example, an entity role may change from an event manager role to a different role based on moving from a manager canvas into a user or analyst view of the canvas. In other embodiments, an event manager may modify the entity role for another entity.

When an event canvas is modified in a manner that causes a new tile to be added, it is understood that the new tile is generated in a manner that is contextually relevant to the canvas and to the detected input.

In one example, if the detected input comprises selecting a new incident from an incidents tile, the new tile that is generated is contextually relevant to the new incident. In other embodiments, rather than simply adding/removing/modifying an existing canvas based on the input, the modified canvas is created according to a pre-defined template that includes contextually relevant data associated with a particular incident and in response to the detected input.

Finally, in some embodiments, rather than adding a new tile or removing a tile as a result of detecting the user input, an existing tile may be modified in a manner that allows the tile to remain contextually relevant based on the input. For example, if a user may select a different item from a tile such as a map tile and the modified tile is updated to reflect new contextually related data based on the user input.

In other embodiments, the tile is modified by presenting additional detail within the tile, while in other embodiments the tile is modified to provide additional granularity to the previous detail. For example, a tile may be modified to provide additional detail in a situation where a map is zoomed out thereby providing more information on the map in terms of area presented by the map. In other scenarios, a floor plan of a specific region of a building may be modified to show additional detail within that same floorplan scope. For instance, if the original floor plan showed the general position of offices, the additional granularity may include showing the names of individuals assigned to those offices or the phone extensions to reach those offices and/or cameras with views to the offices (by way of example).

As illustrated in FIG. 19, some of the disclosed embodiments include systems, such as described in reference to FIG. 2, for managing presentation of a contextually relevant event canvas. In these embodiments, the method of managing presentation of a contextually relevant event canvas includes the system providing an event canvas that is contextually associated with an event and entity role, detecting a change in entity role, and dynamically modifying display of canvas tiles to provide modified canvas that is contextually associated with event and new status of entity role.

The system may also detect input interacting with canvas data presented in a particular canvas tile and update the canvas to generate a new tile or move an existing tile in the canvas that is distinguished from the particular canvas tile interacted with.

As illustrated in FIG. 20, some of the disclosed embodiments include systems, such as described in reference to FIG. 2, for managing deployment of contextually relevant event canvases based on entity roles. In these embodiments, the method of managing deployment of contextually relevant event canvases based on entity roles includes the system identifying a set of events associated with one or more stored canvas templates, generating a set of different canvases, at least one separate canvas for each event based on a corresponding context for each event, generating a master canvas that provides access to each different canvas in the set of different canvases, providing entity assignment controls within the master canvas for assigning roles to entities associated with the set of events, detecting an assignment made within the master canvas for a particular entity, creating and/or modifying an event canvas associated with the particular entity, and providing the particular entity access to the event canvas.

In some embodiments, the stored canvas templates define which content frames or tiles will be rendered on the canvas.

In some embodiments, the entity is provided access to the event canvas in a way that allows the entity to customize the canvas according to system capabilities and preferences available to the entity including, in one example, the display capabilities of a computer display utilized by the entity.

It is appreciated that the in some embodiments the master canvas includes a user interface element that displays a visualization of each of the different canvases. For example, the user interface element may include a listing of each of the canvases and allow, for example, receiving user input selecting the canvases. In such embodiments, the user input allows additional information about a selected canvas to be displayed.

In some embodiments, the user may also provide input at the user interface element to select a particular canvas in a manner that causes the current event canvas to be automatically modified based on the context of the selected particular canvas. For example, if a user is currently viewing the canvas list using a first event canvas, the user may select a different canvas from the list causing the existing canvas to be replaced by the different canvas.

In some embodiments, changing from one canvas to another (e.g., as described above) causes the user to change roles, for example the user may be assigned as an entity associated with the new canvas.

It is also appreciated that the listing of different canvases may include visualizations for each of the listed canvases and include additional information such as event contexts, timestamps, labels corresponding to each event, or other information as desirable or configured by a user.

Binding Tiles with a Dynamic Sop

As has been described previously, one element that is presented in some contextually relevant canvases is a Standard Operating Procedure (SOP) tile. For example, one embodiment of an SOP tile is illustrated as element 1610 of FIG. 16. As with other tiles described herein, an SOP tile may be presented on an event canvas based on the context of the particular event associated with the canvas.

Generally, the purpose of an SOP tile is to present one or more steps or actions that a viewer of a contextual event canvas can follow or execute in order to better respond to an event. Because of the dynamic nature of tiles within the canvas, the SOP tile can also adapt to user action, real-time changes in data associated with the event, other actions taken by other users, and the like.

Additionally, the SOP can also cause other tiles to change. For example, based upon a user interacting with an SOP tile, other tiles can be updated, highlighted, moved, or otherwise modified in order to ensure that information displayed on the canvas is the most relevant and helpful for a user. To this end, several example embodiments are described below in conjunction with FIGS. 21-26.

In FIGS. 21-26, a sequence of an SOP tile is illustrated to show various features and capabilities. It is appreciated that the exemplary SOP tile is shown isolated from the rest of an event canvas. However, as can be appreciated from the forgoing explanation, these exemplary SOP tiles can be included within an event canvas in order to provide the instructions for responding to a particular incident, for example.

It is also appreciated that the underlying data that ultimately results in being displayed as procedures within an SOP tile may be generated in any number of ways and may be presented in a manner that differs from a list schema that is presently shown in the illustrations. For example, the underlying SOP procedures may first be determined and mapped using a node-based architecture that represents the relationships among the various steps or actions within the SOP. The nodes may be identified using contextually relevant information about the given event, from historical patterns, from manual user input, or from other sources such that a given SOP may differ from a past SOP even for the same sort of event.

Figure 21:
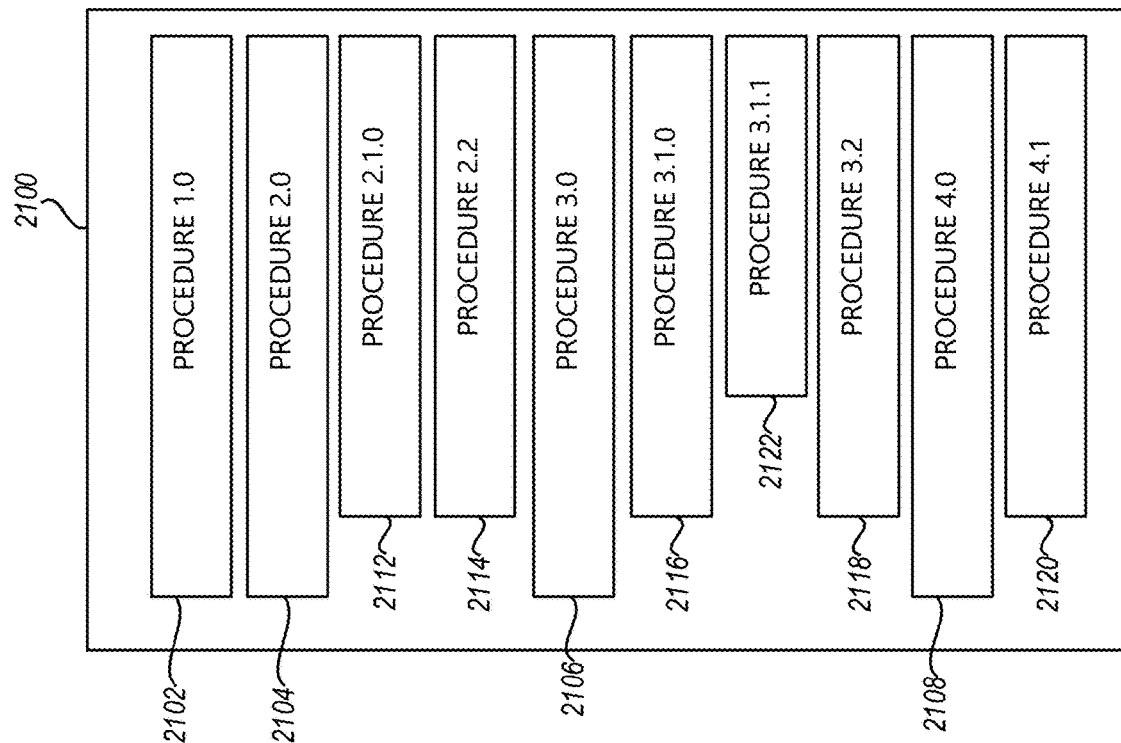

Turning now to the figures, FIG. 21 includes an SOP tile 2100 that is presented within a main tile boundary 2102. The boundary defines the visual extents of the SOP tile 2100 as it is presented within an event canvas. As has been previously described, in some embodiments boundary 2102 may be manipulated by a user in order to resize the SOP tile based on the user's preference within the canvas. In other embodiments, boundary 2102 may not be modifiable by a user, but is instead only modified by the canvas in response to changes within the canvas such as a change in another tile, contextually relevant information being added or removed from the canvas, or other changes to the canvas as appropriate.

Within SOP tile 2100, a listing of exemplary procedures is presented. The included procedures are presented by virtue of their relevance to the current event and at least some of the data in some of the other tiles on the canvas. In some instances, these procedures are obtained from a local database that maps procedures to events. In other embodiments, the procedures are obtained from a third-party standards body or clearinghouse.

In one example, the event associated with the canvas may involve a fire that has been detected within an office building. In such an example, in addition to SOP tile 2100, the canvas may include an alerts tile, a security camera footage tile, a contact information tile for a fire department, or a floor plan tile of the building where the alarm is being detected, or any other tile type based on the detected context of the event.

In this example, the SOP tile 2100 may then include procedures related to the event and other presented tiles in order to guide a user of the event canvas to perform a series of steps or actions for responding to and/or resolving the event. As illustrated, the listed procedures 2104 through 2122 may be presented as a nested list.

By presenting the procedures as a nested list, a user can visually recognize the concept of main procedures and sub-procedures for a given step. For example, procedure 2104 is illustrated at the top most level (e.g., farthest to the left of SOP tile 2100.) Procedure 2104 is also illustrated as a top-level procedure but one that also includes two sub-procedures 2112 and 2114.

Procedure 2106 includes nested procedures 2116 and 2118 at a first dependency level with procedure 2116 further including procedure 2122 at a second dependency level. Procedure 2108 is also illustrated and includes a dependency procedure 2120.

As illustrated, the procedures of a particular SOP may be presented in a chronological order such that procedure 2104 is intended to be complete prior to procedure 2016. In some embodiments, strict enforcement of the procedure may be implemented within the SOP tile such that later procedures cannot be invoked or interacted with by a user until precedent procedures have been completed. In other embodiments, a user may be able to skip procedures and return back to the skipped procedure at a later time. In other embodiments, certain procedures may be skipped, while strict ordering is enforced for other procedures.

Figure 22:
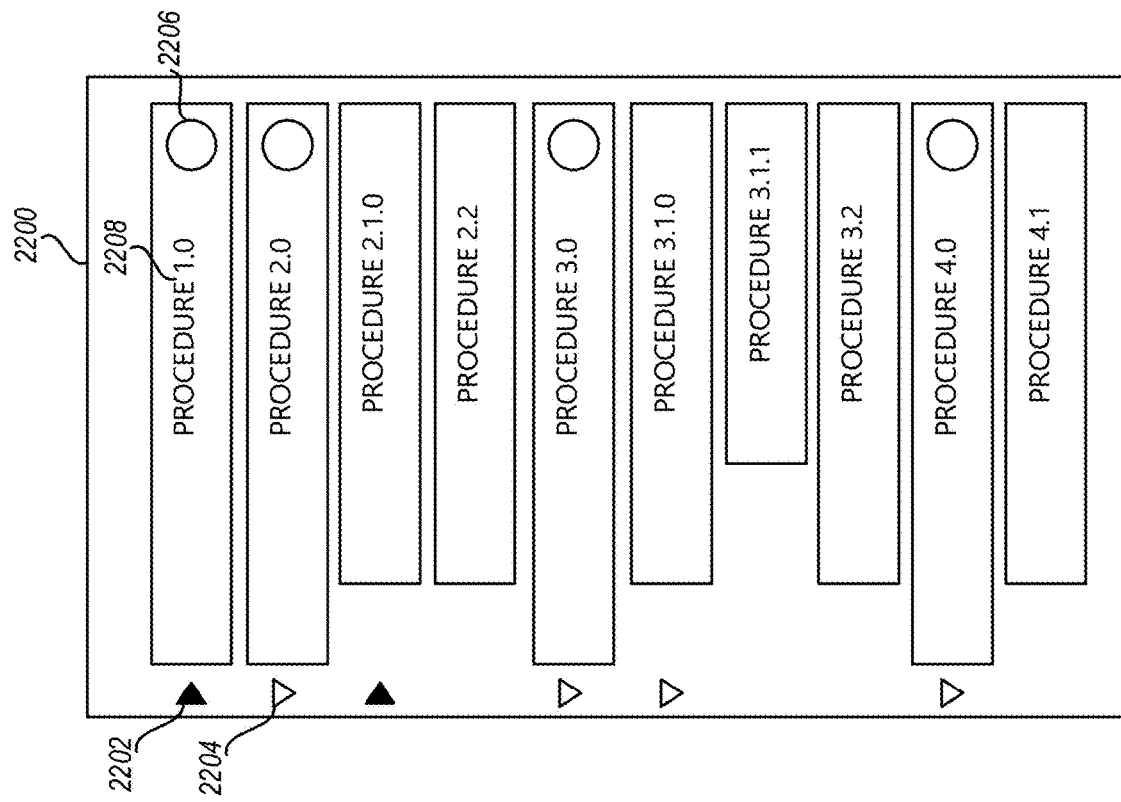
FIGS. 21-26 illustrate various embodiments of a dynamic Standard Operating Procedure tile.

FIG. 22 illustrates an SOP tile 2200 with some additional features such as collapse tools 2202 and 2204. These tools are implemented so that a user can visually recognize that a particular procedure has nested dependency procedures without requiring that the nested procedures take up space within the SOP tile. As illustrated, collapse tool 2202 is illustrated in a first orientation and color to indicate that the corresponding procedure is collapsed. Conversely, collapse tool 2204 is shown in a different orientation and color and indicates that the corresponding procedure is expanded. It should be noted that any suitable tool or visual differentiation is appropriate for providing expanding or collapsing visualizations of grouped procedures.

FIG. 22 also illustrates that the title of a particular procedure, such as procedure 2208, may also be utilized to invoke an understanding that there are nested procedures associated with the given procedure. In the case of procedure 2208, the procedure is identified as "Procedure 1.0." In this embodiment, the use of the first decimal place is used to indicate that the procedure has at least one dependent procedure. In some embodiments, a label such as 2208 may be used in conjunction with a collapse tool such as 2202. In other embodiments only one indication may be used.

The use of the decimal labeling can also be carried through dependent procedures as illustrated with the procedure labeled "Procedure 2.0." Depending from Procedure 2.0 is a procedure labeled "Procedure 2.1.0." As can be appreciated, the use of the first decimal indicates that this is the first dependent procedure from Procedure 2.0 and the use of the second decimal indicates that there is at least one additional second level dependent procedure below Procedure 2.1.0. In contrast, the procedure labeled "Procedure 2.2" does not utilize the second decimal place thereby indicating to the user that "Procedure 2.2" does not include any additional dependent procedures.

FIG. 22 also illustrates a procedure group status 2206. As will be shown in subsequent illustrations, such a status can be utilized to indicate an overall completion status for the group directly depending from a particular procedure—in this case, procedure 2208. As dependent procedures are completed, the status 2206 icon may change in response.

Figure 23:
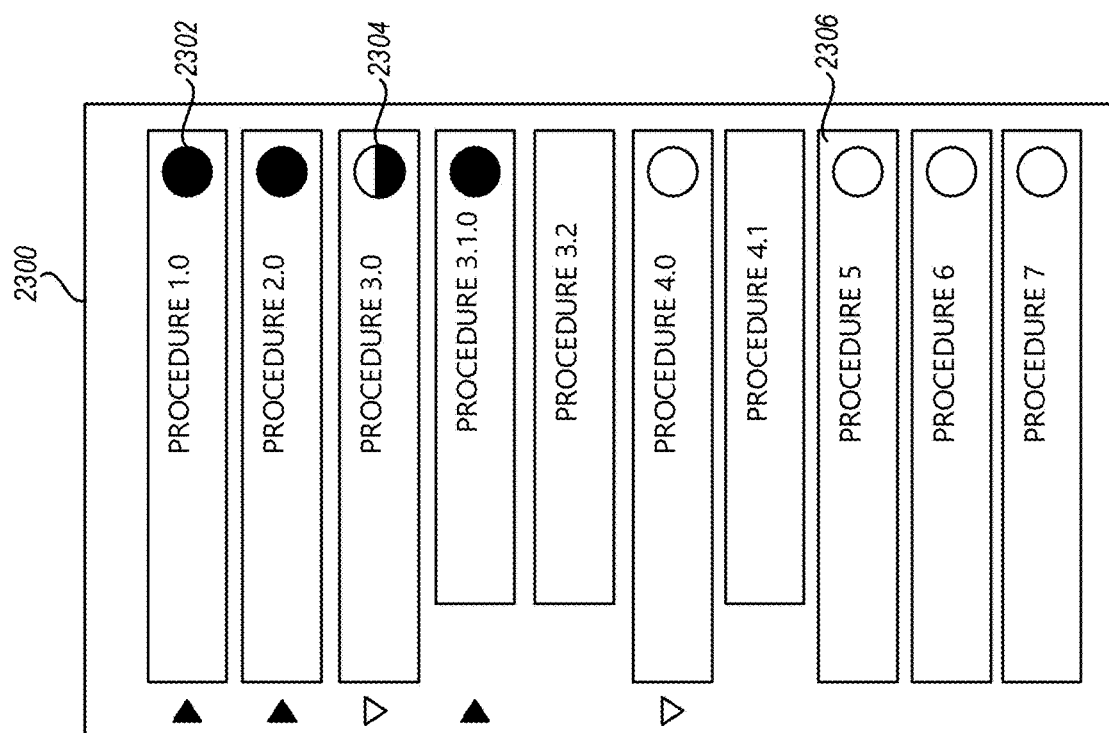

FIG. 23 illustrates an SOP tile 2300 where a number of procedures have been completed or executed. As indicated by status icon 2302, Procedure 1.0 has been completed as have any procedures directly depending form the procedure. The same is true for Procedure 2.0. In the case of Procedure 3.0, status 2304 is shown in a partial completion state. As illustrated, this is because dependent procedure 3.1.0 (and its depending procedures) have been completed but Procedure 3.2 has not been completed.

It is appreciated that the circles and shading illustrated are non-limiting examples for reflecting status information associated with different procedures. It will be appreciated, however, that other visualizations can also be used to reflect status information, such as, but not limited to using other shapes and colors/shading, etc. For example, circles can be used with cross-hatching within the circles to indicate percentages of completion of a particular procedure/procedure set. In other embodiments, colors may also be used to indicate completion such as, for example, using red to reflect incomplete, yellow to reflect partially complete, and green to reflect fully complete. In some embodiments, combinations of shapes, shading, colors, or other visual indicators may be implemented to designate completion levels, priorities, or other contextually relevant details.

FIG. 23 also illustrates how additional procedures may be added to tile 2300 as prior procedures are completed. For example, procedure 2306 is now illustrated based on the completion of Procedure 1.0 and 2.0 being completed. In some embodiments, as procedures are completed, they automatically roll-up (as illustrated.) In other embodiments, completion of a give procedure or procedure grouping may cause the procedure to be removed from the tile, moved to the bottom of a tile, or otherwise partially or fully hidden from a user. In any event, in some embodiments new procedures will continue to be added to tile 2300 so long as there is room within the bounds of the tile and there is sufficient room to add the new procedures. In some embodiments, tile 2300 may include a navigation option to allow a user to scroll or otherwise see additional procedures that are not within the main window.

Figure 24:
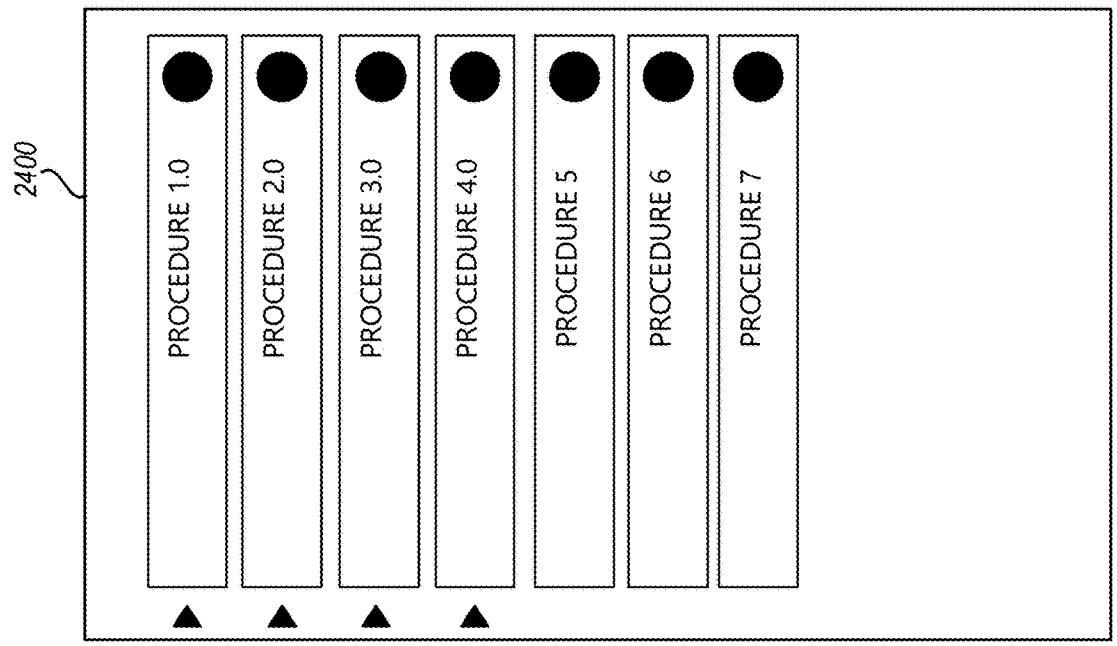

As illustrated by the SOP tile 2400 in FIG. 24, upon successful completion of all procedures within the SOP, each procedure or procedure group may be collapsed or otherwise minimized to make it easier for a user to see all of the elements of the SOP. It should also be noted that in some embodiments a user may opt to begin the SOP with all elements collapsed and then manually open or close each grouping in order to perform the actions. In other embodiments, a user may only be presented with a particular item on the SOP and may not be able to move on or see other items until that item has been marked or determined to have been completed.

Figure 26:
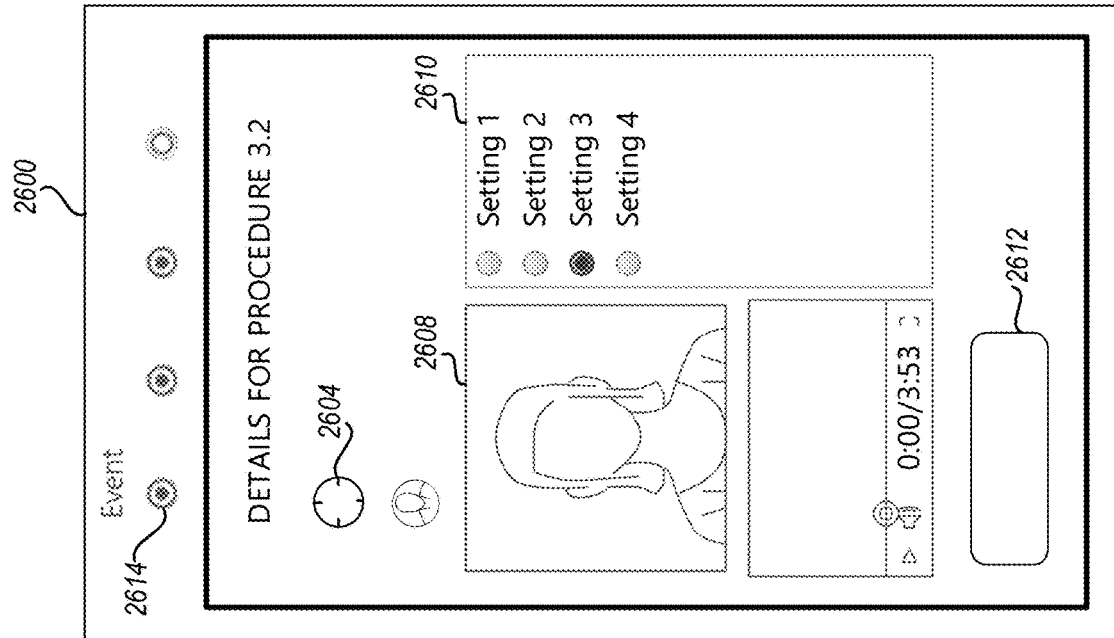
Figure 25:
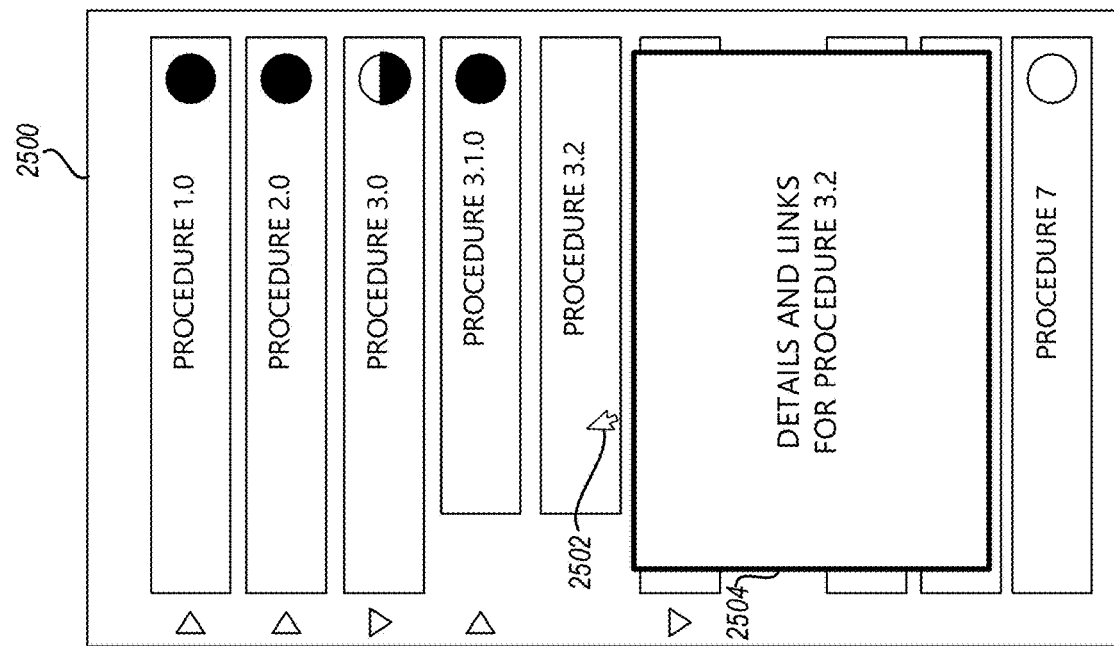

As illustrated within the embodiments of FIG. 25 and FIG. 26, the particular elements within an SOP are interactive. For example, in SOP tile 2500, a pointer 2502 is shown interacting with Procedure 3.2. Depending on the embodiment, this interaction may be a hover, click, gesture, or some other user input configured to indicate a desire to view additional information about the underlying procedure.

As illustrated, in response to invoking the action, preview window 2504 is generated. In this embodiment, preview window 2504 is shown as an overlay that at least partially obscures one or more of the other procedures within SOP tile 2500. As can be appreciated, it may be desirable to have the overlay window be alternatively positioned such that only prior procedures that have been completed are obscured. However, given the nature of the preview window, it may be generated anywhere within SOP tile 2500. As can be appreciated, when the user invokes a new input—such as moving the pointer 2502 away from Procedure 3.2, the preview window may be caused to disappear, reduce in size, change position, or some other action as appropriate.

Within preview window 2504, additional information about the underlying procedure may be presented. For example, a more complete set of instructions for completing the procedure may be presented. In some embodiments, preview window 2504 may also include interactive elements that allow, for example, a user to mark the procedure as completed, select an outcome to the procedure, make a note about the procedure, or some other interaction.

In some embodiments, preview window 2504 includes hyperlinks that allow a user to perform an action or view additional content. In other embodiments, the links allow a user to see other linked procedures or other event tiles that are bound to the procedure.

It should also be noted that some procedures may have corresponding preview windows while other procedures may not. Depending on the environment, a given procedure may be able to be completed by a user without ever viewing a preview window, but in some embodiments a user must take a specific action within the preview window in order for the procedure to be marked as completed. The system monitors actions taken. This monitored information is received as one or more of the data streams mentioned above.

In FIG. 26, a detail view of a particular procedure is shown within SOP tile 2600. Here, the user has performed an action that is different than the action illustrated in SOP tile 2500 that produced the preview window 2504. For example, a user may have double clicked Procedure 3.2 causing the detail window 2602 to be generated. Within detail view 2602, more and/or different information may be presented to the user as compared to preview window 2504. For example, detail view 2602 may include additional information about the procedure such as certain symbols or graphics that visually mark the procedure in specific ways, such as graphic 2604. In some embodiments, the detail view may include event data streams such as a video stream 2608 or interactive elements such as a selectable menu 2610.

In some embodiments, detail view 2602 includes a button or other interactive element 2612 that is configured to change the state of the underlying procedure. In one example, element 2612 is a "Complete" button that allows the user to mark the procedure as having been completed.

In other embodiments, element 2612 may provide other types of interactive features such as contact another user or causing a log entry to me made by the system. In some embodiments, utilizing element 2612 invokes a trigger that causes another action to occur. For example, the user may be automatically moved to another procedure, another event, a different event tile, or some other action.

In some embodiments, detail view 2602 may also include a navigation menu 2614 that allows a user to see wherein the SOP they are and to operate as a selectable menu for the user to return to previous screens (or to drill down to deeper dependencies.)

As can be appreciated in the forgoing illustrations of the SOP tiles, many different organizational and visualization schemas can be invoked to help aid a user in progressing through the procedures within the SOP. However, it must also be noted that because the event canvas is contextually driven, and the SOP tile is able to take advantage of the various contextual elements of the underlying event, many additional features are enabled within the SOP tile.

For example, the procedures within the SOP tile can be dynamically created, modified, changed, or reordered based on changes within the particular event. For example, imagine a scenario where a user of a particular event canvas is presented with an SOP tile that is related to a power outage reported within an office building. As has been previously described, the event canvas may include a floor plan of the office building, a security camera of the area near where the power outage is reported, a text feed parsing the social media feeds of local power utilities, and other data relevant to a power outage.

Based on these data feeds, an SOP may be dynamically generated and provided to a responder to walk through the best sequence of steps to respond to the event. For example, one procedure may be to call the power utility and report the outage. Another procedure may be to identify the floor manager for the particular floor of the building where the outage is occurring. Another procedure may be to send a first responder to a predefined gathering point outside the building. Another procedure may be to initiate shut-down procedures for non-critical infrastructure. As can be appreciated, the list of procedures may be lengthy and involved.

Because the SOP is dynamic and can, for example, learn from prior similar events or user input, the procedures in the SOP are presented in a "best" sequence. Depending on the embodiment, the best sequence may be based on safety, speed, cost, user experience, criticality, or some other scale such that the procedures that will most impact the overall goal are presented earlier in the list.

In some embodiments, the initial SOP may not be completely formulated prior to presenting initial procedures within an SOP tile. For example, future procedures of an SOP may be formulated based on the outcomes of earlier procedures. For instance, after receiving a notification that the power is out on a particular floor (e.g., based on a sensor located on that floor), the first procedure of the SOP may be to verify the power outage by utilizing the closed-circuit camera tile on the even canvas. Suppose the event user follows the first procedure and identifies that the power is, in fact, operational. In that instance, the user may respond to the first procedure in the SOP with an indication that the power outage was a false alarm. As a result, rather than presenting a series of additional procedures that would be appropriate for an actual power outage, the SOP is updated to provide a series of procedures to diagnose and address the false alarm.

In the previous scenario, the SOP may also be full formulated and presented to a user based on the initial event (i.e., the reported power outage), but then dynamically replaced within the SOP tile with the new procedures (i.e., diagnosing and addressing the false alarm.)

In another scenario, the SOP may be updated based on changes to the context of an event that occur after the SOP has been generated. For instance, suppose the original scenario where a power outage is reported at an office building. The user is then presented an SOP tile within their event canvas that includes the best sequence of procedures for responding to the power outage, as previously discussed. For example, a user may be presented with the SOP 2200 illustrated in FIG. 22. In this scenario, the procedures 1.0 through 4.1 are designed and presented to respond to the current context of the event—a power outage.

It is appreciated however, that an event context may change and evolve after an initial context is determined. For example, subsequent to receiving a power outage signal and generating an initial SOP, a fire alarm signal is received. Based on this change in context from a power outage alone, to a power outage plus a potential fire, it is appreciated that the "best" SOP may now be different. In this instance, one or more new set of procedures may be added to the SOP tile 2200 to address the new context. In some embodiments, a wholly new SOP may be generated and include both the procedures for the power outage and for the fire. In other embodiments, new procedures reflective of the updated context may simply be inserted within the initial SOP based on their identified priority. It is noted that in some scenarios, one or more of the original SOP procedures may be still be appropriate for the updated context and so will remain.

As described previously, a user interacting with an SOP tile may directly indicate the outcome of a particular procedure in order to indicate the procedure has been completed. However, in other embodiments, some or all of the procedures may be automatically recognized as having been completed, or may be dynamically changed or updated, based on other information within the event canvas. For example, suppose a particular procedure indicates that that the local fire department should be contacted. Based on the user reaching this procedure within the SOP, a communications tiles may be surfaced and/or activated within the event canvas and configured to automatically present contact information for the appropriate fire department and/or to automatically send information to the fire department. Upon completion of a call to the fire department, triggered by selection of the contact tile and/or in response to detecting information has been sent to the fire department automatically, the event canvas recognizes that this procedure has been completed and automatically marks, removes, hides, etc., the procedure from the SOP tile.

As described above, the dynamic nature of the SOP tile allows it to be updated based on changes to the event context and activities that occur within other event tiles. But the SOP tile is also able to cause changes to the event and update other tiles. For example, suppose a particular SOP procedure included viewing all of the closed-circuit cameras within a particular building. In one embodiment of the SOP, separate procedures may be generated for each known CCCs in the building. As the user worked through the individual procedures, the CCC tile would be updated to show the view from the CCC associated with the particular procedure. At the same time, a floor plan map tile may be updated to show the actual position of the CCC on a floor plan. Other tiles may also be updated to include relevant information such as a contact for the person in the nearest office to the camera.

In another embodiment, rather than generating separate SOP procedures for each camera, a single procedure may be generated that causes other tiles to activate and direct the user to the items to view. For example, the floor plan map tile may be invoked and each of the request CCCs identified on the floor plan. The user would then work through the CCCs based on the floor plan map tile and view the individual feeds within the CCC tile. Upon successfully viewing all of the requisite CCCs, the SOP procedure is automatically updated to show the procedure as completed.

As has been described above, the dynamic nature of the event canvas allows particular SOP procedures to be bound to particular events and event tiles such that the binding allows a dynamic interaction among relevant tiles. This binding occurs within the underlying fabric of the canvas and is managed and maintained without requiring input from the canvas user. In this way, the SOP procedures can drive the interaction with the event and event canvas in a way that will result in the "best" sequence of activities to respond to the event but also in a way that allows for dynamic modification of the procedures based on changing context, as well as dynamically surfacing/modifying tiles presented with the corresponding canvas based on completion states of the SOP procedures.

It is appreciated that the binding between different elements of the event canvas may be accomplished through a binding component that binds the elements using the connectors and business logic such as in the system component 304 of FIG. 3.

In this way, the dynamic binding may be provided at the same system that receives the event data stream and determines their context. This makes binding contextually relevant tiles more efficient.

The binding of the SOP to other tiles within the canvas occurs programmatically and based on the current context of the event. For example, if a given procedure is bound to, for example, a contacts tile within the event canvas, when that procedure is encountered in the SOP, the procedure causes the event canvas to trigger some event within the bound tile (i.e., the contacts tile). For example, one event may be to cause the contacts tile to be surfaced by visually highlighting, resizing, moving, updating, or through some other visual change. In this way, the user's focus can be redirected from the SOP procedure to the tile that is bound to the procedure in order for the user to complete the procedure. In some embodiments, and as previously described, a particular procedure may be bound to more than one tile at a time, for example a contacts tile, a map tile, and a CCC tile may be simultaneously surfaced.

In some embodiments, the binding between the SOP and another tile also allows an interaction with the other tile to cause a visual change in the SOP. For example, a user may select a particular tile in the event canvas by interacting with the tile and at the same time, in response, the particular procedures within the SOP that are bound to that tile are surfaced through visually highlighting the bound procedure. In one embodiment, the bound procedures are surfaced within the SOP tile such that they are visually distinct from non-bound procedures.

It is also appreciated that in some embodiments more than one user may be interacting with the same event and same event SOP from different computing systems. For example, two users may be assigned to the same event. In this scenario, the same "best" sequence of procedures is appropriate, but each user may be simultaneously completing the procedures.

In such scenarios, the SOP tile includes the ability to update each users SOP tile based on the activities of the other user. For example, both users may be presented with the SOP tile 2200 from FIG. 22. The first user may begin within the SOP at Procedure 2.0. In order to avoid duplication of effort or conflicts, once a user has engaged with a procedure, that procedure may be locked, hidden, or otherwise inaccessible to other users, or at least marked as completed. Depending on the procedure, this may also include dependent procedures or otherwise linked or related procedures.

Thus, in the above scenario, once the first user has engaged with Procedure 2.0, the second user may be presented with Procedure 3.0 as the first procedure in the SOP tile. It is appreciated that in this scenario both users would still see Procedure 4.0 as neither of them have engaged that procedure. Upon completion of either user of their particular procedure, the next procedure in the list would then be assigned to the user. In this way, the procedures are encountered and processed within the SOP tiles in an efficient manner.

In some embodiments, particular procedures within an SOP may be restricted based on user role or other information known about a user. In those embodiments, a user without the proper credentials may or may not see the procedure, but in any event would not be able to complete the procedure.

Figure 27B:
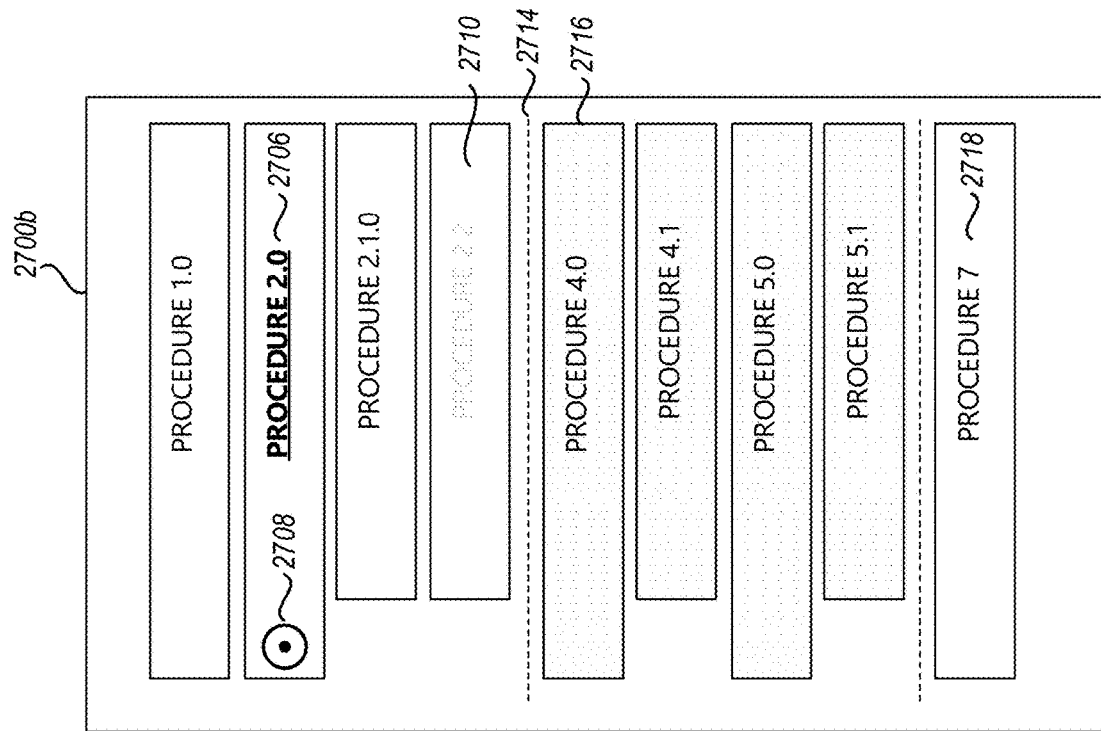
FIGS. 27a and 27b illustrate embodiments of a dynamic SOP tile according to different roles.
Figure 27A:
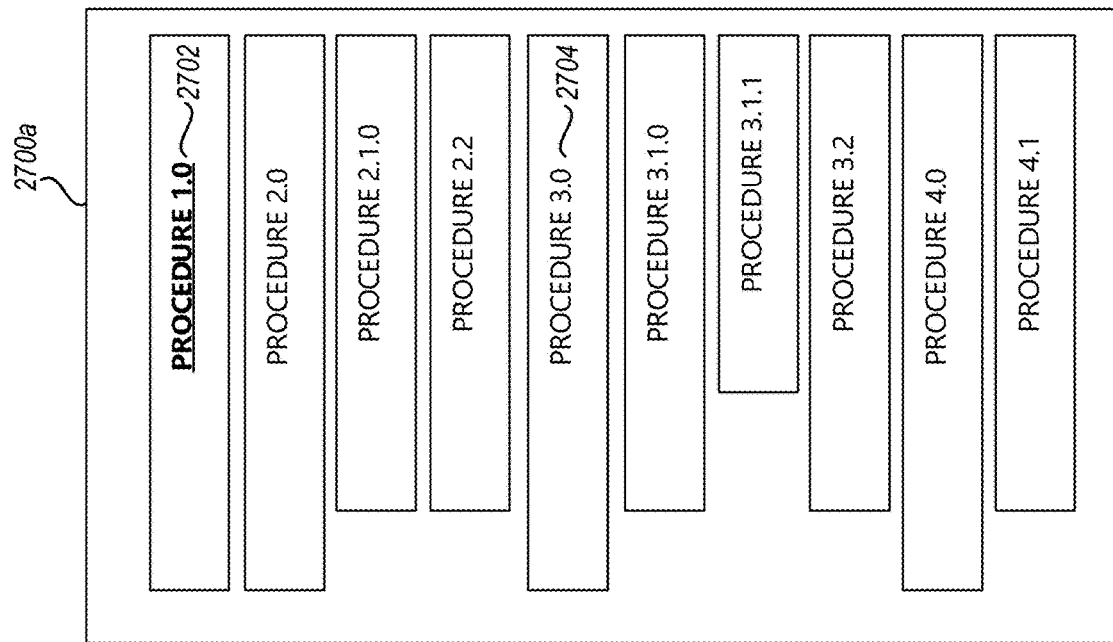

In another embodiment of the SOP tile illustrated in FIGS. 27a and 27b, different roles may be presented with different versions of an SOP generated for a single event. For example, SOP tile 2700a is illustrated as including numerous procedures including Procedure 1.0 through Procedure 4.0 with some of the highest-level procedures including one or more sub-procedures. In the case of SOP tile 2700a, all procedures are present and presented to the user. This list of procedures may be presented to a role within the associated event that has a higher level of access than other roles. In other embodiments, a complete SOP may be presented to a manager role that does not necessarily participate in the SOP but needs insight into the procedures that are listed.

Unlike SOP 2700a, SOP 2700b illustrated in FIG. 27b, is missing some procedures, for example procedure 2704. In this case, the role associated with procedure 2704 may not have access to a resource that is necessary in order to complete the procedure. Consequently, the procedure is removed from the role SOP to simplify the SOP and present only information that is actionable for the role. As one example, procedure 2704 may include an ability to remotely activate a piece of infrastructure such as a security alarm. Some roles may be configured only to complete observe and report procedures from the SOP. For example, the role associated with 2700b may not be authorized to initiate a security alarm and so the procedure 2704 is not presented within SOP 2700b.

In other embodiments, a role may not have procedures presented on the respective SOP for reasons other than access rights, such as contextual relevance to a role and/or based on priority and role responsibility. For example, some high-level roles may be configured to be presented only with critical procedures to allow them to focus on the most important procedures. In such an embodiment, the role associated with SOP 2700b may not see procedure 2704 because it is designated as a low priority or otherwise diminished procedure.

While access rights and criticality have been described as reasons a role may have a filtered SOP list, it is appreciated that any number of scenarios may benefit from customizing SOP procedures according to role. Consequently, an SOP for a given event canvas can be contextually modified based on role in the same manner that other event tiles can be customized, as has been previously described.

Aside from filtering out particular SOP procedures, other role-based modifications can also occur. For example, procedure 2702 is illustrated as being underlined and having a visual emphasis (i.e., bolded text.) Such visual indications may provide contextual clues to a user to help them recognize that the particular procedure should be important to them. In the case of underlying, it may indicate that the particular procedure is now active and can be interacted with by the user. For example, in SOP 2700a, the fact that procedure 2702 is the only underlined procedure may indicate to an assigned user that this procedure is the only procedure available (or contextually relevant) for their assigned role.

SOP list 2700b illustrates additional modifications that can be used. For example, procedure 2710 is shown as being visually diminished by 'greying out" the text of the procedure. In this manner, the existence of the procedure can still be known by the role, but the role may not be able to interact with the procedure. As previously mentioned, this may because the role does not have operative access to the procedure, or it may indicate that the procedure is not yet active. For example, in 2700b, procedure 2706 is highlighted for the role, but procedure 2710—a sub-procedure of procedure 2706—is currently unavailable. In some embodiments, such sub-procedures may be inactive until the parent procedures have been completed. In this way, nested procedures can invoke dependent actions allowing strict sequencing of activities to be enforced.

As is also illustrated in SOP 2700b, visualizations may be included in an SOP to indicate that one or more procedures have been omitted. For example, divider line 2714 may indicate the fact that procedure 2704 has not been included within SOP 2700b. This may be particularly beneficial in scenarios where a given role has a filtered view, but the role still has access to other procedures. This visual indication allows a user to recognize that they may be skipping over a procedure as they advance. In some embodiments, indicator 2714 may be capable of allowing the filtered procedure to be viewable or returned to the main procedure sequence.

In another embodiment, unavailable procedures may still be shown but marked as unviewable or incapable of interaction by the role. For example, procedure 2716 is shown in dark gray indicating that the role cannot interact with that procedure.

Also illustrated within SOP 2700b is the ability for the SOP tile to continually display the next procedures. For example, because SOP 2700a lacks procedure 2704, it can instead display procedure 2718 (not shown in SOP 2700a.) However, it should also be appreciated that a given SOP list may be scrollable or otherwise capable of containing more procedures than can be viewed at one time within the tile. In such instances, a role may be able to navigate to these additional procedures on their own, while in other embodiments, the procedures will not show up until the preceding procedures have been completed.

As illustrated with icon 2708, an SOP listing may also include one or more indicators for a particular procedure that are indicative of status, priority, role assignment, or other indication. For example, icon 2708 may indicate that procedure 2706 is currently assigned to the role associated with SOP 2700b and that the role should complete that procedure prior to interacting with any other procedure.

Figure 28:
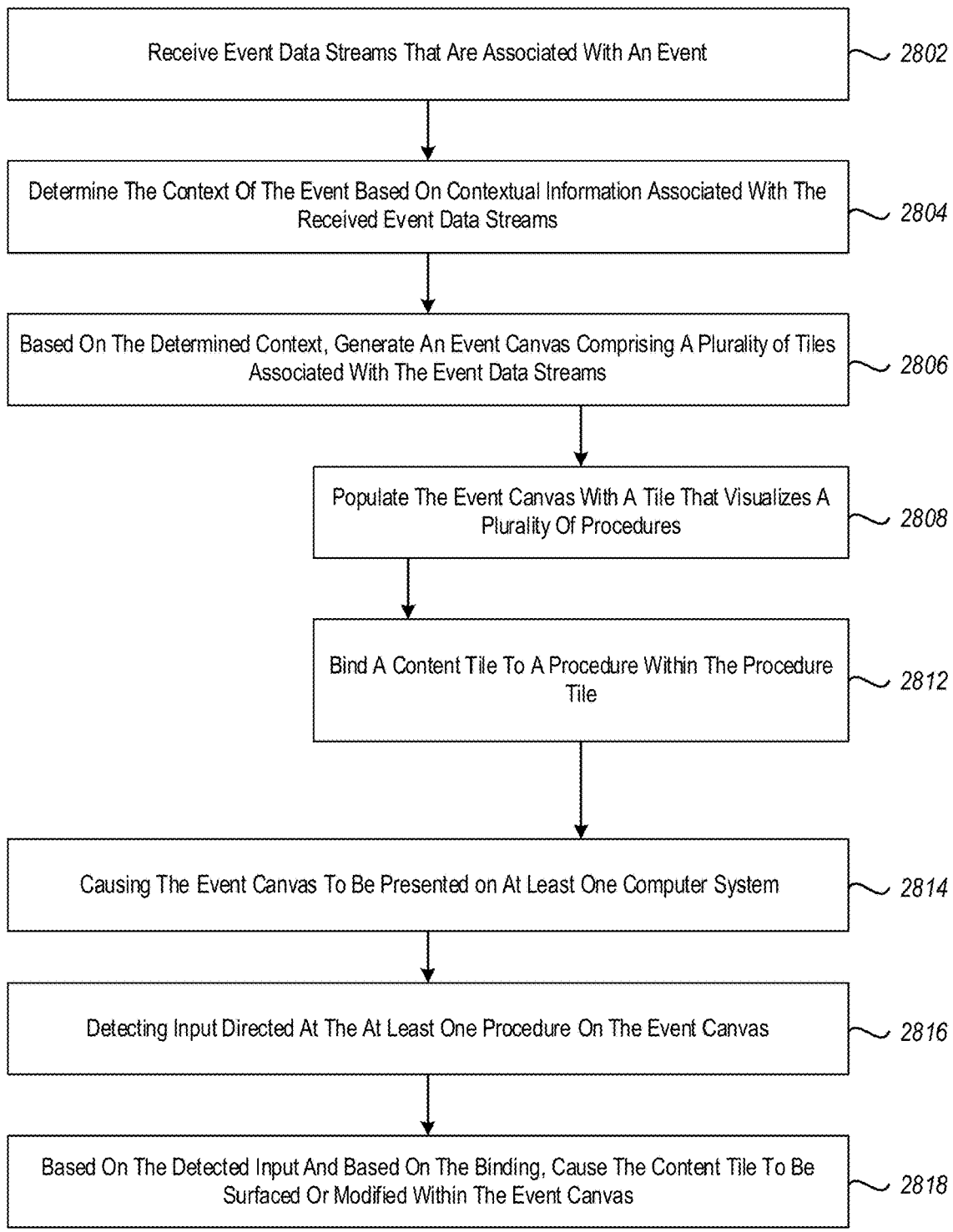
FIG. 28 illustrates a flow diagram corresponding to an exemplary non-limiting method for the dynamic management of an event canvas based on binding control flow among event canvas elements.

FIG. 28 illustrates a flow chart 2800 for an exemplary method of binding elements within an SOP to other event tiles in a contextually generated event canvas.

As illustrated, contextually relevant event data may be surfaced based on binding event data to an SOP. In some embodiments, this begins by performing act 2802 of receiving a plurality of event data streams that are associated with an event. For example, text feeds, video feeds, map feeds, CCC feeds, and other types of feeds may be collected from data sources that are contextually relevant to a type of event.

The context of an event is then determined at act 2804 based on information identified from within the event data streams. As previously described, this contextual information may be tags, metadata, or other information about or within the individual event data.

In act 2806, based on determining the context, a contextually relevant event canvas is generated. Notably, the generated event canvas comprises a plurality of tiles associated with the event data streams. As at least part of the process of generating the event canvas, the system performs act 2808 in which the canvas is populated with a tile that visualizes a plurality of procedures. For example, the canvas is populated with an SOP tile in the manner previously described.

In act 2812, a procedure within the procedure tile is bound to a content tile. For example, a procedure of an SOP tile that includes an instruction to contact a particular responder may be bound to an event tile that collects event data stream data that includes contacts information for the particular responder.

In act 2814, the event canvas is caused to be presented on at least one computer system. Is should be noted, however, that the event canvas may be caused to be presented on numerous computer systems such as, for example, on all computer systems associated with a particular role as previously described.

Notably, the canvas may be presented prior to the binding between the tiles because, as previously described, the tiles are dynamic and change according to context. Accordingly, as context changes, a procedure within an SOP (as one example) may become bound to a different tile because of the change in context.

In act 2816, input directed at the at least one procedure on the event canvas is detected. For example, the input may be detected as having occurred at a first computer system associated with a role that received the event canvas for display.

Based on detecting the input, one of several things may occur. In act 2818, the content that is bound to the procedure is caused to be surfaced within the event canvas. This may involve generating a new tile or modifying the content of an existing tile. For example, the procedure may be modified to reflect the user input (e.g., marked as complete, skipped, reassigned, etc.) In some embodiments, more than one action may occur such as marking the procedure as pending and surfacing the content tile.

In some embodiments, surfacing a bound tile includes visually highlighting the tile within the canvas. For example, the tile may flash, change color, enlarge, move, or otherwise visually change to draw the user's attention toward the bound tile.

In some embodiments, after the user interacts with the bound tile (e.g., the contacts tile), the procedure within the SOP is updated to reflect that an action associated with the bound tile occurred. For example, if the procedure indicated that a responder should be contacted, upon selecting the procedure, the contact tile is visually highlighted. Then, after the user utilizes the contacts tile to actually contact the responder, the procedure within the SOP tile is dynamically updated by the contact tile through the previous binding in order to indicate that the procedure has been completed.

In some embodiments, the SOP tile and bound contacts tile are simultaneously presented at multiple user's computer systems. For example, there may be more than one user assigned to a particular event. In these scenarios, each user may be presented with the same SOP and work on it simultaneously. As can be appreciated, in one embodiment, a first user performs an action that results in the associated procedure being updated (e.g., marked as complete.) Based on this, the same procedure listed in the SOP tile on the second user's computer system is updated to show that it has been completed.

In one embodiment, two different computer systems receive the same procedure tile but the content within the procedure tile differs between the computer systems. For example, as previously described in conjunction with FIGS. 27a and 27b, the two different computer systems may be associated with different roles within the same event. In such cases, the SOP procedures may be different between the two tiles. For example, the differences may include different content listings, different visualization settings, different priority filters, or different procedure assignments. It is also appreciated that any of a number of other differences may also exist according to the present disclosure.

In another embodiment, a current procedure within a presented SOP list is modified prior to being completed based upon a change in the current status. For example, as previously described, a procedure may be listed that includes calling a responder after a fire alarm has triggered. However, a user may indicate—prior to making the call—that a fire alarm was a false alarm. As a result, the procedure indicating to contact the responder may be modified to instead indicate that an IT person should be contacted to investigate the cause of the false alarm.

In another embodiment, the procedure list may be modified by adding, removing, or rearranging procedures based on a change in context. For example, as previously described, a first set of procedures may be associated with a minor alarm. Subsequent to the minor alarm, a more significant alarm may be triggered. In this case, higher priority procedures may be added to the original procedure list in a manner that results in new procedures being inserted above at least some of the original procedures. In some embodiments, procedures can be added, removed, modified, or replaced depending on the updated context.

It is also appreciated that the list of procedures within the SOP may be based upon the role of the user they are presented to. For example, while multiple users may be assigned to the same event, some users may have different roles that reflect different responsibilities, expertise, assignments, access levels, security clearance, or other difference. In such cases, some or all of the listed procedures may be modified to be different that the procedures directed to other users.

It is also appreciated that the binding between an SOP tile procedure and an event tile is not always just a 1:1 relationship. In other words, a particular procedure may be linked to more than one event stream tile at a time and activating the procedure may cause more than one tile to be surfaced at the same time. Similarly, one event stream tile may be linked to more than one procedure within the SOP. For example, a user may select the contacts event stream tile and several procedures may be highlighted to indicate that the SOP includes contacting multiple entities at various stages.

In another embodiment, the binding between the procedures and an event tile functions to allow the procedures to be updated rather than the content tile to be surfaced. For example, if a particular content tile is already present on the canvas, it may be utilized to mark bound procedures in the procedures tile as completed.

This round-trip connection enabled by the binding allows a user to, in some embodiments, surface a content tile from the procedures listing, interact with the content tile to complete the procedure, and then have the content tile communicate back to the bound procedure that the procedure has been completed. Thus, rather than having to manually mark a given procedure as having been completed, the event canvas can provide a round-trip function.

It should be appreciated that this can be accomplished using the same sort of contextually aware principles previously described. For example, as a result of interacting with a content tile, the context of the event may be altered. Accordingly, SOP procedures may be also dynamically modified to reflect the change in context. In other embodiments, however, interacting with a content tile may not change the context but may still round-trip back to the procedures tile and modify the status of a bound procedure.

In another embodiment, interacting with the content tile may cause the procedure listing to be modified in other ways. For example, if a procedure linked to the contacts tab specifies that a specific person should be contact, the content tile may be surfaced to include contact information for that person. However, assume that the person is unavailable when the content tile is utilized. In this case, the content tile may round trip the context (e.g., the procedure cannot be complete because the contact is unavailable) back to the bound procedure. In some embodiments, this may cause the bound procedure to be removed and replaced with a new procedure to contact a different person. In other embodiments, the procedure may be directly modified and used to surface a different tile, for example a new contact tile for a different contact.

In some embodiments, the procedures may be rearranged so that subsequent procedures may be accomplished while waiting to return to the previous procedure. For example, if it is determined that the contact went straight to voicemail, that procedure may be moved to a later position in the sequence listing so that the contact can be tried again when the contact may be available.

Dynamic Multi Monitor Display and Flexible Tile Display

Attention will now be directed to FIGS. 29-34. These figures illustrate systems, methods and visualizations of embodiments for providing and modifying a plurality of different tiles of different types, such as the tiles described above, which can be used with the above-described canvas interfaces (as well as with other type of graphical user interface configurable to render content tiles), particularly canvases and interfaces that render content tiles according to layout presentations that are dynamically and automatically modified to accommodate different display areas and display systems having different display configurations (e.g., single monitor configurations, two-monitor configurations, three or more monitor configurations, partial monitor display area(s), full monitor display area(s), etc.).

As previously mentioned, the disclosed embodiments can facilitate the rendering and dynamic modification of display canvases and display tiles to accommodate different display systems having different monitor and display area configurations, as well as particular user preferences, by providing different types of tiles (having different display properties) for reacting differently to display area boundaries.

For instance, in some embodiments, two different types of tiles are used with the canvas displays, including a first set of tiles of a first type (e.g., boundary non-spanning type tiles) that are configured to prevent these tiles of the first type from spanning a particular type of boundary in the display area where the canvas is displayed.

Each of the tiles of the first type has display attributes (e.g., parameters or properties), including a first display parameter/property (e.g., a boundary non-spanning parameter/property) that (when set to an active state) triggers a modification of the layout presentation of the canvas by causing/modifying the display characteristics of one or more tiles in the first set of tiles to be automatically resized and/or repositioned (or to have another display characteristic modified, such as transparency, coloring, etc.) within the canvas layout presentation when it is determined these boundary non-spanning type tile(s) will overlap a particular type of boundary of the display area of a designated display system during rendering of the canvas.

The mere classification of a tile as a boundary non-spanning type tile or tile of a first type is enough in some instances to trigger the existence of the boundary non-panning parameter/property for that tile and/or to set it to an active state. In other instances, a user must provide additional user input to set the tile to the active state and/or a priority setting associated with the tile must be set to a certain threshold (automatically in response to contextual information such as content type and/or relative priority to another tile and/or in response to user input).

The display parameters of the different tiles (also referred to as display properties and display attributes) are stored in the data model 420 and are controlled by the tile component 412 to ensure they are displayed properly by different display systems having different display configurations. These display attributes may be explicitly called out in a tile definition, as defined according to a hierarchical classification that includes two different types tile classes or types (e.g., boundary spanning tile types and non-spanning tile types).

According to the model 420, and as specified by the layout and tile components (408 and 412), and as controlled by the display state management 428 and configuration management components 430, each tile definition will also identify (either explicitly or implicitly) the display characteristics of each tile (e.g., size, position, coloring, transparency, animation, etc. within the canvas), as well as the corresponding objects and methods associated with each tile/tile type.

The objects for each tile identify/define the content types to be rendered with the tile(s), as well as the drivers to use for accessing/rendering the content. The methods can define/include scripts for accessing, updating, parsing, rendering the content in the tile on the canvas, as well as for accessing, instantiating the drivers of different systems/services for rendering the content, as executed by the business logic 418.

The defined tile methods may also include scripts for modifying the tile display characteristics and/or presentation of a tile, based on the tile priority relative to other tiles in the canvas, and based on detected identifiers of the content and/or user input (e.g., move/resize input). The methods can also trigger modification of the relative tile priority, which may be defined as one of the tile properties, on any type of priority scale that provides for relative priorities (e.g., h/m/l, 1-10, on/off, etc.). These priorities may be maintained as one of the tile attributes/properties.

In some instances, the methods can also include scripts for activating/deactivating the boundary non-spanning parameter/property and/or for updating definitions of the particular types of boundaries that are prohibited to be overlapped by the tile of the first type. In such instances, the boundary non-spanning type includes designations/identifiers of the types of boundaries that are prohibited to be overlapped by tiles of this type.

In some embodiments, the definitions of the particular types of prohibited boundaries to be overlapped by the first type of tile are maintained/modified by one or more of the business logic 418 components.

It will be appreciated that the determination of whether a tile of the first type will overlap with a particular type of boundary that it is prohibited to overlap is a function of the type of prohibited boundary and that configuration of the display system. For instance, if the prohibited boundary is the edge boundary between two adjacent monitors, and the system has two monitors, then there will be only one such prohibited boundary. Alternatively, a multi monitor system having three monitors positioned adjacently would have two adjacent edge boundaries of this type of prohibited boundary.

The data model 420 and corresponding canvas displays (as described herein) also include a second type/set of tiles, which are a different type than the first type. These tiles can be referred to as boundary spanning type tiles (even though it is not required for these tiles to span/overlap the particular/prohibited type of boundary during display of the tile(s)).

The second type of tiles, the spanning type, each omit the first display parameter/property of the first type (e.g., they omit the boundary non-spanning parameter/property) or, alternatively, include the boundary non-spanning parameter/property in an inactive state. Accordingly, the second set of tiles will be displayed with the canvas on one or more different display systems without being automatically resized and/or repositioned to avoid overlapping the particular type of boundary within the display area(s) (e.g., without reacting to a determination that this particular type of tile overlaps with a boundary of the particular type and/or without even making the determination of whether the tile(s) of the second type will overlap with the boundaries of the particular type).

Notwithstanding the foregoing omission of the boundary non-spanning parameter/property in the second type of tile, which can trigger modifications for the first type of tile, the second set of tiles may still be modified (e.g., repositioned and/or resized) due to and in response to the one or more modifications to the canvas layout presentation triggered by the corresponding modifications to the first type of tile to prevent the first type of tile from overlapping the particular type of boundaries in the layout presentation of the canvas, as rendered in the corresponding display areas of the designated display systems.

The modifications to the presentation layout based on modifications to the first type of tiles, as well as modifications to the layout presentation that are independent of the modifications to the first type of tile, which can correspondingly cause modification to the display of the second type of tile, can also be triggered automatically in response to detecting a new type of content being rendered in one or more existing tile(s) (which may change a tile type from a second type to a first type, for example, by changing the boundary non-spanning parameter/property from an inactive state to an active state. Notably, the boundary non-spanning parameter/property of a first type of tile can also be changed to an inactive state in response to detecting a particular type of content identifier and/or relative de-prioritization of the tile, such as the relatively increased priority of another tile).

The modification of a single tile (of either type), which can affect the layout and presentation of the other tiles can also result from user input that is received and that triggers a change in how a tile is sized/positioned within the canvas.

In some instances, content identifiers can also dynamically trigger a modification in how a tile is displayed in the layout (e.g., by changing a size or modifying a position of the tile to visually emphasize or de-emphasize certain content in the canvas). As the content is received from a third party, the content identifiers (e.g., explicit tags and/or inferential identifiers that are interpreted by the system and/or parsed out of the content) can be used and applied by the layout and tile components (408 and 412) according to the template management and configuration settings to prioritize/deprioritize certain tiles relative to other tiles in the layout, by changing the priority property. This can result in (according to the business logic and template settings) the modification of a size and/or position of the tile in the canvas.

Different priority settings can be associated with triggers for activating and/or deactivating the boundary non-spanning parameter/property. Different priority settings can also be used for triggering the modification of the tile display characteristics relative to the display area of the designated display system, such as a specific location on a particular monitor (e.g., top left corner of left most monitor or centered in the center of the display area, etc.).

Alternatively, the display characteristics can be relative display characteristics that specify a relative position to another tile in the canvas, based on priority of the tiles. For instance, for rendering the tiles in particular locations within the canvas (e.g., above/below the tile(s) having a different priority, to be rendered X % larger than or smaller than the tile(s) with the different priority, or left of or right of the tile(s) with the different priority, etc. The different display/priority settings can be specified for each type of display configuration (e.g., single monitor, two-monitor, three-monitor, more than three-monitor, partial/full monitor, etc.) as controlled by the business logic.

With regard to tile display modifications, it will also be appreciated that the addition or removal of a tile to the canvas layout presentation (e.g., when new content is received and presented in a new tile and/or when old content is determined by the system to be no longer relevant for a tile that is then closed, and/or a user closes a tab) can trigger cascading modifications for the tiles in the canvas layout. Likewise, when the business logic 418 detects a change in the display configuration(s) of the client 402, which can include changing a quantity of monitors and/or display area on the monitor(s), this can trigger a change in the canvas layout, as defined by the business logic components and layout and tile components described in reference to FIG. 4.

While the foregoing embodiments distinguish only two types of tiles relative to avoiding particular boundaries, it will be appreciated that there may also be additional types of boundaries that are distinguished from the first and second types of boundaries in that they have different boundary non-spanning display parameter/property settings, such that one or more first types of tiles have non-spanning display parameter/property settings to prevent the first types of tiles from overlapping a first set of one or more boundary types, while one or more second types of tiles include non-spanning display parameter/property settings that are different and specifically configured to prevent the second types of tiles from overlapping a second/different set of one or more boundary types and while one or more third types of tiles include non-spanning display parameter/property settings that are different and specifically configured to prevent the third types of tiles from overlapping a third/different set of one or more boundary types, etc. For instance, the first type of boundary may be an adjacent edge boundary between monitors, the second type of boundary may be a monitor edge boundary including non-adjacent edge boundaries, and the third type of boundary may be an application boundary. Other types of boundaries may include user specified boundaries or system detected boundaries that are automatically detected in response to the layout component 408 monitoring the system configurations (e.g., defective portions of a display, etc.).

Figure 29:
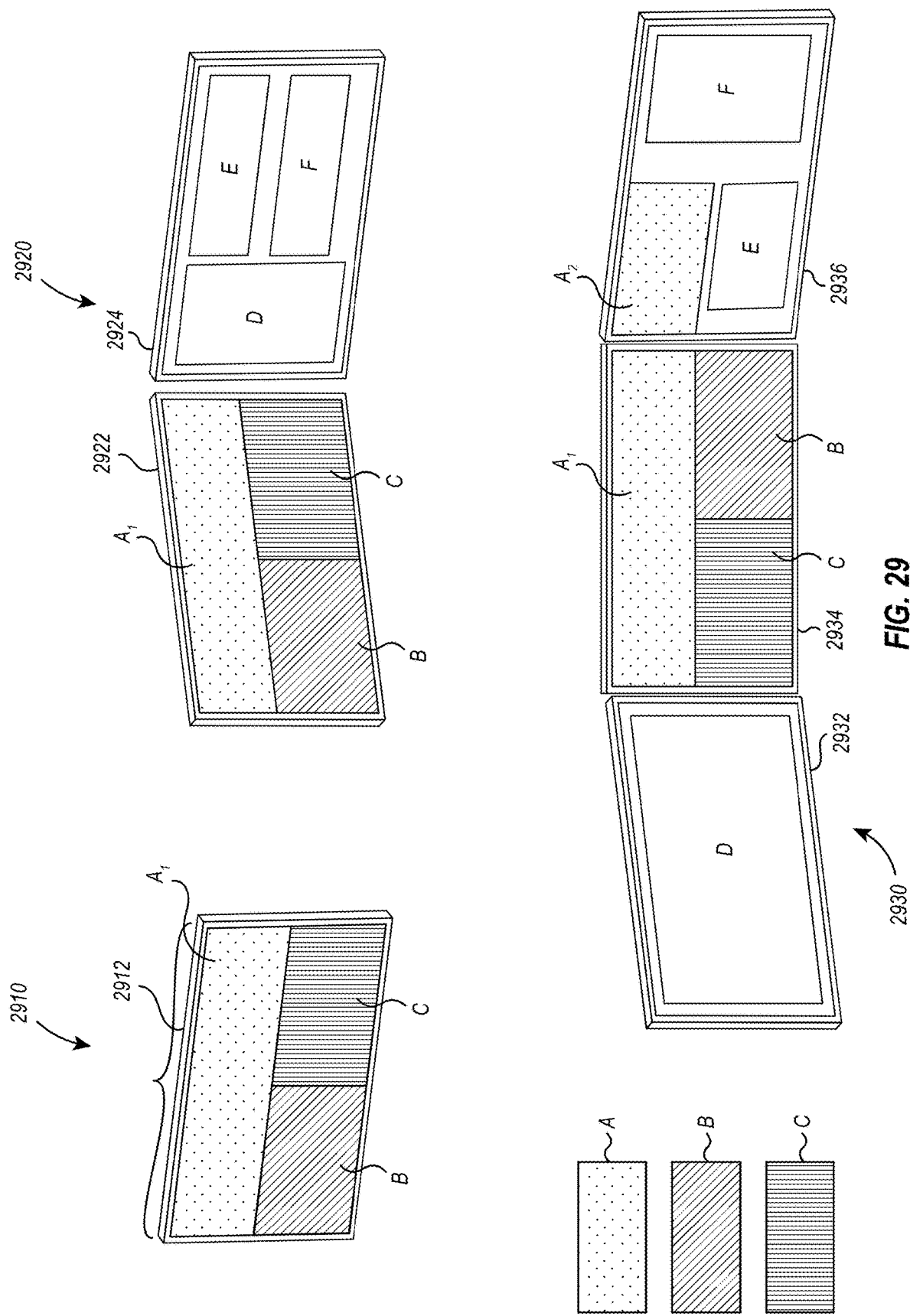
FIG. 29 illustrates a plurality of different tiles that can be rendered with a canvas display, as described herein, and a plurality of different display systems that include a single monitor display system and two separate multiple monitor display systems (in a horizontally adjacent configuration, and which could also be in a vertically adjacent configuration), each display system rendering the different tiles.

FIG. 29 shows three different tiles (A, B, C) that are rendered as part of a canvas display on three different system configurations (i.e., display system 2910 with a single monitor 2912, multi monitor display system 2920 with two monitors 2922 and 2924, and multi monitor display system 2930 with three monitors 2932, 2934 and 2936). Each system is rendering a different template/canvas layout presentation of the canvas and corresponding tiles according to the display attributes defined by the tiles, as generally described above, wherein C is currently configured as a boundary non-spanning tile (to not span a prohibited adjacent edge boundary between monitors) and tiles A and B are both configured as a boundary spanning tile that can span adjacent edge boundaries.

In this configuration, tiles A, B and C are rendered in a layout in system 2910 that presents tile A with content A1 above tiles B and C, with no tile spanning a boundary of any type, even though tiles A and B could span adjacent edge boundaries.

When the same canvas is presented in system 2920, the layout is the same in a first monitor 2922, while the second monitor 2924 contains other elements (D, E, F) that may comprise any other application or interface element. This result may occur when the user has specified or limited the display area for the canvas to only a single monitor, for example. Alternatively, this may result from a setting in the template for the canvas that indicates that if the user is running other applications that the other applications are to be maintained on a separate monitor than the canvas, such that it is treated as a single monitor configuration. So, even though there is an adjacent edge boundary that tiles A and B could span, due to the multi monitor system, they can't because the display area is effectively set to one monitor having no adjacent edge boundaries. Accordingly, the template/canvas layout is not modified by the system relative to the display/template used for system 2910.

System 2930, on the other hand, illustrates how (based on certain layout/template settings) the boundary spanning tile A can now span an adjacent edge boundary between two monitors (2934 and 2936). In this embodiment, tile A is also presented as having content A1, as well as A2, based on the template/display area permitting tile A to extend/expand into the extra space on monitor 2936, which is created because element D of system 2920 is now moved out of the way to its own monitor 2932. This may be beneficial, for example, when tile A contains map content or another type of content that is expansive and that can show new portions of the map/content when possible. The same can be true for listings or any other content for which A1 is only a subset of the total useful information that can be rendered in tile A (but perhaps the most contextually relevant portion of the content), and wherein it is desirable to present more of the A content when possible so that the user doesn't have to scroll controls in tile A (not shown) to access the other related content.

Layout component 408 communicates the available display area where tile A can be rendered the business logic 418 in creating/modifying the template/layout presentation before it is received and/or after it is received at the client display system. The same timing, for creating/modifying the templates before and/or after they are distributed for display may occur for all of the examples provided herein (including the following examples shown in FIGS. 30-32).

Figure 30:
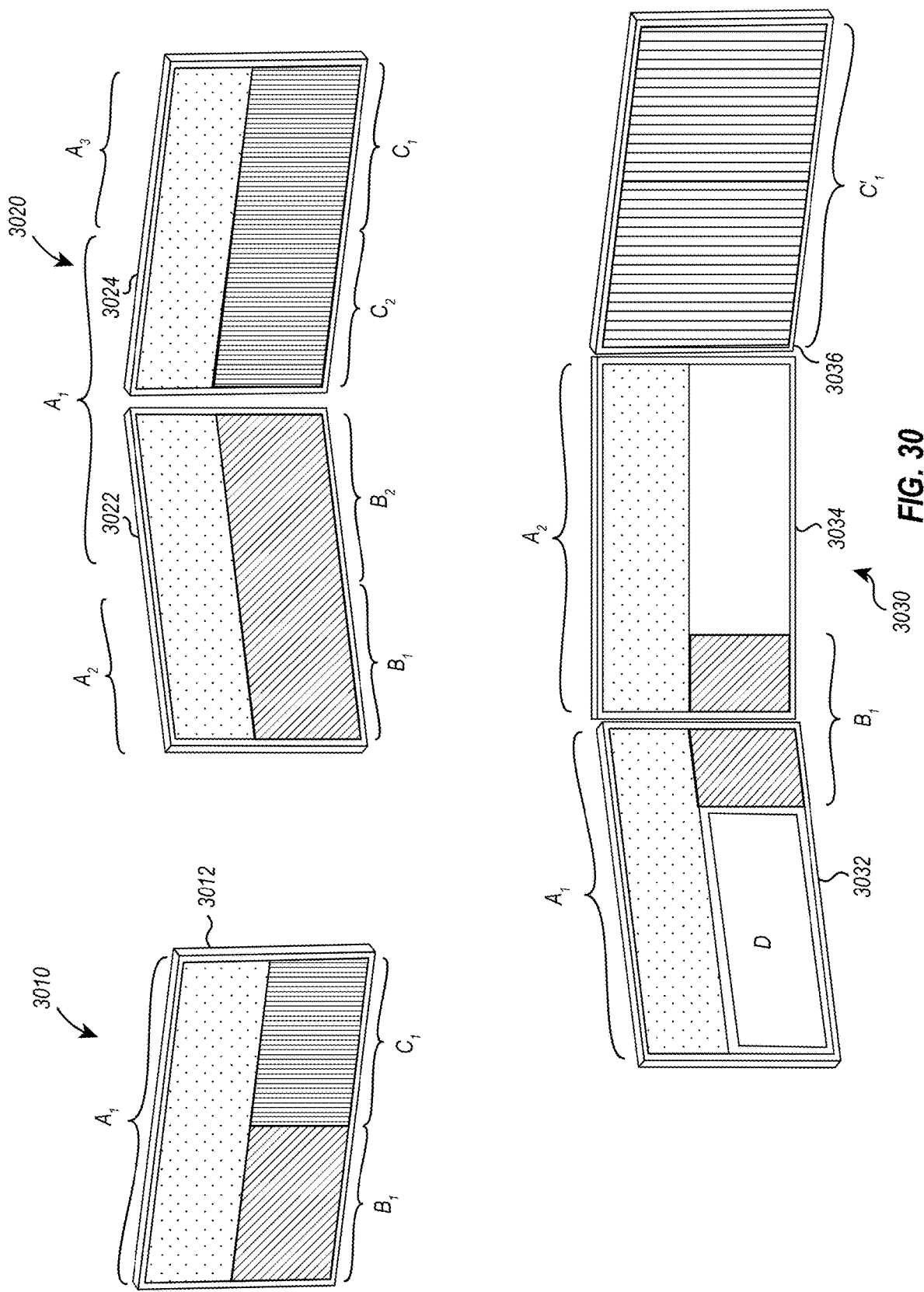
FIGS. 30-32 illustrate additional configurations of the tiles and the display systems shown in FIG. 29, corresponding to different display modifications made to the tiles/canvas displays, based on different tile formatting parameters of the tiles and according to different layout presentations of the canvases, particularly as rendered on the different display systems having display areas with different display/monitor boundaries.

In FIG. 30, systems 3010, 3020 and 3030 each render a similar canvas display that includes similar tiles to those described in FIG. 29, namely tiles A, B and C having texturing similar to that of FIG. 29. In this instance, tiles A and B are still configured as boundary spanning type tiles and tile C is configured as a boundary non-spanning tile, with the defined boundary that cannot be spanned as an adjacent edge boundary. This means that every time that the canvas layout presentation/template for the canvas is established/modified for rendering on any display configuration, the system will make a determination as to whether the tile C will overlap the prohibited boundary of the particular type prohibited by that type tile. If it would, then, the display attributes of that tile are modified in the template/layout presentation to cause rendering of the tile. Each of the systems 3010, 3020 and 3030 render the canvas in a different template/layout presentation.

In this embodiment, system 3010 renders the canvas/template on a single monitor display that renders tile A as content A1 above tile B and C. Tiles B and C are rendered as content B1 and C1, respectively.

In system 3020, however, the layout presentation is modified for the canvas, since tile A is a boundary spanning tile and due to the display attributes of the system 3020 providing a display area big enough to span two monitors. According to the current template/layout settings, tile A is now expanded (augmented not scaled) to fill both monitors 3022 and 3024, as content A1, as well as supplemental content A2 and A3. The system and/or tile A may identify and obtain the supplemental content when there is additional display area for rendering it. Alternatively, the system/tile refrain from requesting the supplemental content if it is not configured to obtain new content and to simply scale the content instead (as specified by display attributes of the tile).

In this instance, monitor 3022 also displays tile B with content B1, as well as supplemental content B2. Similarly, monitor 3024 displays tile C with content C1, as well as supplemental content C2. Although the expansion of all three tiles, in the current embodiment, involves the supplementing of the tiles with additional content, it will be appreciated that expansion of a tile in a display area does not necessarily mean that it will obtain/include supplemental content, which there may not be any of and/or which may be more computationally expensive to obtain than simply scaling up the available content.

System 3030 is shown with three monitors for rendering the canvas for tiles A, B and C, albeit with a different layout presentation/template than used for systems 3010 and 3020. As shown, monitor 3036 renders tile C with content C1 in an upscaled layout presentation (designated by C1). However, in this instance, tile B is rendered over both monitors 3032 and 3034, spanning the adjacent edge boundary between the two monitors, without being expanded.

The positioning and size of tile B may result from the tile display attributes, such as, for example, display attributes that indicate a position of tile B to the left most and lower portion of a display area for the designated system, which is where it is shown. The Area occupied by element D may have been excluded from the display area (which includes the rest of the display areas for monitors 3032, 3034 and 3036) by the user and/or system, as described above.

Notably, there is now an empty space on monitor 3034, this area could be filled with additional/scaled content for tiles A or B or new tiles, if component 408 and business logic permit it to be filled in the new/modified template. However, it cannot be filled with tile C content, due to tile C being set as a boundary non-spanning type tile and inasmuch as the prohibited boundary in this instance is an adjacent edge boundary.

Figure 31:
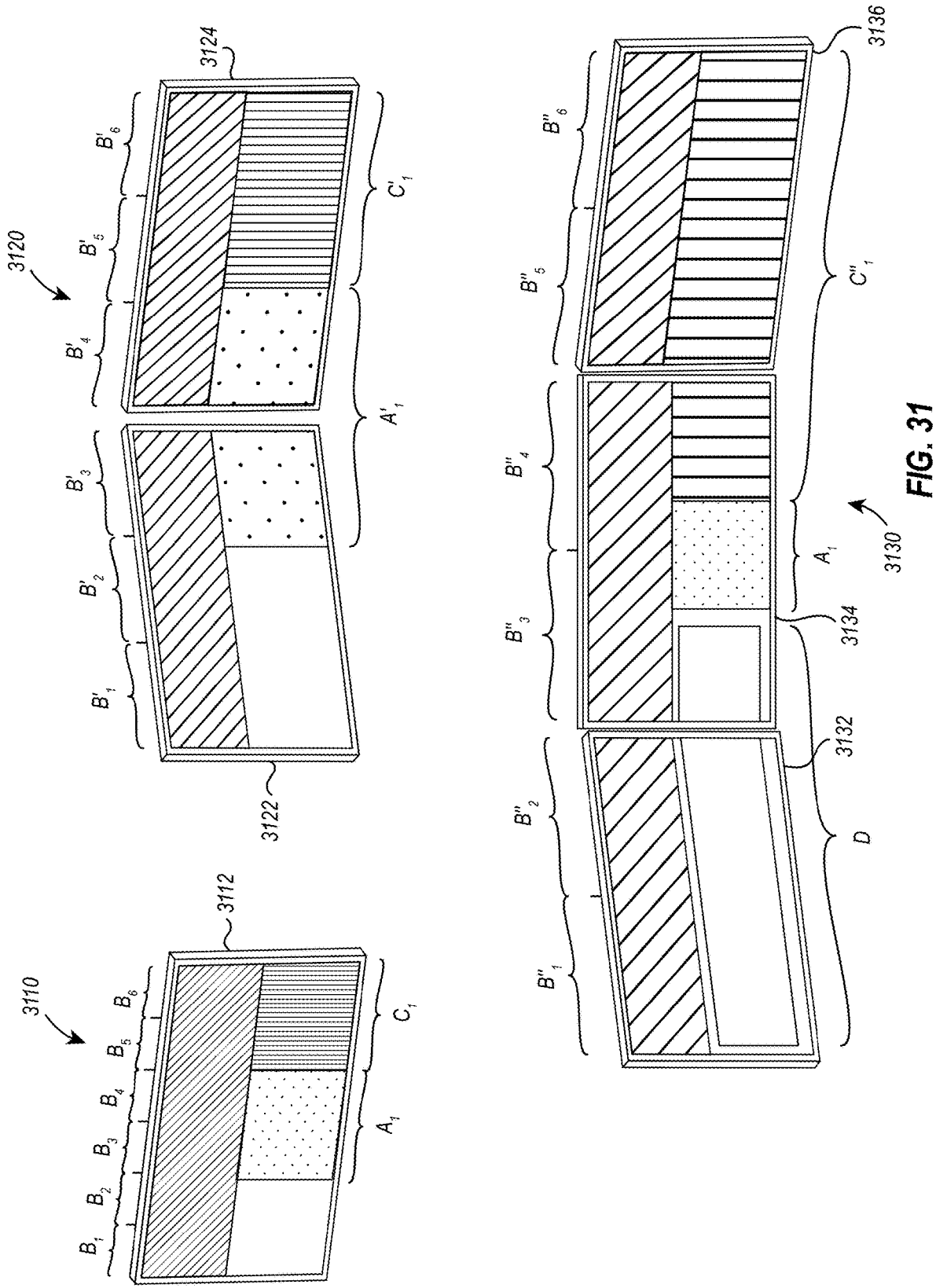

In FIG. 31, systems 3110, 3120 and 3130 each render a similar canvas display that includes similar tiles to those described in FIGS. 29 and 30, namely tiles A, B and C having texturing similar to that of FIG. 29. Each of the systems 3010, 3020 and 3030 render the canvas in a different template/layout presentation.

When the tiles are presented by system 3110 content for tile B is presented in a top portion of the monitor 3112. In this instance, the priorities of tiles A and/or B have changed, and this has caused tile B to now be rendered above tile A and in a larger portion of the display area, which may occur according to the layout presentation rules for any of the various reasons referenced above. When rendered on system 3120, the content of tile B (i.e., B1, B2, B3, B4, B5, B6) is scaled up, spanning adjacent monitor edge boundaries, to fill the total available area designated to tile B by the template/layout presentation and according to the display attributes of system 3120. Likewise, content C1 of tile C has been scaled up, as has the content A1 of tile A, such that tile A also spans the boundary between monitors 3122 and 3124.

In system 3130, the layout presentation for the canvas was changed from the format used for systems 3120 to accommodate the display attributes of the system (e.g., 3 monitors). This results in tile B spanning its upscaled content across three monitors and the content of tile C being upscaled to span two monitors. Tile A, however, has not been upscaled. This may be result, according to current settings, from a down grading of the priority for tile A (due to user input, content identifiers, or relative upscaling of tiles B and/or C). Alternatively, tile A could have been initially upscaled and then subsequently downscaled (dynamically) in response to the system 3130 rendering element D as a separate system interface that removes some of the display area that was initially designated for the canvas and tile A, or when/if element D is rendered as a new tile in the template/canvas due to contextual changes to an event associated with the canvas or when/if element D is a new tile triggered by to user navigation of another displayed canvas tile (possibly even tile A).

Figure 32:
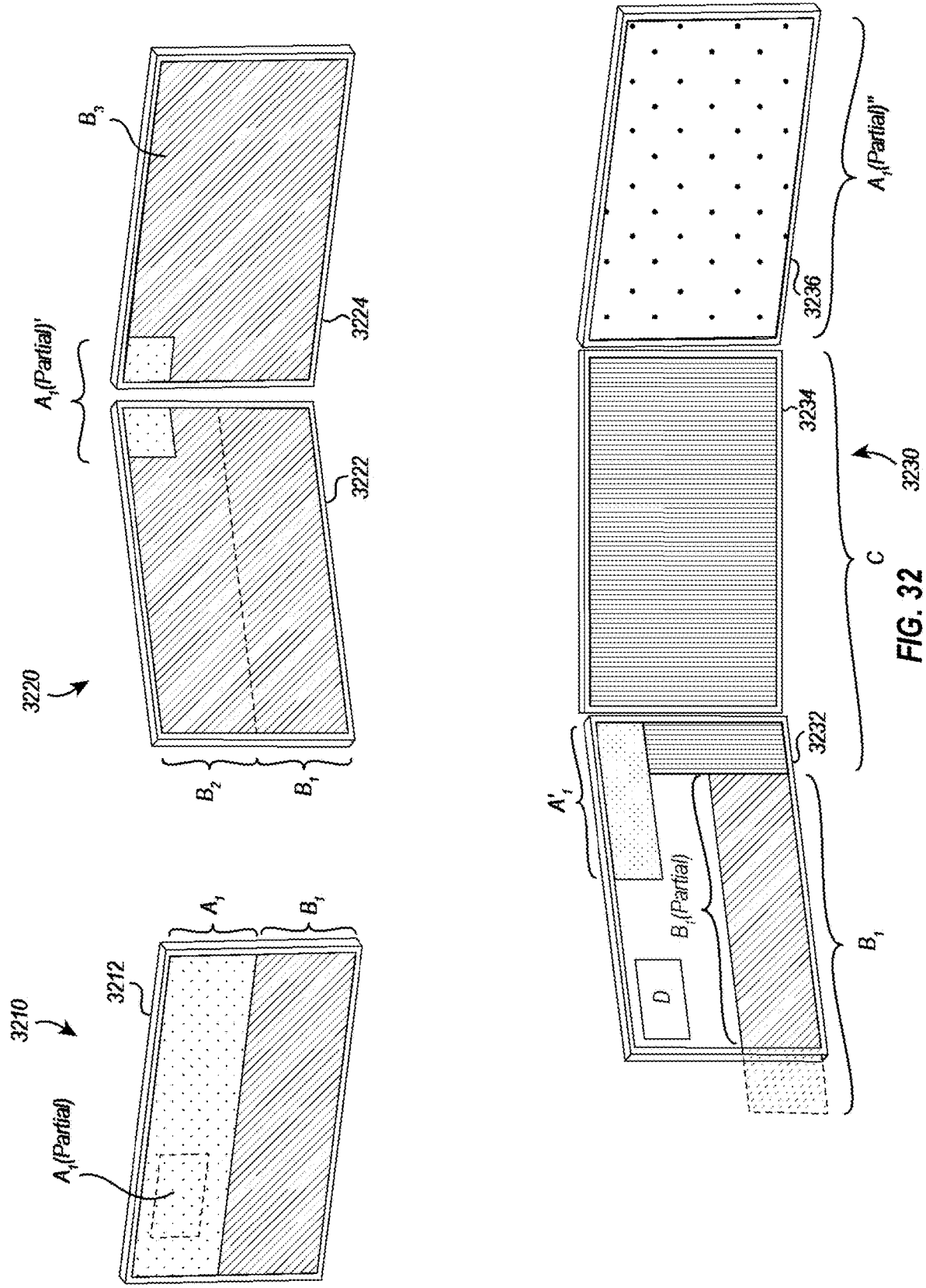

FIG. 32 shows yet some additional functionality for dynamically modifying the canvas layout presentation/template and tiles according to different conditions, including display configurations for different systems.

In FIG. 32, a first system 3210 has a single monitor 3212 that is rendering a canvas containing two tiles (A and B), which are displayed as content A1 and B1, respectively. A selected portion of content A1 is identified as content A1 (Partial). Both of the tiles (A and B) are designated as spanning type tiles, for adjacent edge boundaries, even though there is no such boundary in the current system 3210.

When the canvas is rendered on system 3220, however, there is an adjacent edge boundary between monitors 3222 and 3224. According to the current rules and modified template/layout presentation setting for the display attributes of system 3220, tile B is expanded to include content B1, B2 and B3. Tile A, however, has been downsized to only render content A1 (Partial)', which is less than the content A1 that was rendered in a single monitor system (3210). Content A1 (Partial)' is also in a new location on the new display system 3220 (centrally located, but at the top of the display), while freeing up the rest of the display area of the display system for content B1, B2 and B3. This may be a result of different settings for the different monitor configurations, based on what is typically important/prioritized for a two-monitor system relative to a one monitor system (such as based on the personnel and tasks associated with those personnel and specific configurations of monitors for those personnel.

When the same canvas is rendered on system 3230, however, then the content for tile A is split into two different presentations, namely content A1 (Partial), which is upscaled in monitor 3236, with settings to fill a full monitor, as content A1 (Partial) "and a full presentation of downscaled content A1 in a separate but related tile in monitor 3232 as content A1'. Accordingly, in this embodiment, spanning a tile is performed by splitting and rendering the tile as two separate tiles, even though some of the content may be the same (e.g., content A1' will include A1 (Partial)).

In this embodiment, to show the flexibility and versatility of the system, it is noted that the content B1 for tile B is shown has spanning a different type of boundary, namely an edge boundary that is a non-adjacent edge boundary between monitors. The tile properties can specify that this can happen, when set to accommodate such preferences. To access the portion of content B1, the user may need to scroll the content with controls (not shown).

The canvas layout presentation in system 3230 could occur, in one non-limiting example, after first displaying a layout presentation more similar to that shown in system 3220 (with content of tile B covering all three monitors 3232, 3234 and 3236, except for a portion of monitors 3234 and 3236 rendering content A1 (Partial)'), but which is dynamically modified in response to a user selecting and drilling down into content A1 (Partial)'. Such an event could trigger generation of the new layout by rendering a new tile C (which has properties to span a first type of boundary (an adjacent edge boundary between monitors, as well as other tile boundaries up to a full rendering of content for the tile, but wherein the tile has a transparency that does not allow it to be seen in view of the coverage by other less transparent tiles, such as the tile showing content A1.

Figure 33:
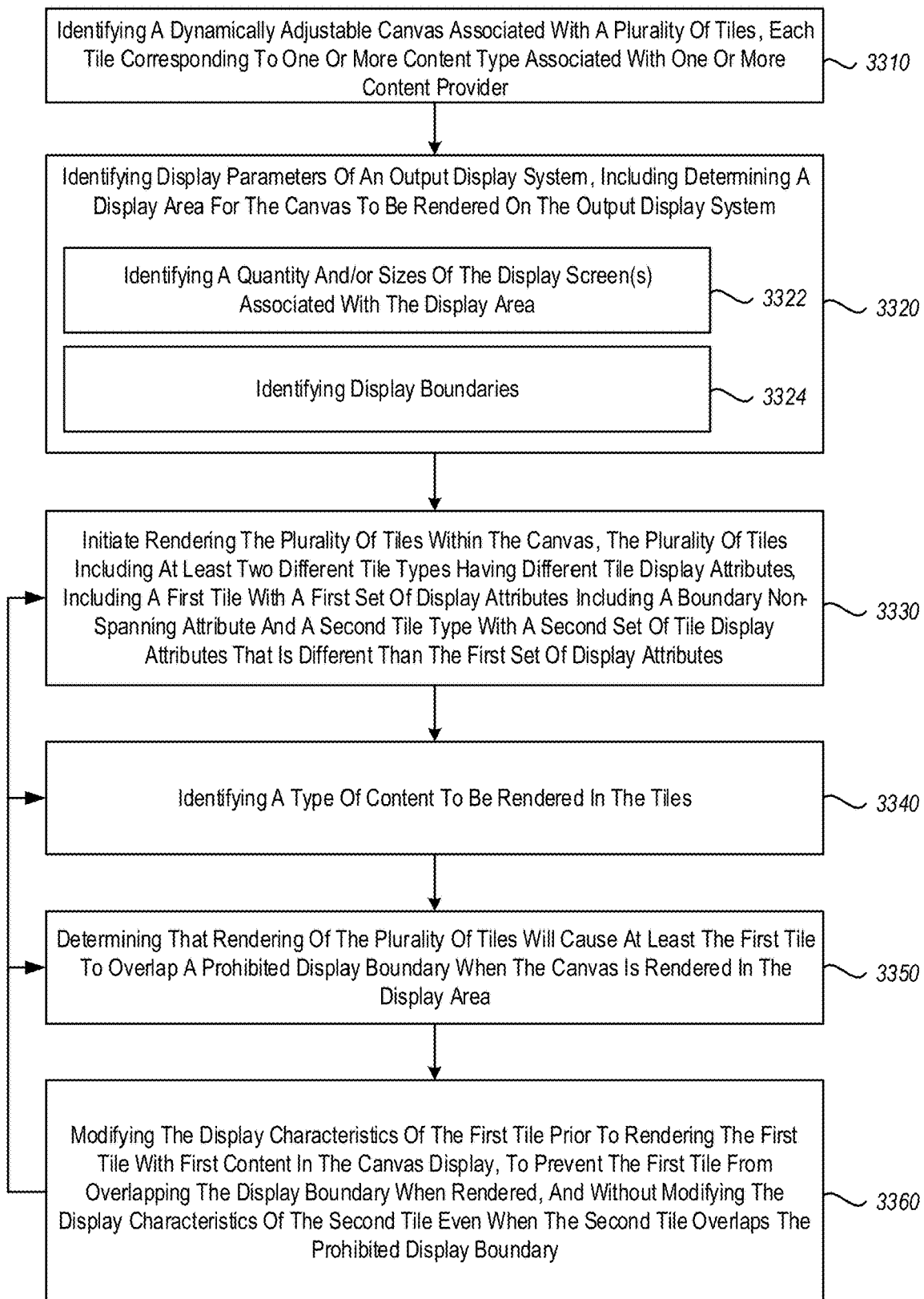

The functionality for providing the dynamically modified response can be accomplished by the systems described in FIGS. 3 and 4 including and/or executing executable code stored on one or more hardware storage devices with one or more hardware processors of the systems to instantiate/implement the various components described and to thereby implement the acts and steps shown and described in FIGS. 33 and 34 and throughout this disclosure.

The methods and corresponding flowchart 3300 of FIG. 33 includes a plurality of acts, including an identifying a dynamically adjustable canvas associated with a plurality of tiles, each tile corresponding to one or more content type associated with one or more content provider (act 3310).

The method also includes the step of identifying parameters of an output display system, including determining a display area for the canvas to be rendered on the output display system (step 3320). This step may include, for example, acts of identifying a quantity and/or sizes of the display screen(s) associated with the display area (act 3322) and identifying display boundaries (act 3324) of the display system. This may also include determining whether the display area is configured within horizontally adjacent display screen(s) and/or vertically adjacent display screen(s) and which portion(s) of each screen are designated as part of the display area. In some instances, the canvas application specifies the display area. In other instances, the operating system designates which portions of the display screen(s) may be used by the canvas application for the display area based on an analysis of other applications running at the same time. This step may also include identifying portions of the display screen(s) that are damaged and that should be excluded from the display area. In some instances, the display area is a contiguous display area (as shown). In other embodiments, the display area includes a plurality of non-contiguous display areas from the display screen(s) (not shown).

Next, rendering of the plurality of tiles is initiated within the canvas, the plurality of tiles including at least two different tile types having different tile display attributes, including a first tile with a first set of display attributes (including the boundary non-spanning attribute, described above, for a particular prohibited type of boundary) and a second tile type with a second set of tile display attributes that is different than the first set of display attributes (in that it omits the boundary non-spanning attribute, or has it set to an inactive state) (act 3330).

In some instance, the type of content to be rendered in the tiles also occurs (act 3340), which content type may be used, as described above, to trigger modification of a tile priority and/or tile type. The content type may also be used to trigger a call for drivers configured to render the content within the tile on the display.

The method also includes making a determination whether rendering of the plurality of tiles according to a layout presentation of the canvas will cause at least the first tile to overlap a display boundary that is a prohibited type when the canvas is rendered in the display area according to the layout presentation (act 3350). In some instances, this includes actually determining that the first tile will/would overlap the prohibited type of boundary in the current/anticipated layout presentation of the canvas on in the display area for the designated display system, which will trigger a subsequent modification to the layout/tile (act 3360). This is an iterative process the system goes through when developing the different templates for display on different multi monitor display systems to ensure that the tiles of the boundary non-spanning type are not rendered in a layout in which they overlap a prohibited boundary of the display area for any one of the different display configurations.

Accordingly, the modifying of the display characteristics of the tile may be made when modifying the template/canvas layout presentation for the first tile prior to rendering the first tile with the corresponding content in the canvas display and to thereby prevent the first tile from overlapping a prohibited display boundary when rendered. As described earlier, modifying is done without modifying display characteristics of the second tile that omits the boundary non-spanning attribute to avoid spanning the prohibited display boundary. That said, sometimes the modification of the first tile will trigger a cascading modification of the second tile to form a best fit of the tiles within the canvas and/or to accommodate a new/different positioning/size of the first tile. In some instances, the modification of the tile display characteristics can also be based on tile priority, content type and/or user input.

FIG. 34 illustrates a flowchart 3400 of similar methods with related steps and acts as that of FIG. 33. For instance, as shown, the first act is an act for identifying or providing a dynamically adjustable canvas associated with a plurality of tiles, the canvas being configured to be automatically and dynamically adjusted in size to accommodate one or more different display areas identified for rendering the canvas, each tile corresponding to one or more content type (3410).

As described earlier, the canvas and plurality of tiles include a first set of one or more tiles of a boundary non-spanning tile type that each have a boundary non-spanning parameter that restricts rendering of the tile so that is will not be rendered overlapping with a particular type of boundary in any display system configuration. This boundary non-spanning property causes the one or more tiles in the first set of tiles to be automatically resized and/or repositioned within a canvas display layout display when it is determined the tile(s) would overlap the particular type of boundary of the display area that it is prohibited to overlap. The modification of the tile may occur during processing of a canvas template (layout presentation) for rendering of the canvas within the display area(s) and/or during creation of the canvas template, prior to the canvas template being presented to the rendering system, and such that the first set of tiles will ultimately be rendered according to the layout presentation within the display area without any of the first set of tiles overlapping the particular type of boundary by the rendering system, irrespective of the rendering system display configuration and quantity and types of monitors being used by the system.

The tiles also include a second set tiles of a different type (e.g., a boundary spanning type), comprising one or more tiles configured to be at least partially and automatically displayed during rendering of the canvas irrespective of whether the boundary spanning type tiles would overlap a boundary of the type prohibited by the boundary non-spanning attribute of first tile type.

The second set of tiles omits this boundary non-spanning attribute or has it set to an inactive state relative to that particular type of boundary (even though it may have one and/or have one set as active for a different type of boundary). As configured, the second set of tiles is displayed without being automatically resized and/or repositioned to avoid overlapping the particular type of boundary prohibited by the first tile type within the display area(s), even though the second set of tiles may be repositioned and/or resized in response to a modification of the first set of tiles when generating/modifying the layout presentation.

The method also includes the step for obtaining/generating the layout presentation of the canvas for rendering the canvas within the display area(s) (step 3420) and which may include corresponding acts for determining the display attributes of the display area, including identifying at least one boundary of the display area(s) and determining whether the at least one boundary includes the prohibited type of boundary specified by the boundary non-spanning property (3422). It may also include identifying display characteristics of the tiles (including first and second tiles), such as the tile sizes and/or positions within the canvas and/or relative to other tiles, based on other display attributes/parameters of the plurality of tiles (e.g., priority, content type, etc.), as well as based on the display attributes of the display area(s) (e.g., monitor quantity and type and type and position of boundaries) (act 3424).

The generating of the layout presentations for different display configurations (step 3420) may also include modifying the layout presentation for particular system configurations during initial template creation and/or after the template(s) are initially created and in response to detecting a change in the display area(s) for rendering the canvas (act 3426), e.g., such as in response to a new user input or a detected failure of a display component or portion of a display.

The method also includes the step for rendering the canvas within the display area(s) of the designated display system(s) without any of the first set of boundary non-spanning tiles overlapping a boundary of the particular type of boundary (step 3430) in the resulting displays.

This step may include an act for ensuring that the first set of tiles having the first display parameter do not overlap the particular type of boundary (act 3432). This may include the layout component 408, for example, examining the mapped display locations for the tile and validating that the mapped display locations of the tile do not correspond to two different display devices and/or extend beyond a monitor edge. If it does, it will trigger a modification/creation of canvas layout presentation that does not have such a problem, my moving and/or repositioning the tile and, in some instances, one or more other tiles in the layout presentation until the problem is resolved. Notably, this act may occur without ensuring that the second set of tiles do not overlap the particular type of boundary. Accordingly, the rendering of the canvas (step 3430) may actually include rendering at least a portion of one of the second set of tiles overlapping the particular type of boundary that is prohibited to be overlapped by the non-spanning display parameter of the first tile type (act 3434).

The rendering of the canvas (step 3430) may also include modifying the layout presentation in response to detecting one or more tile(s) to be added to or removed from the canvas and/or in response to a detected change in a content being rendered in one or more of the plurality of tiles and/or in response to a detected change in the display area(s) (act 3436), as described throughout this disclosure.

When the same canvas is rendered on multiple different systems, it will be rendered differently with different layout presentations and different corresponding sizes and/or positioning of the canvas tiles within the different display areas of the different systems having different display configurations (act 3438).

It will be appreciated that the foregoing methods, steps and acts may be performed with the systems and various processes described in reference to FIGS. 3 and 4, as well as the rest of this disclosure.

It will also be appreciated from the foregoing, that the disclosed embodiments can be used to provide significant improvements in the manner in which a computing system is enabled to dynamically create and update user interfaces and canvases with contextually relevant information, based on user specific roles and dynamically detected content. The disclosed embodiments also provide significant improvements in the manner in which a computer can facilitate interactive engagement and navigation of content on a user interface.

For instance, it will be appreciated that the foregoing features can provide many practical applications for rendering disparate content on disparate display systems and for automatically modifying layout presentations of the content to ensure that certain types of content will not be rendered in tiles that undesirably overlap certain display boundaries, while still providing the user with the ability and convenience of enabling other tiles to overlap the boundaries, when appropriate, to thereby facilitate the manner in which the tiles are organized and presented in the canvas layout presentation.

Additionally, as described, the dynamic event canvas and associated elements can be used to help ensure that event data presented to users remains relevant and prioritized and intuitively arranged even when conditions or context of the event is rapidly changing. In this manner, the disclosed interfaces facilitate the manner in which a user is able to access and interact with the most contextually relevant data and in a user-friendly manner.

Interactive Event Creation Control Console

As described herein, the disclosed embodiments also relate to user interface controls and user interfaces, such as the interactive event creation control consoles referenced in FIGS. 35-40, which can be used to facilitate creation of events and event definitions that used by and/or incorporated into the templates and that are used to define the canvas layouts used for generating and rendering the different contextually relevant canvas displays for the events.

These user interface (UI) embodiments, including the event creation control consoles, can be used by analysts to create events that are subsequently surfaced/published in event canvas displays that are contextually relevant to user roles and the defined events (as defined in the interactive control consoles). These UI embodiments also enable the dynamic creation/modification of what an incident/event is and how it will be updated dynamically in the different canvas displays.

In some instances, the event creation control consoles enable analysts to create an event definition (e.g., the tiles/sources to be used by the templates to generate a corresponding event canvas) and can dynamically update an existing canvas presentation (by updating the content used by the templates) and which will be dynamically incorporated into modified versions of the canvas(es) being generated by the template(s). Even more succinctly, the updating of event canvases can occur at the event creation control console by adding/modifying content at the event creation control console that triggers corresponding updates to be made at/with the templates and canvas displays.

Figure 40:
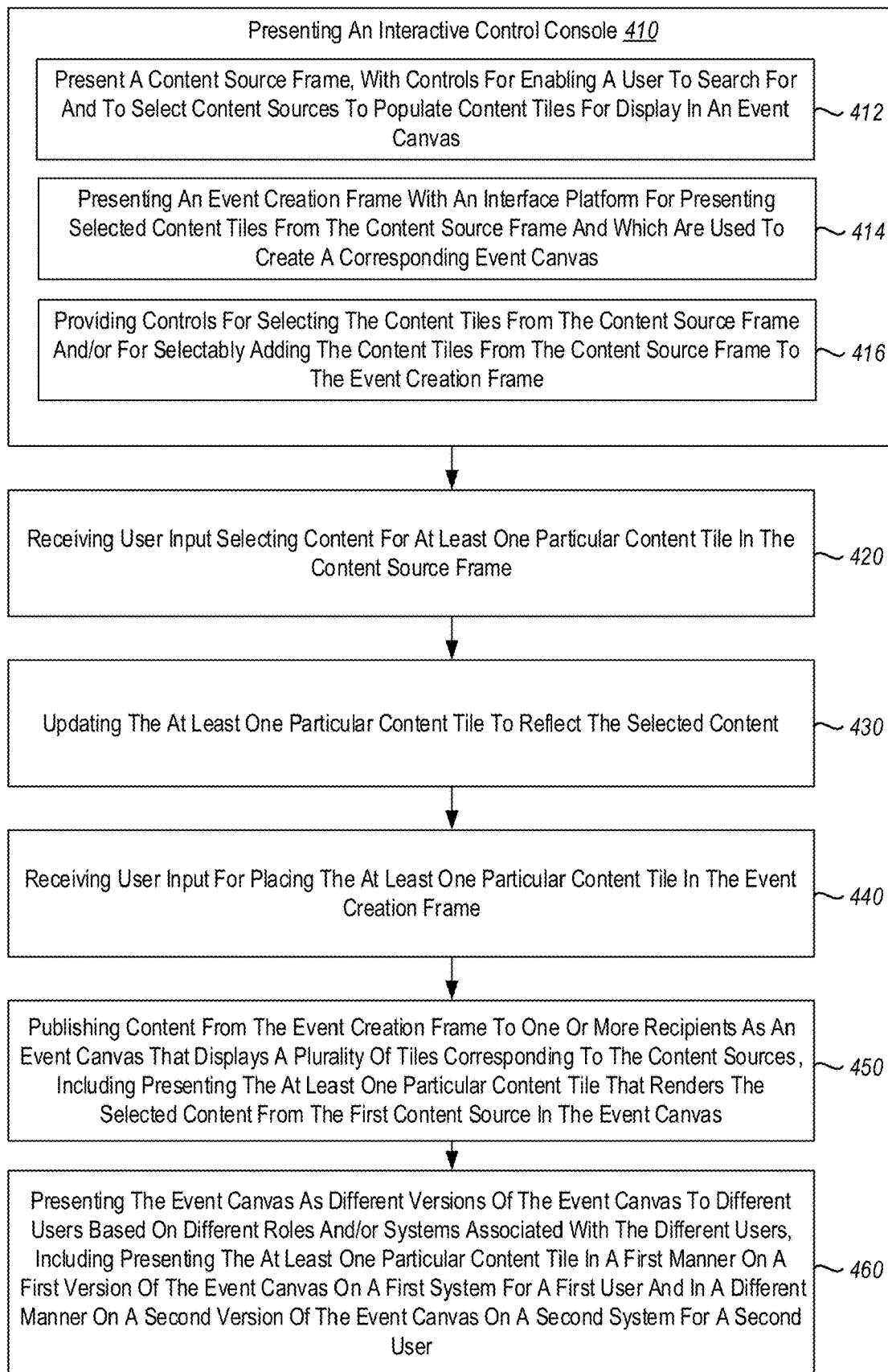
FIG. 40 illustrates an example flowchart having a plurality of method acts associated with using an interactive event creation control console to create and present an event canvas with content tiles, as described in reference to FIGS. 35-39.

Attention will now be directed to FIGS. 35-38 (which illustrate different embodiments of an event creation control console), FIGS. 39A-39C (which illustrate different versions of an event canvas created/updated with the event creation control consoles), and FIG. 40 (which illustrates a flow diagram of acts associated with methods for utilizing the event creation control consoles).

Figure 35:
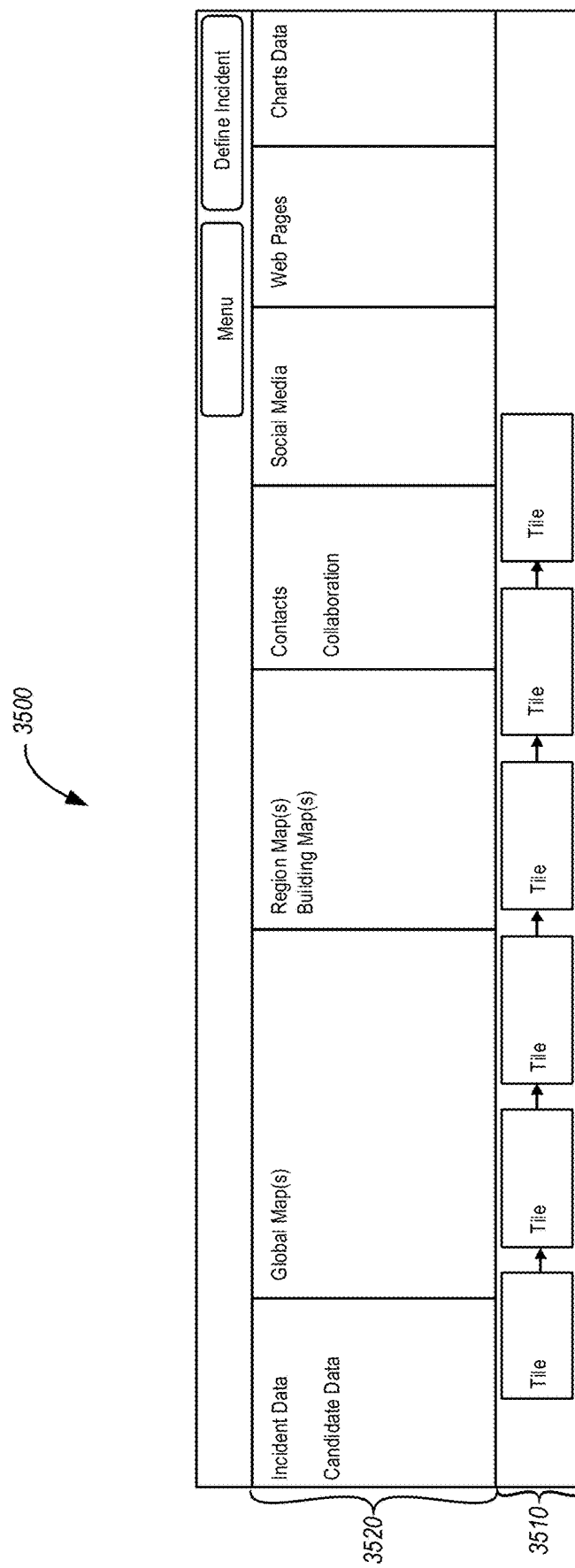
FIGS. 35-38 illustrate example interfaces of the interactive event creation control console for creating an event canvas, including a content source frame and an event creation frame for selecting content tiles to be presented in the event canvas.

As shown in FIG. 35, an event creation control console 3500 comprises a user interface that is displayed to a user, such as an analyst, to receive input for defining an event/incident. This interface or console 3500 includes a first frame comprising a content source frame 3510 and a second frame comprising an event creation frame 3520.

The content source frame 3510 is presently shown with a plurality of tiles. These tiles may be rendered as display objects that reflect content that is associated with the tiles. The content associated with the tiles, for example, can be reflected as text or image data that defines or includes the associated content. In some instances, the tiles can also be colored, textured, sized or otherwise modified to reflect that they have been associated with particular content. Currently, in the present embodiment, none of the tiles are associated with any content. They are simply placeholder tiles for receiving user input that associates content to them.

The event creation frame 3520 is presently shown with segmented areas with different suggested defined event content (e.g., an incident data/candidate data field, a global map(s) field, a region map(s)/building map(s) field, a contacts/collaboration field, a social media field, a web pages filed, and a charts data field). These are only possible categories of different content that can be positioned into the event creation frame 3520. In some instances, there are no segmented areas of the event creation frame 3520 and/or any tiles can be positioned into any of the segmented areas. In other embodiments, the segmented areas are fixed boundary areas that are restrictive in the types of content that can be positioned therein, such that they are only configured to receive tiles/content of a particular content type to facilitate communications with templates that use/publish different types of content in different ways. Currently, however, no tiles have been placed into the event creation frame 3520 and no content is currently reflected as being positioned in the event creation frame 3520.

Figure 36:
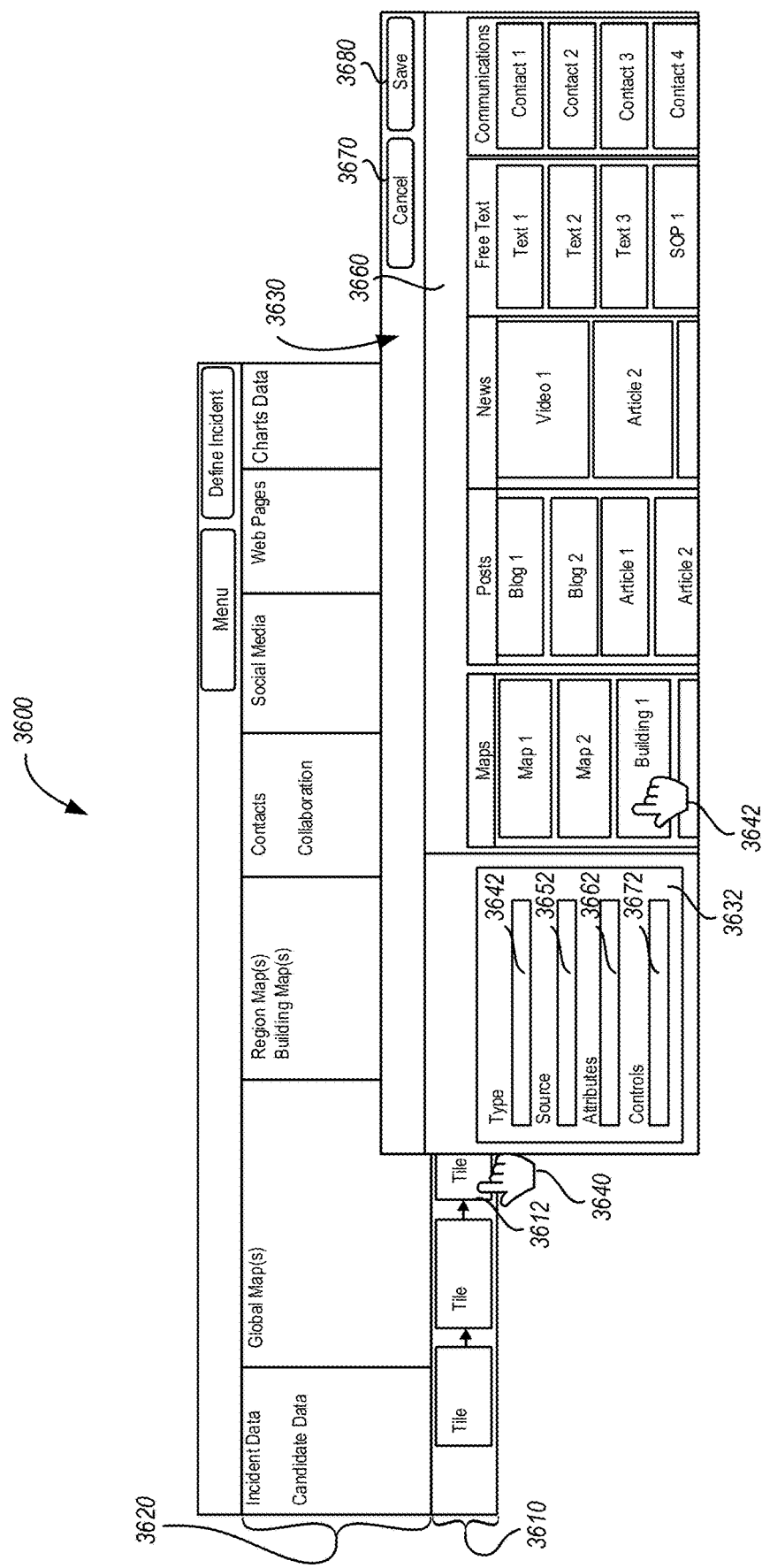

FIG. 36 illustrates another embodiment of the event creation control console 3600 with a corresponding content source frame 3610 and a corresponding event creation frame 3620. FIG. 36 also includes an additional tile/content configuration frame 3630. This frame 3630 is configured to receive user input for selecting/identifying content to associate with a particular tile. Additionally, this frame 3630 is configured to receive input for defining tile configurations, such as a tile type, a content source to be linked to the tile, attributes of the tile and controls associated with the tile, as will be described in more detail below with reference to tile configuration control 3632.

In some instances, the tile/content configuration frame 3630 is generated in response to a user selection and input provided through a menu control 3690, for example, as well as through one or more user input selections of a submenu/option (not presently shown) that will be displayed in response to an initial selection of the menu control 3690. Alternatively, a user can simply select a tile to be modified, such as the illustrated prompt (3640) selection of tile 3612. This selection/input may be the positioning of the prompt 3640 over a tile 3612 icon for a predetermined period of time (e.g., a hover input selection). The selection/input used to trigger the display of the tile/content configuration frame 3630 may also be an actual mouse click input or keyboard selection and or gesture detected by the system associated with a particular tile (e.g., tile 3612).

In some embodiments, the tile/content configuration frame 3630 is displayed as an extension of the content source frame 3610. The tile/content configuration frame 3630 may also be displayed automatically with the console 3600 and content source frame 3610 without receiving a separate user input to trigger a temporary display of the tile/content configuration frame 3630.

When displayed, the tile/content configuration frame 3630, is configured to display a plurality of different content sources corresponding to a plurality of different content types. In the present configuration, for example, content types are illustrated as maps, posts, news, free text and communication, each having a plurality of different content options, each option being associated with a different content source (or a same content source with a different content source address). In some instances, the content is automatically provided based on current ranking/sorting/searching schemes defined by the system and/or console interface 3600, such as recent events or top events that the system and/or console interface 3600 is subscribed to.

In other embodiments, the content is specifically associated with input provided by a user, such as one or more query terms entered into a query field displayed in the content selection frame 3660 (not presently shown), prior to the content options being provided output options to be selected from. The user input entered as a query can also be entered, in some embodiments into the tile configuration control 3632.

Once the content options are presented in the content selection frame, an analyst can select one or more options to be associated with a tile. In some instances, only a single content option can be associated with a single tile, such that a last selected option (for a corresponding tile) is the option that is applied. In other instances, multiple content options can be selected and applied to a single tile.

In the present embodiment, icon 3642 is positioned over the Building 1 content option in Maps. If selected, such as by a mouse click when prompt 3642 is positioned over the Building 1 option or in response to a touch selection of Building 1 on a touch screen, the Building 1 content will be associated with tile 3612 (which is the current tile that is associated with the triggering/display of the tile/content configuration frame 3620 at the moment the content (Building 1) is selected. Similar input could also be received for selecting one or more of the other content options.

Figure 37:
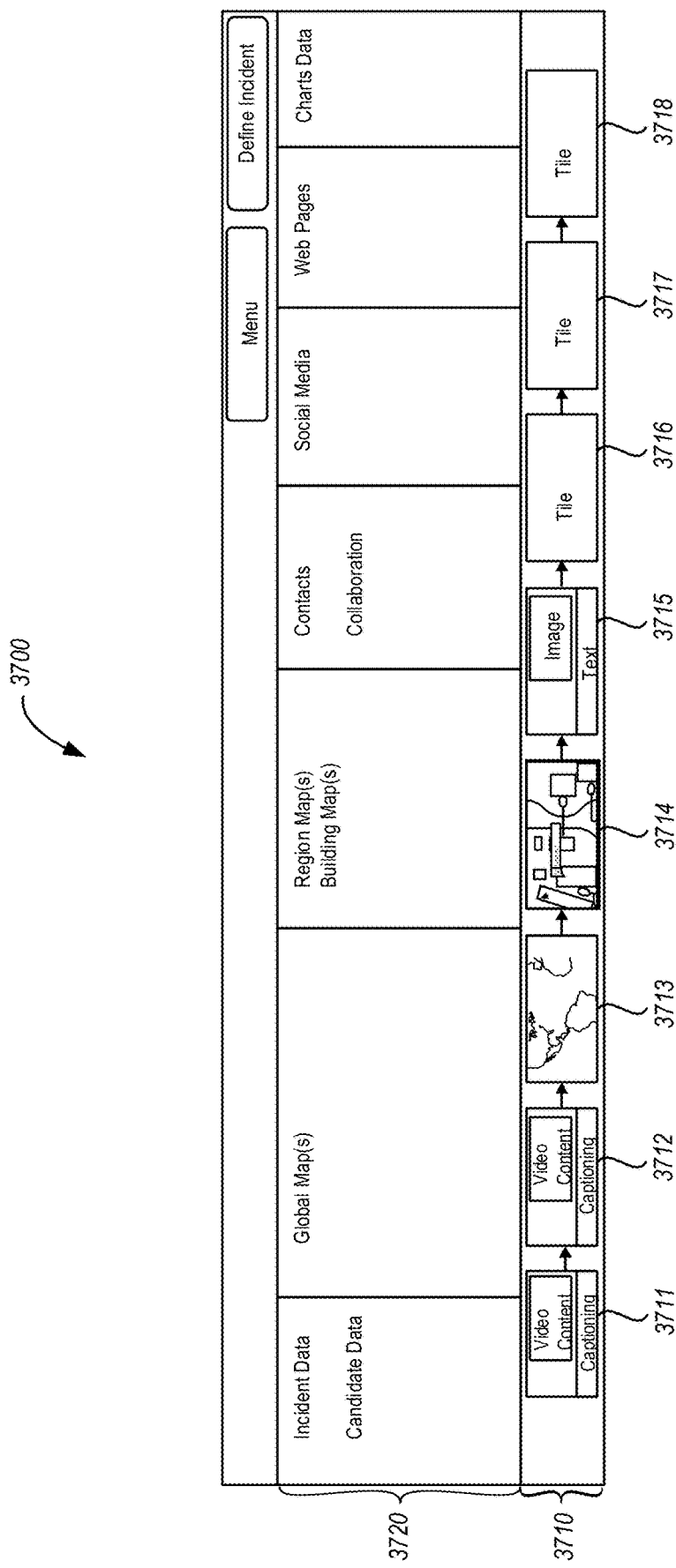
Figure 38:
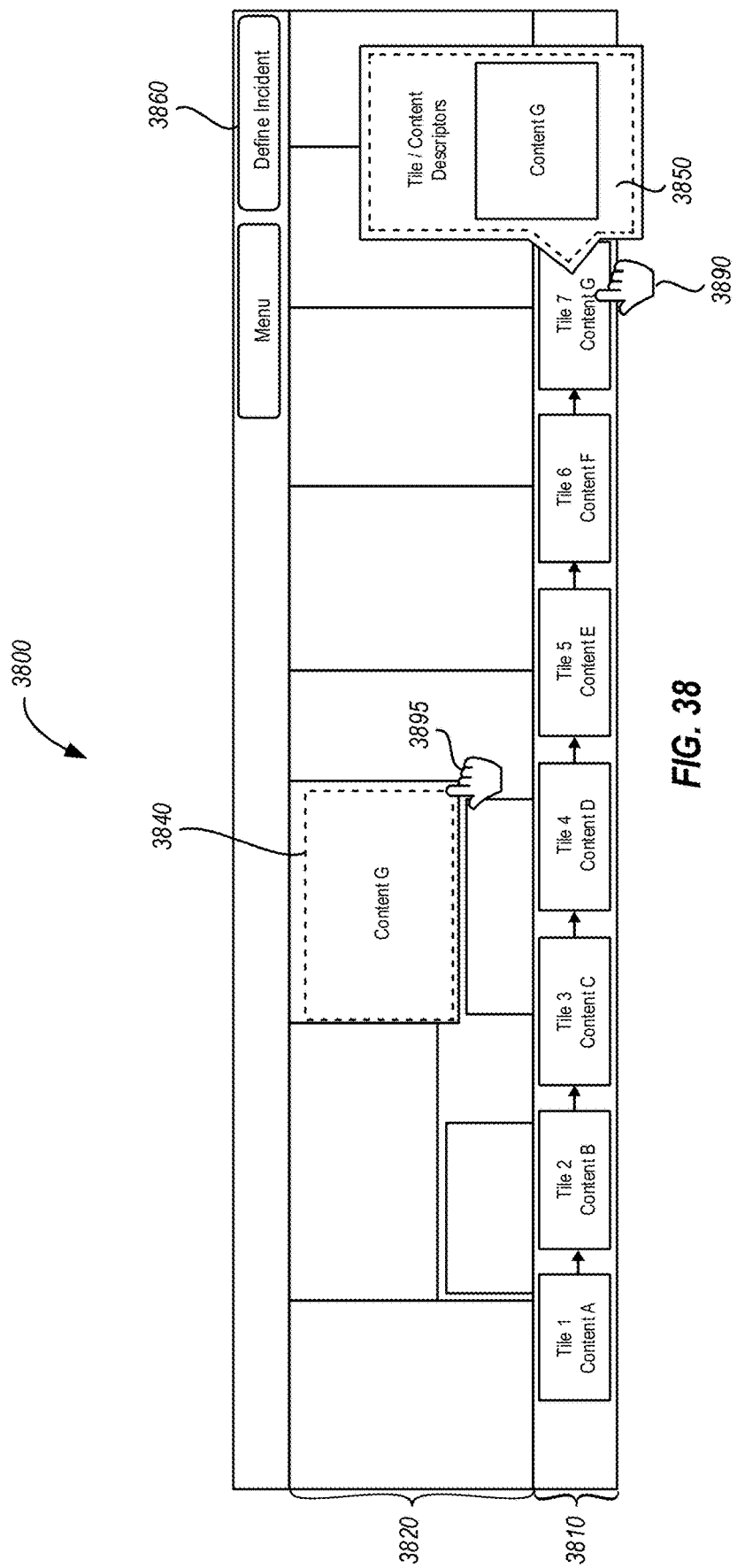
Figure 39:
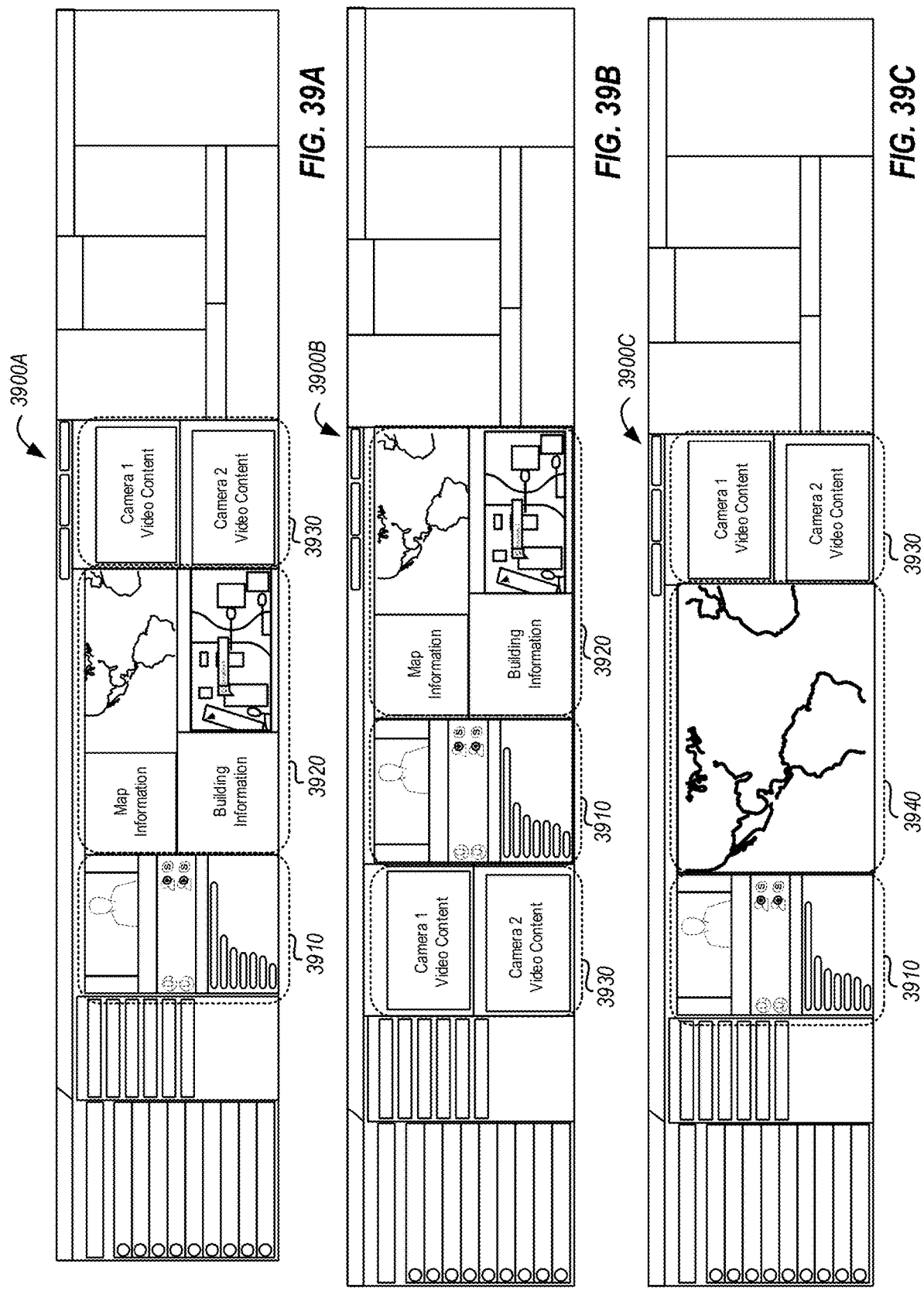
FIG. 39a-39c illustrate an example of an event canvas with content tiles corresponding to and created from the interactive event creation control console referenced in FIGS. 35-38.

When a content option is selected, the underlying address of the content (whether stored remotely or locally) is linked to the correspondingly associated tile 3612. Display of the tile 3612 can also be updated to reflect that the content is associated with it, by either textually describing the content or the content address and/or by modifying a display of the tile 3612 to reflect an image, animation or portion of the content that is associated with the tile. This is shown in FIGS. 37 and 38, for example.

When a user is satisfied with the association of the selected/identified content with the tile, they can save the changes, such as by selecting a save button 3680 that triggers the saving of the linked information. Alternatively, they can cancel the selection by selecting a cancel button 3670. Selecting the cancel button 3670 may also trigger the display of a new search field (not shown) to receive new query input to search for new content options.

Controls/tools are also provided to configure the manner in which a tile and the tile content will be displayed at the console 3600 and, in some instances, as well as how the corresponding tiles/content will be presented/displayed at one or more end user systems within event canvases. The tile configuration control 3632, for example can be used to define a tile type, receive input that defines a source address and to define other tile attributes and controls for the tiles, which will be used by the templates to control how the tiles/content are displayed at the event canvases.

In some embodiments, the tile configuration control 3632 includes a type control/tool 3642 that may comprise an input field or a pull-down menu for receiving user input that defines/selects a tile type. In some instances, the tile type control/tool 3642 receives input that is linked to the corresponding tile and that is used by the canvas templates to control the layout of the tiles in the versions of the event canvases that are displayed. This input, for example, may define how a particular content tile will react to a boundary between adjacent monitors on the first system or the second system, as described in reference to FIGS. 29-34.

The source control/tool 3652 may comprise an input field or a pull-down menu for receiving user input that defines/ selects a source type or query input. In some instances, the source control/tool 3652 receives input that defines an address of a source of content. Alternatively, the source control/tool 3652 may receive user input comprising query input for initiating a query of sources of content related to the query. In some embodiments, for example, the content sources shown in content selection frame 3660 can include content sources that are results corresponding to a query entered into the source control/tool 3652 as query input and that is dynamically provided in response to the query input being entered or submitted for searching.

The attributes control 3662 may comprise an input field, a pull-down menu or other menu for receiving user input that defines/selects attributes of the tile when the tile is rendered at a canvas display, including roles associated with the tile, when to show the tile for certain end user roles and when to refrain from showing the tile for certain end user roles. Alternatively, or additionally, the attributes control 3662 can receive user input defining sizes and positions for rendering the corresponding tile(s) on the event canvases and how the tile(s) will be rendered differently by different systems based on different user role contexts and/or system configurations.

Other attribute information can also be entered/selected with the attribute control/tool 3662, such as attribute information for selecting interfaces, drivers and applications for accessing and rendering the content from the defined content source by the event canvases/templates and/or for updating/ refreshing the content from the defined content sources. The input can be entered as executable code and/or key words that are interpretable by the templates to trigger rendering of the tile(s) in the corresponding manner, and/or by selecting pull-down menu options (not shown) to trigger the same functionality by the templates.

The controls tool 3672 may comprise an input field or a pull-down menu for receiving user input that defines/selects user input (e.g., from typed text/commands and/or pull-down options) that define how a user can interact with a tile and corresponding content displayed in the event canvas, such as for defining tile interaction controls like minimize, maximize, drill-down functionality, navigation functionality, trick-play functionality for pausing, rewinding, recording, and other controls for consuming content. Control input can also be provided for defining how contact information (when displayed in a tile) will be used at the canvas to trigger communications when a user interacts with the contact information, for example. The control input is interpreted by the template to trigger the generation of controls that are presented with the tile(s) when the event canvases are displayed.

In some instances, the console 3600 also provides tools/ controls for enabling a user to drag and drop, copy, move or otherwise position one of the tiles that are displayed in the first frame as a selectable link (e.g., tile 3612 in frame 3610) into the second/event creation frame 3620 of the console 3600. Then, the content provided in the second/event creation frame can be used to define the event/incident that is to be published. During publishing of the event/incident, the tiles and content moved in the event creation frame 3620 from the content source frame 3610, will be used by the correspondingly appropriate event templates for generating the canvases that are rendered on displays at the different end user systems based on contextual relevance of the end user systems/roles and system configurations, as described above.

The triggering of the publication event can be based on user input, for example, such as the selection of a displayed icon (e.g., define incident button) that is provided with the interactive event creation console and/or in response to a publication option provided through one of the main menu options (not presently shown).

During publication, the content/tiles in the event creation frame 3620 are disseminated to different end users according to an event canvas that is presented in different versions/ formats corresponding to the different contexts of the end users and/or different templates having predefined layouts/ rules for publishing the content from the event creation frame for different end users, as described previously.

Notably, in addition, when new content is added to the event creation frame, such as when a user adds a new tile to the event creation frame and/or when a tile is updated with updated content (subsequent to the initial publication), the new/updated content it is automatically pushed to and incorporated into modified versions of the canvas that is being disseminated/published as updated/modified versions of the canvas. The various templates can receive the updated changes in response to any combination of push/pull schemes for obtaining information from the event creation frame. In this manner, changes to the event can be automatically and dynamically reflected in the event canvases that are being rendered to a plurality of different end users.

Attention is now directed to FIG. 37, which shows an event creation control console 3700 that has a content source frame 3710 with a plurality of tiles, some of the tiles having associated content (i.e., 3711, 3712, 3713 and 3714) and some that do not (i.e., 3715, 3716, 3717 and 3718).

When a user wants to define an incident/event and subsequently publish the incident/event, they first need to copy or move the event content tiles that define the incident/event into the event creation frame 3720 of the event creation control console 3700. In alternative embodiments, the user may simply select publication of an event (such as the selection of a define or publication of incident icon/control) and all tiles having associated content in the console at that time can be automatically selected and published (by first adding them to the event creation frame 3720 or without adding them to the event creation frame 3720). If the tiles are not first added to the event creation frame 3720, the system will provide the tiles from the content source frame 3720 directly to the templates that create the corresponding event canvases.

FIG. 38 illustrates an example of moving a tile in an event creation control console 3800 from the content source frame 3810 to the event creation frame 3820. As shown, the prompt 3890 can be positioned over a tile and used to select a tile and to drag that tile to a location reflected by prompt 3895 in the event creation frame and to cause the tile to be rendered in the event creation frame. As shown, the Content G of that selected tile (i.e., Tile 7) is rendered in the event creation frame 3820 in such a way as to reflect the association between the Content G and the tile. When content G is updated, it will also be updated in the displayed representation shown as tile 3840.

Although not required, the drag and drop functionality of the tile can be made more enhanced by reflecting a callout 3850 of the tile that is selected in the content source frame 3810 for movement into the event creation frame 3820.

When the tile (e.g., Tile 7) is moved/copied into the event creation frame 3820, a copy of the tile may remain in the content source frame 3810 or it may be removed without leaving a copy.

At any desired time, after adding one or more tiles to the event creation frame 3820, a user may select the define incident button 3860, or another control accessible through the main menu by selecting the menu control, to trigger the publication of the event/incident that is defined by the content in the event creation frame 3820 at the time the publication event is triggered. Then, the templates associated with different subscribing/assigned users will be identified and provided access to the tiles/content in the event creation frame to generate the corresponding event canvas displays that have been described earlier.

When subsequent tiles (e.g., Tiles 1, 2, 3, 4, 5, 6, other) are added to the event creation frame 3820 and/or the existing tiles in the event creation frame 3820 are updated with new/revised content (e.g., new files, new addresses for the content, new versions of previous content), the system will update the templates with the new tile/content information to be disseminated in the existing canvas displays. This provides a mechanism to publish new updates in real-time or near real-time to a plurality of different users and in a plurality of different formats corresponding to the different end user contexts and system configurations.

FIGS. 39A, 39B and 39C illustrate examples of different versions of a canvas 3900A, 3900B and 3900C, respectively, that can be generated from a common shared event/incident definition and event creation frame set of tiles. As shown, the different versions of the event canvas (3900A, 3900B, 3900C) are generated for formatting/presenting the event content differently for different users based on different user contexts and based on the templates/rules used to create the canvas versions.

For instance, in FIG. 39A, a first set of tile content 3910 is presented to the left of a set of map tiles 3920, while a set of video content tiles are presented to the right of the set of map tiles 3920. In contrast, in FIG. 39B, the same set of tiles are presented, but they are presented in a different order. However, in FIG. 39C, some of the tiles from the set of map tiles 3920 are missing and are instead replaced with a single map tile 3940 from that set.

In this set of examples, all of the tiles in the different canvas versions are from a single common event definition corresponding to and defined by the same set of tiles that are present in a single event creation frame (not shown).

Attention will now be directed to FIG. 40, which illustrates a flow diagram of different acts and steps associated with disclosed methods for utilizing an event creation control console to define and publish events/incidents into different canvas displays corresponding to different end user contexts and system configurations.

As shown, the first illustrated step is the presentation of an interactive control console (act 410). This may include, for example, the corresponding acts of present a content source frame, with controls for enabling a user to search for and to select content sources to populate content tiles for display in an event canvas (act 412), the act of presenting an event creation frame with an interface platform for presenting selected content tiles from the content source frame and which are used to create a corresponding event canvas (act 414) and the act of providing controls for selecting the content tiles from the content source frame and/or for selectively adding the content tiles from the content source frame to the event creation frame (act 416), as previously described in reference to FIGS. 35-38.

The next act is the act of receiving user input selecting content for at least one particular content tile in the content source frame (act 420). This may occur, for example, by selecting/identifying content for a particular tile from the content selection frame 3660, as described above, or by receiving user input that specifically types/enters the address for the content to associate with the tile (e.g., with control 3652).

The next act is the act of updating the at least one particular content tile to reflect the selected content (act 430), such as shown by tiles 3711, 3712, 3713 and 3714 in FIG. 37.

The next act is the act of receiving user input for placing the at least one particular content tile in the event creation frame and for updating the event creation frame with one or more selected content tiles from the content source frame (act 440). This was shown and described in reference to FIG. 38 and the movement of Tile 7 into the event creation frame 3820.

The next illustrated act is the act of publishing content from the event creation frame to one or more recipients as an event canvas that displays a plurality of tiles corresponding to the content sources, including presenting the at least one particular content tile that renders the selected content from the first content source in the event canvas (act 450). This may result, for example, from the triggering input of a user selecting the define incident button 3860 or another triggering control from a menu option.

This may also include presenting the event canvas as different versions of the event canvas to different users based on different roles and/or systems associated with the different users, including presenting the at least one particular content tile in a first manner on a first version of the event canvas on a first system for a first user and in a different manner on a second version of the event canvas on a second system for a second user (act 460). For instance, the first version may utilize a same quantity but a different organizational layout of the plurality of content tiles than utilized in the second version of the event canvas. They may also utilize different quantities/subsets of the tiles provided in the event creation frame.

It will be appreciated from the foregoing that the disclosed event creation control consoles can be utilized to facilitate the manner in which events are dynamically created and published to a plurality of different end users, uniquely based on different end user contexts, and from a plurality of user selectable content sources.

The foregoing methods and referenced acts may be practiced by a computer system (such as the aforementioned canvas management system described above) which includes one or more processors and computer-readable media such as computer memory and the other referenced components that are configured to implement the functionality described herein. In particular, the computer memory may store computer-executable instructions that when executed by one or more processors cause the various functionality described throughout this disclosure.

The disclosed client system(s) and server system(s) of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RANI and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more storage medium having stored executable instructions that are operable, when executed by the one or more processors, for causing the computer system to implement a method for providing an interactive event creation control console to create a sharable event, the method comprising:
      the computer system presenting an interactive event creation control console with a content source frame and an event creation frame, the content source frame having at least one particular tile with selected content, the selected content from a first content source having been associated with the at least one particular tile;

the computer system receiving user input for placing the at least one particular content tile in the event creation frame;

the computer system updating the event creation frame with one or more selected content tiles from the content source frame, including the at least one particular content tile; and the computer system publishing content from the event creation frame to one or more recipients as an event canvas that displays a plurality of content tiles with associated content from corresponding content sources, including presenting the at least one particular content tile that renders the selected content from the first content source in the event canvas.

2. The computer system as recited in claim 1, wherein publishing the event canvas includes presenting the event canvas as different versions of the event canvas to different users based on different roles and/or systems associated with the different users, including presenting the at least one particular content tile in a first manner on a first version of the event canvas on a first system for a first user and in a different manner on a second version of the event canvas on a second system for a second user.

3. The computer system as recited in claim 2, wherein the first version utilizes a different quantity of the plurality of content tiles than utilized by the second version of the event canvas.

4. The computer system as recited in claim 2, wherein the first version utilizes a same quantity but a different organizational layout of the plurality of content tiles than utilized in the second version of the event canvas.

5. The computer system as recited in claim 1, wherein the method further includes:

receiving user input selecting the selected content for the at least one particular content tile in the content source frame and associating the selected content with the particular content tile.

6. The computer system as recited in claim 5, wherein the method further includes:

updating a rendering of the at least one particular content tile to reflect the selected content is associated with the at least one particular content tile in the content source frame.

7. The computer system as recited in claim 5, wherein the method further includes:

updating a rendering of the at least one particular content tile in the event creation frame to reflect the selected content is associated with the at least one particular content tile in the content source frame.

8. The computer system as recited in claim 1, wherein the method further includes:

receiving user input defining a tile type for the at least one particular content tile, the tile type defining how the at least one particular content tile will react to a boundary between adjacent monitors on the first system or the second system.

9. The computer system as recited in claim 1, wherein the method further includes:

receiving user input defining a user role associated with the at least one particular content tile, the user role controlling how the at least one particular content tile will be rendered differently on the first system and the second system.

10. A computer implemented method for providing an interactive event creation control console to create a sharable event, the method comprising:

a computer system presenting an interactive event creation control console with a content source frame and an event creation frame, the content source frame having at least one particular tile with selected content, the selected content from a first content source having been associated with the at least one particular tile;

the computer system receiving user input for placing the at least one particular content tile in the event creation frame;

the computer system updating the event creation frame with one or more selected content tiles from the content source frame, including the at least one particular content tile; and the computer system publishing content from the event creation frame to one or more recipients as an event canvas that displays a plurality of content tiles with associated content from corresponding content sources, including presenting the at least one particular content tile that renders the selected content from the first content source in the event canvas.

11. The method as recited in claim 10, wherein publishing the event canvas includes presenting the event canvas as different versions of the event canvas to different users based on different roles and/or systems associated with the different users, including presenting the at least one particular content tile in a first manner on a first version of the event canvas on a first system for a first user and in a different manner on a second version of the event canvas on a second system for a second user.

12. The method as recited in claim 11, wherein the first version utilizes a different quantity of the plurality of content tiles than utilized by the second version of the event canvas.

13. The method as recited in claim 11, wherein the first version utilizes a same quantity but a different organizational layout of the plurality of content tiles than utilized in the second version of the event canvas.

14. The method as recited in claim 10, wherein the method further includes:

receiving user input selecting the selected content for the at least one particular content tile in the content source frame and associating the selected content with the particular content tile.

15. The method as recited in claim 14, wherein the method further includes:

updating a rendering of the at least one particular content tile to reflect the selected content is associated with the at least one particular content tile in the content source frame; and updating a rendering of the at least one particular content tile in the event creation frame to reflect the selected content is associated with the at least one particular content tile in the content source frame.

16. The method as recited in claim 10, wherein the method further includes:

receiving user input defining a tile type for the at least one particular content tile, the tile type defining how the at least one particular content tile will react to a boundary between adjacent monitors on the first system or the second system.

17. The method as recited in claim 10, wherein the method further includes:

receiving user input defining a user role associated with the at least one particular content tile, the user role controlling how the at least one particular content tile will be rendered differently on the first system and the second system.

18. A computer system comprising:

one or more processors; and one or more storage medium having stored executable instructions that are operable, when executed by the one or more processors, for causing the computer system to implement a method for utilizing an interactive control console, the method comprising:

the computer system presenting the interactive control console as a user interface on a display screen with at least a first frame, the first frame comprising a content source frame, with controls for enabling a user to search for and to select content sources having content associated with one or more events, the content sources being identified in the first frame as selectable links or tiles for accessing the content of the content sources;

the computer system providing a control for enabling a user to drag and drop or copy the selectable links or tiles of the content sources into a second frame, comprising an event creation frame, which is displayed at the interactive control console, wherein the control is used for dragging and dropping or copying one or more selectable links or tiles into the event creation frame from the content source frame; and the computer system providing a control with the event creation frame which, when selected, triggers publication of content in the content source frame as an event canvas that displays a plurality of tiles corresponding to the content sources.

19. The system of claim 18, wherein the method further includes publishing the content from the event creation frame to one or more recipients as the event canvas, the event canvas being rendered with the plurality of tiles, each of the plurality of tiles accessing and rendering content associated with corresponding content sources during display of the event canvas.

20. The system of claim 19, wherein formatting of the event canvas at different user systems is based on one or more event template selected from a plurality of different event templates corresponding to different event user roles, the selection of the template for a particular end user system being automatically selected based on one or more event role associated with one or more recipients of the end user system, wherein a first selected template and event canvas version used for a first event user role is different than a second selected template and event canvas version for a different event user role, the first and second event canvas versions providing at least some shared content corresponding to the one or more selectable links or tiles that are dragged and dropped or copied into the event creation frame from the content source frame.

* * * * *